(12) United States Patent
Goranson et al.

(10) Patent No.: US 10,360,503 B2
(45) Date of Patent: Jul. 23, 2019

(54) SYSTEM AND METHOD FOR ONTOLOGY DERIVATION

(71) Applicant: Sirius-Beta Corporation, Virginia Beach, VA (US)

(72) Inventors: Harold T. Goranson, Virginia Beach, VA (US); Beth Cardier, Virginia Beach, VA (US)

(73) Assignee: Sirius-Beta Corporation, Virginia Beach, VA (US)

( * ) Notice: Subject to any disclaimer, the term of this patent is extended or adjusted under 35 U.S.C. 154(b) by 433 days.

(21) Appl. No.: 14/093,229

(22) Filed: Nov. 29, 2013

(65) Prior Publication Data

US 2014/0164298 A1    Jun. 12, 2014

Related U.S. Application Data

(60) Provisional application No. 61/732,326, filed on Dec. 1, 2012.

(51) Int. Cl.
*G06N 5/02* (2006.01)

(52) U.S. Cl.
CPC ........................................ *G06N 5/02* (2013.01)

(58) Field of Classification Search
CPC ........................................................ G06N 5/02
USPC ........................................................... 706/12
See application file for complete search history.

(56) References Cited

U.S. PATENT DOCUMENTS

| | | | |
|---|---|---|---|
| 8,560,491 B2 * | 10/2013 | B'Far et al. .................... | 706/55 |
| 2005/0289134 A1 * | 12/2005 | Noguchi .......................... | 707/4 |
| 2006/0167689 A1 * | 7/2006 | Maren ........................... | 704/240 |
| 2007/0156720 A1 * | 7/2007 | Maren ........................... | 707/100 |
| 2009/0012842 A1 * | 1/2009 | Srinivasan et al. ............. | 705/10 |
| 2009/0172771 A1 * | 7/2009 | Soulhi ............................... | 726/1 |
| 2010/0011148 A1 * | 1/2010 | Strassner ............. | G06N 99/005 711/100 |
| 2010/0076918 A1 * | 3/2010 | Attou et al. ..................... | 706/47 |
| 2010/0228782 A1 * | 9/2010 | Rao .................. | G06F 17/30734 707/794 |
| 2010/0312549 A1 * | 12/2010 | Akuwudike ....................... | 704/9 |
| 2011/0010751 A1 * | 1/2011 | Soulhi ............................... | 726/1 |
| 2011/0087629 A1 * | 4/2011 | B'Far et al. .................... | 706/46 |
| 2011/0093430 A1 * | 4/2011 | B'Far et al. .................... | 706/55 |

(Continued)

OTHER PUBLICATIONS

Herring et al, "Using category theory to model GIS applications", 4th International Symposium on Spatial Data Handling. vol. 2. 1990.*

(Continued)

*Primary Examiner* — Paulinho E Smith
(74) *Attorney, Agent, or Firm* — Blank Rome LLP

(57) ABSTRACT

A system for deriving ontologies to support inferencing with changing context, including changes of time. Embodiment of the invention use a unique system for modeling context and the interactions among multiple contexts in order to compute functions that can modify ontologies for presentation to a reasoning system. A parallel unique system allows previous inferences to be retrospectively modified based on newly derived ontological semantics. The system allows for the creation of new ontological elements and auditable models of agency and cause. It can be implemented using methods that delay evaluation until semantic interpretation is required, either at the ontological or inferential level.

31 Claims, 42 Drawing Sheets

(56) References Cited

U.S. PATENT DOCUMENTS

2012/0167094 A1* 6/2012 Suit ............................ 718/100
2012/0284259 A1* 11/2012 Jehuda ........................ 707/722
2013/0311419 A1* 11/2013 Xing ..................... G06N 5/048
706/55

OTHER PUBLICATIONS

Kokar et al, "Ontology-based situation awareness." Information fusion 10.1 (2009): 83-98.*
W. Hu et al., "Block Matching for Ontologies", School of Computer Science and Engineering, Southeast University, 2006, pp. 300-313.
W. Hu et al., "Matching Large Ontologies: A Divide-and-Conquer Approach", School of Computer Science and Engineering, Southeast University, Data & Knowledge Engineering 67 (2008), pp. 140-160.

* cited by examiner

3801 - HALF-DUAL
3802 - POINTS
3803 - LINES

3901 - TUBE
3902 - DISK

4001 - OUTER DISK
4002 - INNER DISK
4003 - NODES
4004 - LINKS

4201

SYSTEM AND METHOD FOR ONTOLOGY DERIVATION

CROSS-REFERENCE TO RELATED APPLICATIONS

This application claims the benefit of U.S. provisional patent application 61/732,326, filed on Dec. 1, 2012, the disclosure of which is incorporated by reference in its entirety.

FIELD OF THE INVENTION

Embodiments described herein relate to ontologies of reasoning systems, and more specifically to a system, information model and method to perform dynamic, situated, and contextually sensitive adaptive reasoning.

BACKGROUND OF THE INVENTION

Reasoning systems (also called "expert systems") are typically designed for a specific domain. General knowledge about the domain is captured in an ontology. Ontologies are formal models of the world of interest. For example, if the reasoning system is expected to reason about mothers or motherhood, the ontology will contain entries for just what it means (in the world of interest) to be a mother.

Note, in the art, the term "ontology" has been used in a relaxed way to apply to any reference, including ordered lists, data dictionaries and free form glossaries. The present use of the concept is the more formal, strict and powerful definition. A good reference for this definition is "Ontology: Towards a New Synthesis." By Chris Welty and Barry Smith in "Formal Ontology in Information Systems." edited by the same authors. ACM Press. 2001 ISBN 978-1581133776.

Ontologies, in the sense used here, are built using special types of logic called description logics. They generally require expertise and tools distinct from those of the reasoning system. Typically they are finalized before a user begins using the reasoning system that references them. Ontologies are then treated as if they are static; in this paradigm, once a domain is definitionally described, it is done.

An analogy is often made to the scientific method where laws of science are discovered and proven and thenceforth are used in reasoning over the world. They can be extended by theorists, but what is previously established rarely changes. However, a well known problem in logic is that the meaning of a fact or inference can change depending on the context in which it exists, different contexts existing in most worlds of interest. The method and system thus requires novel mechanisms to achieve this.

In domains of interest, including the real world, contexts can change while the reasoning process is underway, or between when the reasoning was performed and the results used. For example, the concept of 'mother' would mean a female parent in many contexts but be an epithet in another. Also, in some contexts the reasoner is expected to manage multiple meanings, perhaps as a joke or even as a way to enhance communication. Even the usual definition can vary; 'Mother' in one context can be a property defined by law, and in another someone who has purchasing influence.

So the problem exists that in much human reasoning, ontologies are dynamic and change basic meaning and internal structure depending on the context that applies as contexts shift. Multiple and changing ontologies are required but the current practice supports only single, static ontologies.

Another problem is that some reasoning systems have as a goal the creation of an explanatory narrative wherein they need to create or enlarge worlds, resulting in elements that have ontological weight. These might be referenced by later users of the reasoning system or any related communications such as story-telling.

Another problem is that many reasoning systems need to reason over information from different sources and which have been structured using different ontologies, methods or description logics. For example, military intelligence systems often have need to consider information collected by different means, from different media and stored in different information pools using different ontologies.

Another problem deals with reasoning over cause. Reasoning systems create new facts from existing facts and inferences, but these rarely create new facts that capture causal connections. For example, if a system reasons that 'Aristotle is a man' from 'all citizens are men' and 'Aristotle is a citizen,' it does not include information about what caused any of these facts to be true. Yet the purpose of many reasoning systems is to understand what causes what and possibly how to change results by employing different or changed causal dynamics. Facts and inferences change based on context, and changes in causal dynamics can also be invoked by a change of context, or contextual influence. No method (and system) currently exists, such that the interaction between multiple contexts can derive causal agents, including some elements that do not appear in any of their source ontologies.

Another problem is that both levels of the system (reasoning and ontological derivation systems) may need to operate in a distributed, federated manner, using distributed systems, involving collaborating but geographically diverse users and agents and using pools of information from many distributed sources.

The current art supports none of these needs.

The current state of reasoning systems that do recognize context are those that use non-monotonic logic, or some technique that can be mapped to such. This is effective when the change in context is not ontological, does not generate new reusable elements, does not reason over cause and prior inferences are not modified. Even in the limited cases where it does apply, the logical overhead of such systems confines them to simple or academic settings.

The current state of fieldable ontological systems is dominated by work on the Semantic Web and this work reinforces these limits.

Therefore, there exists a need for a system and method to dynamically derive ontologies or the presentation of ontological information based on changing contexts and relationships among multiple contexts. Derived ontologies will present changed or new semantics. Such a derived ontology system will retroactively modify prior inferences that used now-modified reference semantics and do so in a formerly ordered manner. In so doing, the ontological derivation system will perform higher level 'reasoning' over the contexts, situations and attitudes that bear on ontological shifts.

Additionally, there is a related need to reveal causal dynamics in the combined system. The 'combined system' is the system of dynamic ontological derivation by higher level reasoning together with the inference-driven reasoning system that dynamically readjusts. Each of these two components will have its own logic with the logics formally related. Moreover the need exists for ontological federation, and in particular federation over existing ontological methods including those of the Semantic Web.

FIG. 1 shows the current state of ontology creation systems 101 and reasoning systems 103. An ontology 102 is a created set of connected formal definitions of a world, created using a description logic. An example of a description logic as employed in the Semantic Web is SHOIN(D).

The expertise and tools required are therefore highly specialized and the common practice is that the ontology creation system 101, the logic employed therein and the supporting tool suites and methods are separate from the user of the ontology. The ontology is created before use and created elements do not change when directly being used. The ontology creation system 101 presents to a client and interface 108 to allow the user to visualize and engineer the ontology.

The user of the ontology 102 is a reasoning system 103 (historically called an 'expert system'). Reasoning systems are varied in details, but all follow the form of accepting facts, inferences and sometime axioms. They then apply some form of logic or probabilistic association to produce inferences 105. A reasoning system 103 can combine automated and human processes. It can employ any algorithmic method that requires a semantic reference. The reasoning system presents to a client and interface system 107 that is distinct from the ontology client 108.

The resulting inferences and facts 105, when compared to an ontology 102, are structured differently. Some combined systems have the feature of 'learning.' In this case, a feedback system 106 exists which advises the ontology creation system. Information reported via this feedback may be an inference that is general enough to be entered into the ontology for reuse. Alternatively, it can be information that tunes the ontology.

A common example of such tuning is via constraints. An example is that the ontology may contain information that a car is capable of independent movement. A refining constraint may be that the movement is only possible if the amount of fuel is greater than zero.

Another common example is via exception. An example is that the ontology may contain information that living dogs have four legs. An exception may be that a specific living creature is a dog but possess only three legs.

In this way, the existing art can be said to support some dynamism in ontologies, but the dynamism is limited to interpretation in a single context. In these systems there can be no interpretation that is derived from the interaction between more than one ontology.

Because the current art produces static, single-context ontologies, the current art of ontology visualization and modeling is primitive, using simple graphs or their intented linearization. For example, the most widely used tool at present is Protégé, an open source project from Stanford. Users edit graphs manually. The required skill is so rarified that it is unlikely that anyone could be a competent user of the tool and a skilled ontology engineer as well as an expert in the domain being addressed.

A critical survey of these tools is Ontology Visualization Methods—A Survey, by Katifori, A., Halatsis, C., Lepouras, G., Vassilakis, C., Giannopoulou, E. ACM Computing Surveys, 39, 4, Article 10 (2007).

DETAILED DESCRIPTION OF THE INVENTION

Figure 1:
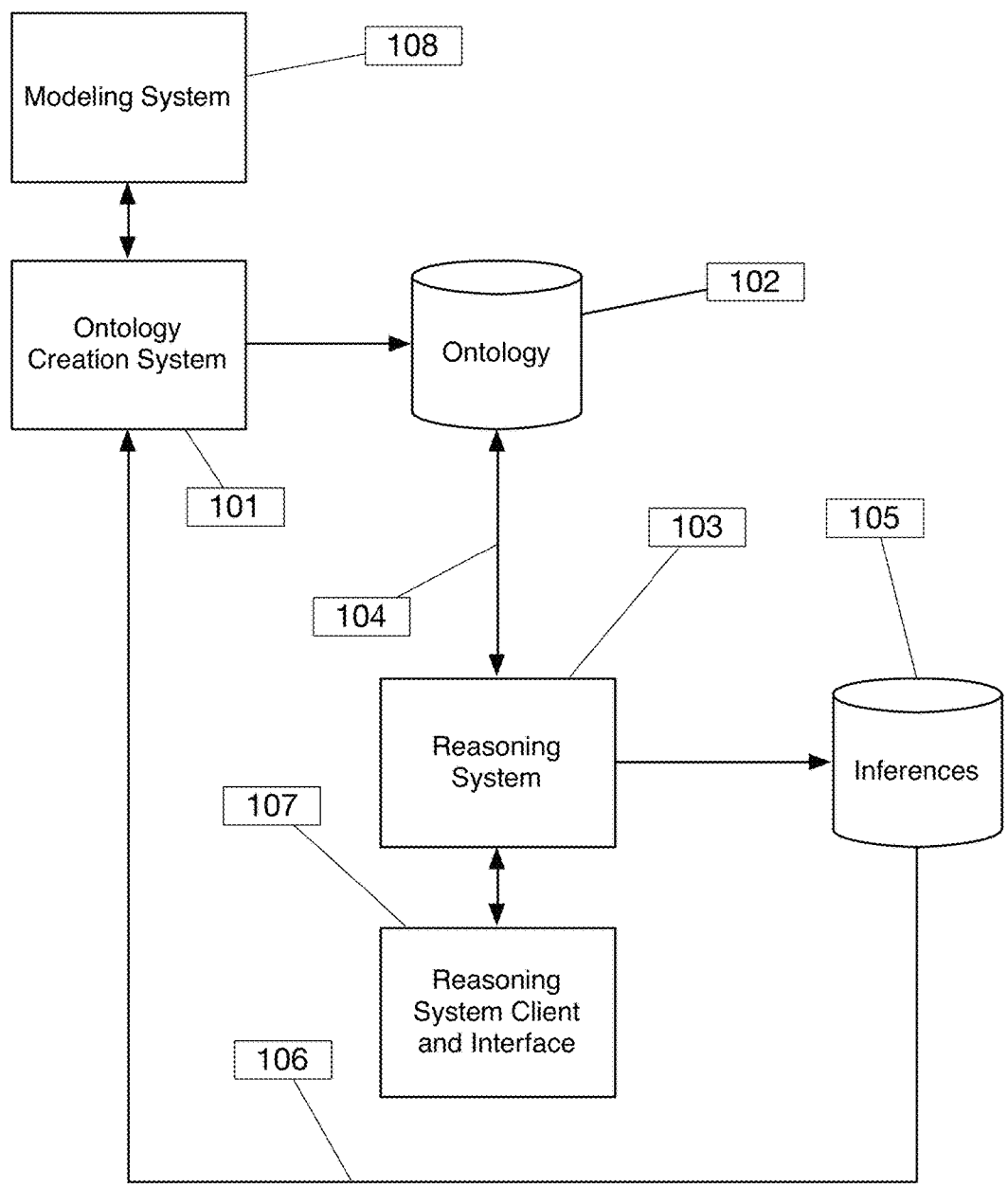
FIG. 1 illustrates the prior art regarding ontology systems and reasoning systems.

Embodiments described herein incorporate principles described in U.S. application Ser. No. 12/105,143 filed Apr. 17, 2008 and published Nov. 20, 2008 as U.S. Pat. App. Pub. No. 2008/0288856, Ser. No. 13/290,439 filed on Nov. 7, 2011 and published on May 10, 2012 as U.S. Pat. App. Pub. No. 2012/0117114 and Ser. No. 13/919,751 filed on Jun. 17, 2013, the disclosures and publications of which are incorporated by reference.

In the following detailed description, reference is made to the accompanying drawings, which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made.

Embodiments described herein include a computer system. The computer system may be any computer system, for example, a smartphone, a tablet, a personal computer, a minicomputer, or a mainframe computer. The computer system will typically include a processor, a display, at least one input device and random access memory (RAM), but may include more or fewer of these components. The processor can be directly connected to the display, or remotely over communication lines such as cable, telephone lines or local area networks. Embodiments may include both commercial off-the-shelf (COTS) configurations, and special purpose systems designed to work with the embodiments disclosed herein, so long as the hardware used is capable of performing the tasks required by specific embodiments.

Figure 2A:
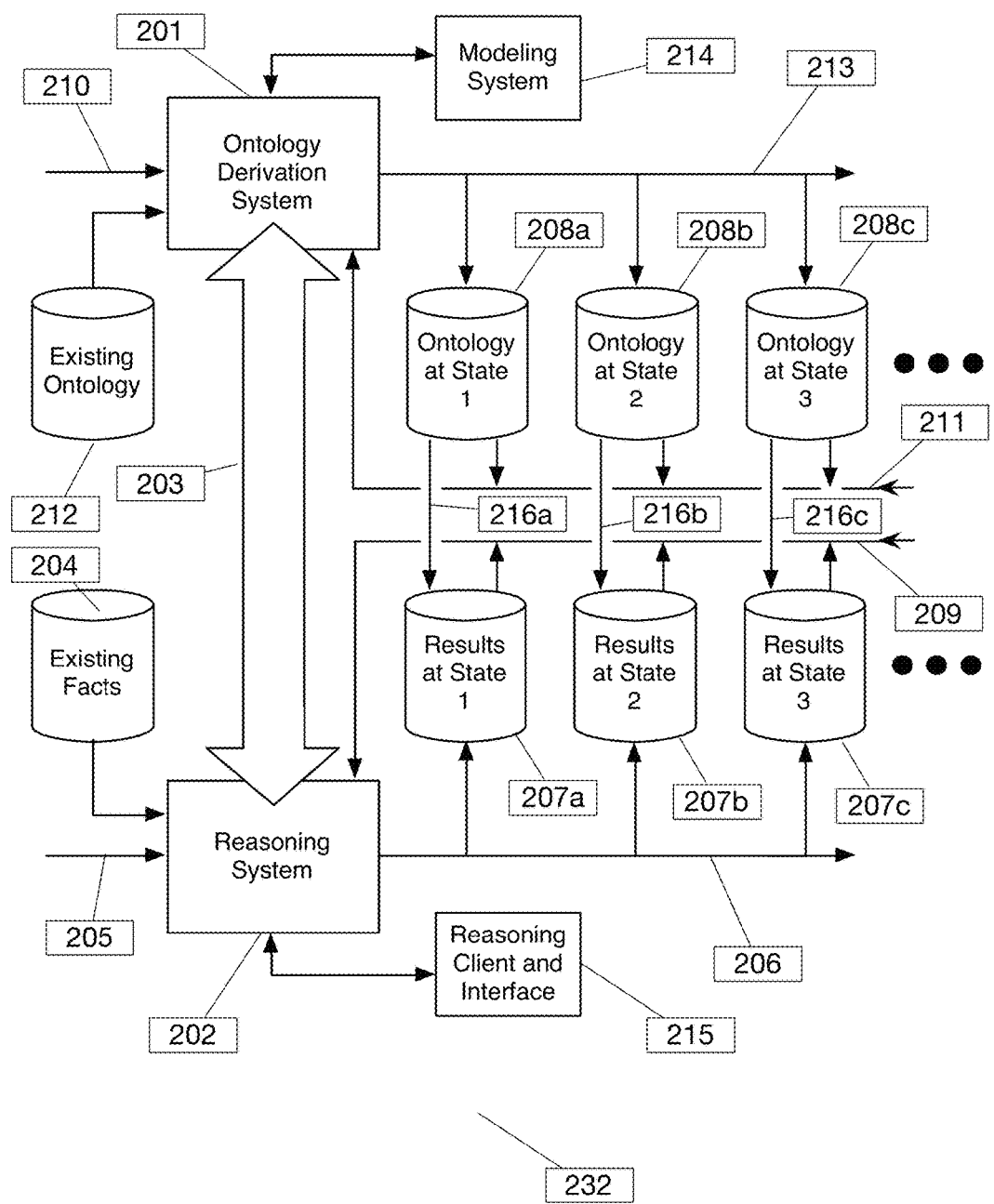
FIG. 2a illustrates a logical representation of elements of a system that supports dynamic ontologies according to embodiments described herein.

FIG. 2a illustrates an embodiment of the invention. An ontology derivation system 201 supports one or more reasoning systems 202 in a combined system 232. Any number of reasoning systems 202 can be simultaneously supported and there is no need for them to be similar in mission, structure, logic or inference mechanism. The ontology derivation system 201 is connected to each reasoning system 202 by a persistent connection 203, described in later figures.

Each reasoning system 202 of FIG. 2a can have a collection of initial facts, inferences, axioms or other required information. The reasoning system 202 accepts sequentially appearing facts 205 and produces inferences and resulting facts 207 and in the process references an ontology 208. A user, being a human, another system or some combination, interacts with the reasoning system 202 by a client and user interface component 215.

An ontology 208 is created by an ontology derivation system 201 which also has a modeling system 214 supporting a modeling methodology similar in function to the modeling system 108 of FIG. 1. The major difference between the embodiment shown in FIG. 2a and the system disclosed in FIG. 1 is that, in the embodiment shown in FIG. 2a, information provided to the reasoning system 202 from outside 205 or from later states 209, or information provided to the ontology derivation system from outside 210 or from later states via channel 211, can trigger a change in state wherein a new ontological state (e.g., 207a, 207b, 207c, 208a, 208b, 208c) is computed and the inferred results calculated or recalculated.

Meanwhile, each state provides new information that may affect earlier states, and levels. The embodiment uses the notion of abstraction levels in its operation. Abstraction levels are fully described in reference to FIGS. 3 and 6. FIG. 2a shows two of these levels, the ontological level (201, 208a, 208b, 208c, 212, 214) and the inferential level (202, 207a, 207b, 207c, 204, 215). States are time-based sequences of the information at each level. FIG. 2a shows three such states 207a and 208a, 207b and 208b, and 207c and 208c.

For example, if an early state of reasoning suggests that someone is drowning then a tentative ontological situation (e.g., 208b) and subsequent inference (e.g. 207b) will be that they are in water. If a later fact or inference (e.g., 209) informs that the person is in a cave containing carbon dioxide, then every ontological state 208 is a candidate for change, and this in turn might change many or all of the inferences in previous states 207.

In the system shown in FIG. 1, the conclusion can be reached that the person in stress is dying from lack of oxygen in a cave. But only that one new inference can be made. In the embodiment of FIG. 2a, all previous assumptions are automatically adjusted at all times, at both levels.

An inheritance path 213 conveys information from one state to another. For example, early ontological information at state 208a influences a later ontological state 208b by the persistent inheritance chain 213. A similar inheritance path 209 links states of inferences, for example linking early facts and inferences at state 207a to those of 207b and 207c.

The ontological level consisting of all the states 208a, 208b and so on can be considered to be the complex arrangement of governing situations and implied knowledge that bears on the reasoning system 202 (with 215) and its results 207a, 207b and so on. Ontology derivation system 201 (with the modeling system of 214), ontology states 208a, 208b, 208c with persistent connection 203, 213 and later states via channel 211 are thus also a dynamic computing system, but one that 'reasons' over ontologies as situations, working in concert with the system comprising reasoning system 202, inferred state 207a, later state 207b and so on.

Reasoning client and interface 215 is a client interface for reasoning system 202. Modeling system 214 similarly provides user control to the ontology derivation system 202. Elements 201 and 202 are systems that perform reasoning and ontology derivation respectively. The reasoning system 202 typically supports an end user by reasoning and client interface 215. The ontology derivation system 201 exists to support the reasoning system 202, and is controlled by one or more ontology engineers by an interface displaying a modeling system 214. In practice, the two execution engines are coupled by a persistent connection 203, whereby the reasoning system 202 is constantly consulting the ontology derivation system 201.

FIG. 2a shows the results of these two execution engines. The computed ontology at one state in time e.g, 208a is followed by a recomputed ontology 208b at a later state in time. Similarly, the related inferences are computed at one state e.g. 207a, to be followed by inferences computed 207b at a later point in time, being a later state of the system.

FIG. 2a illustrates how earlier states of the ontology e.g, 208a feed information to later states of the ontology e.g., 208b via the path 213. Later states of the ontology e.g. 208c can retroactively modify earlier states e.g, 208b via the information channel 211 (retrieving information from future states of 208) which can be considered feedback.

In a similar manner earlier states of the inferences e.g, 207a feed information to later states of the inferences e.g., 207b via the path 206. Later states of the inferences e.g. 207c can retroactively modify earlier states 207b via the information channel 209 which can be considered feedback.

Each state of the ontology is consulted by the relevant state of inferences which provides required semantic interpretation. This is shown in FIG. 2a as items 216, e.g., path 216b is the information path by which the ontology 208b provides interpretive context to the inferences 207b.

Figure 3:
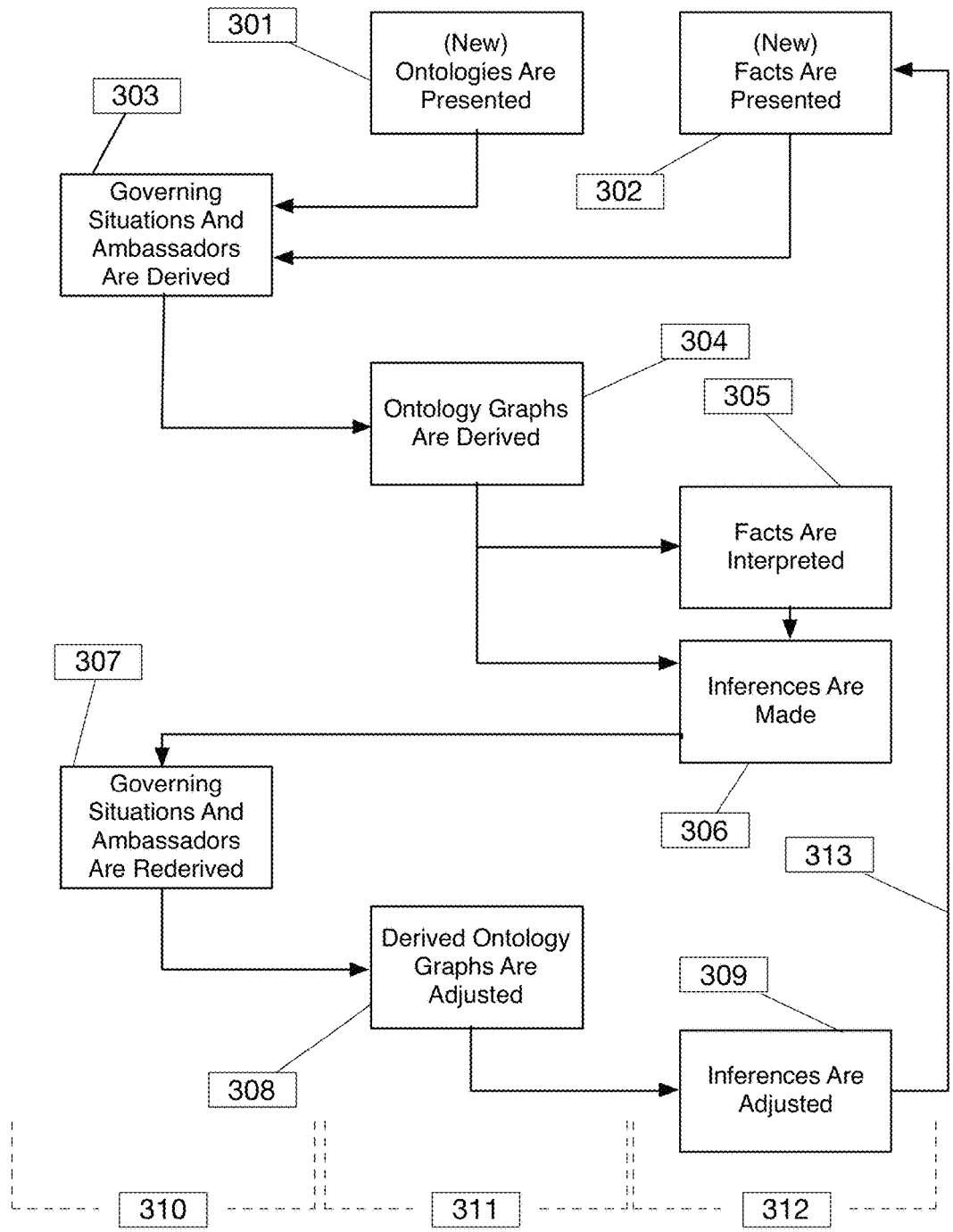
FIG. 3 shows a method for operating the system of FIGS. 2a and 2b according to embodiments described herein.
Figure 6:
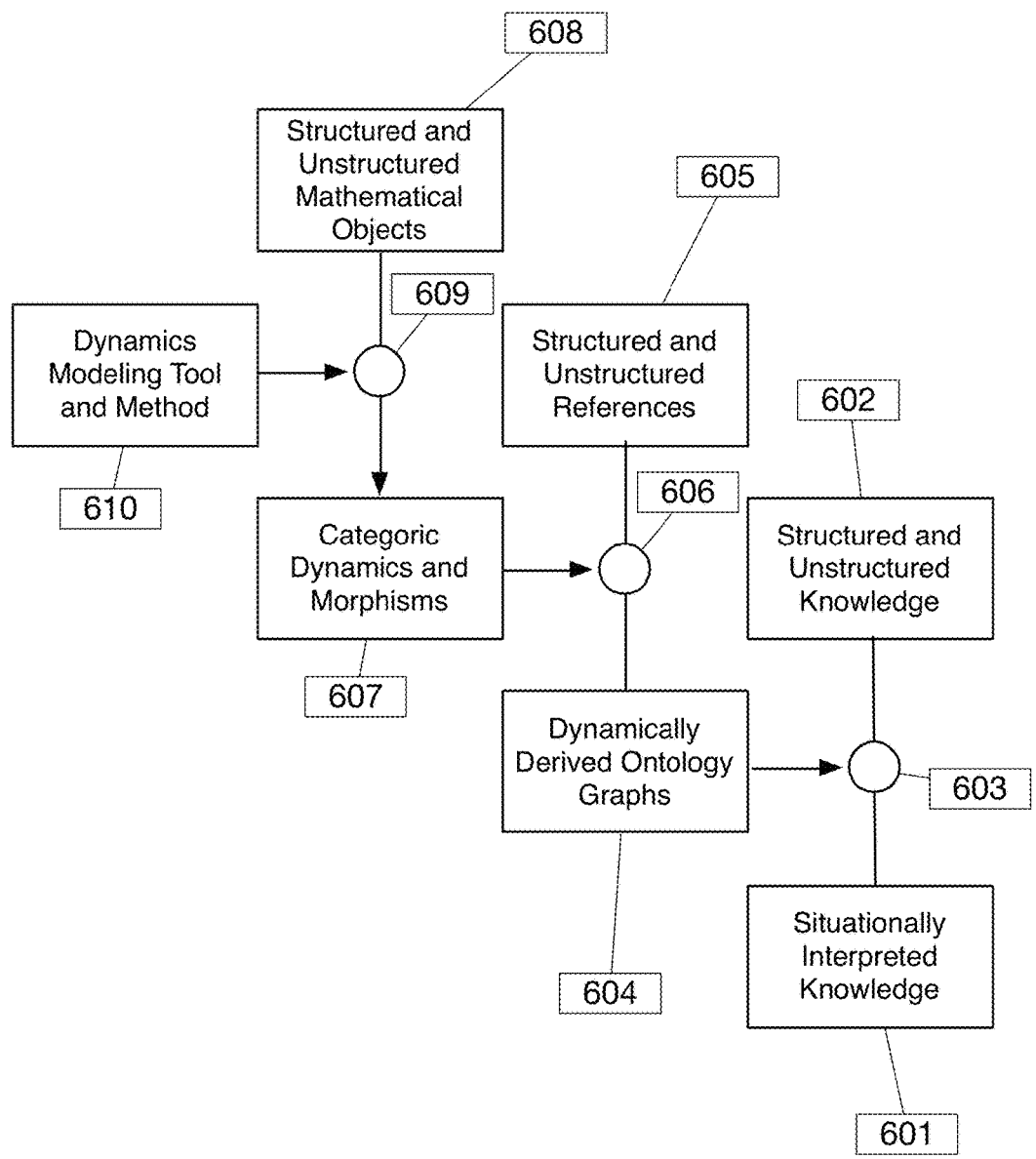
FIG. 6 shows the abstraction chain of operators according to embodiments described herein.

Paths 203, 216a, 216b, 216c are paths between the two levels of ontology and inferences. (FIGS. 3 and 6 will introduce more levels.) Paths 206, 209, 211, 213 are information flows among states.

Dynamism can also occur at the ontological level. If there is no new situational information from the outside 210, then all of the shifts in ontological state are derived from information from the reasoning system 202 and the order in which it is processed.

An example may be the interpretation of a detective story, where initial facts 205 contain hidden information about agents and motives that are not currently salient. At a later state of reasoning, the combination of ontological situation 208, reasoned interpretation 207 and a new fact 205 are sufficient to provide a tipping point in comprehension about who in the story committed a murder, why and how they covered their tracks. In this case, prior established situations 208 now become adjusted and many previously vague or incorrectly interpreted inferences are now adjusted. Previous ontological structures are also adjusted to reflect new additional information. For example, the ontological adjustment might be at a superficial level of the reasoning system 202—that Ms. X is a murderer—or it could be that the notion of 'murder' itself requires redefinition. An example is the case of the movie, 'Easy Virtue,' where the act of euthanasia is eventually depicted as heroic.

With further reference to FIG. 2a, it is possible that newly situated information can appear via the outside 210. For example, the information in the previous example about a cave and carbon dioxide could appear not because it is known via outside but that it simply appears in a shift of relative ontological associations based on some newly applied situation, like an external system providing a complex of ontological information about location.

It is similarly possible that the situated information was dormant and emerged by ontological derivation based on later facts and what they prompted in ontology states 208. In this case, the channel 211 providing information from later states can function in the way just described for outside 210.

Figure 2B:
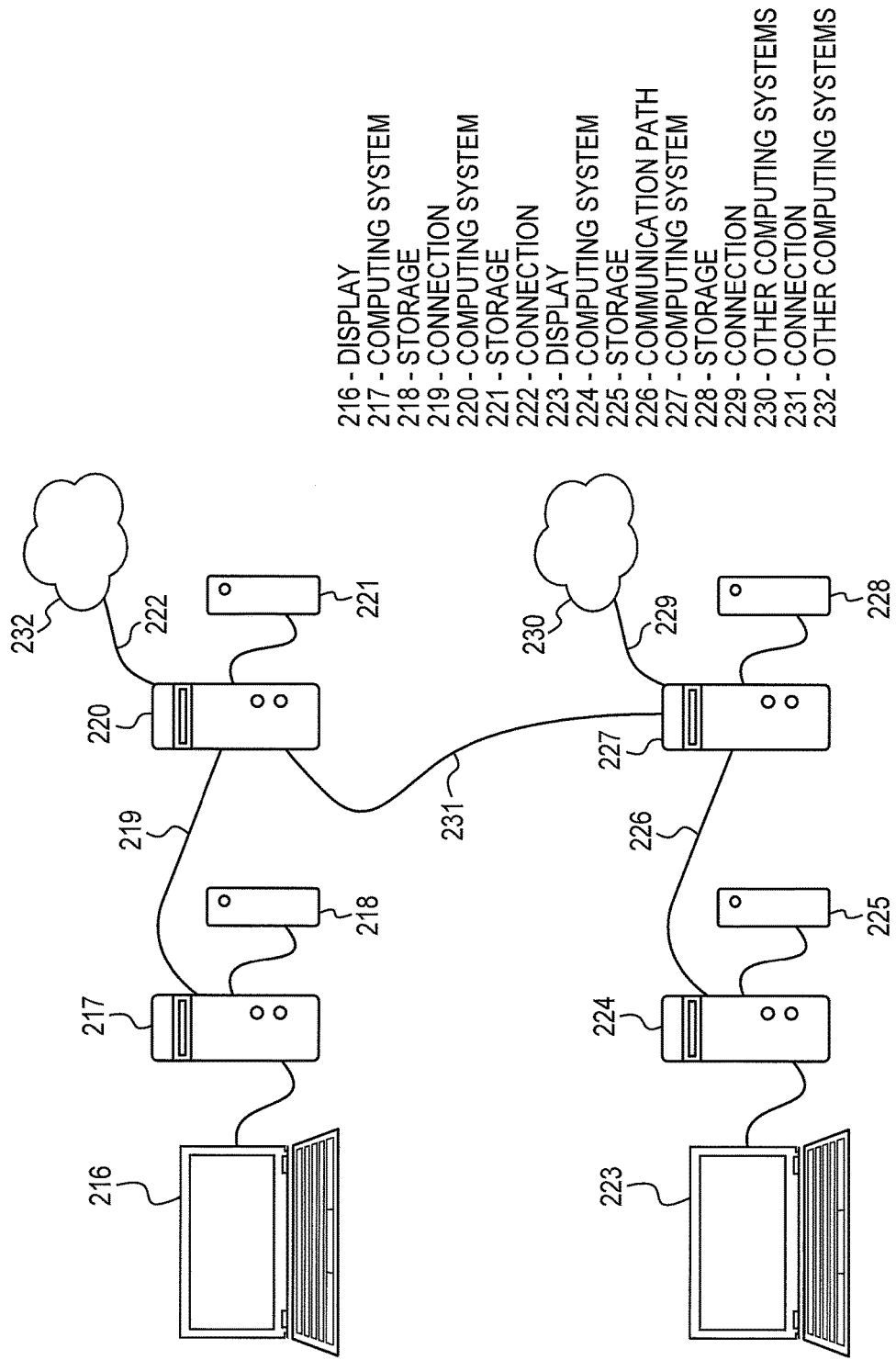
FIG. 2b illustrates a computer network according to embodiments described herein.

FIG. 2b shows the network architecture for the combined system 232 described in FIG. 2a.

A computing system 227 supports the processing of logical operations for desired results, being the component 202 of FIG. 2a. This computing system has a data store 228, wherein among other information is stored as progressive results, shown as 204, 207a, 207b, 207c of FIG. 2a. This system has a client computing device 224, connected by a communication path 226 that supports a user directing or monitoring the reasoning. The client computing device 224 stores and executes the reasoning and client interface 215 of FIG. 2a. It will have storage 225 to support its functions, and a display 223 among other interface devices. The graphical user interface of client interface 215 will display on display 223.

The computing system is connected by communicative connection 231 to the ontology derivation system 201. So far as the computing system 227 is aware, the ontology derivation system is the combination of 216, 217, 218, 219, 220, 221 and other processes and devices in the network 223.

Computing device 220 supports the processing of the ontology derivation system 201 (FIG. 2a), computing of ontology graphs computed, stored in 221 and presentation of the ontology graphs to the reasoning system 202 (FIG. 2a) residing on computing device 227 to provide meaningful interpretation to the ongoing processes of the reasoning system 202 (FIG. 2a) residing on computing device 227. Computing system 220 performs the function of ontology derivation system 201 of FIG. 2a. The communicative connection 231 supports the collaborative logical connection 203 of FIG. 2a. The communicative connection 231 need not be a direct connection as shown in FIG. 2b, and can be any known connection between two computers including, but not limited to, a connection through any computer or computers, routers, firewalls, public networks (e.g., the Internet) and/or private networks. The calculated ontology graphs and other related information is stored in 221, providing the progressive ontological state information 208a, 208b, 208c of FIG. 2a. The 'logical lookup' shown in FIG. 2a as 216a, 216b, 216c is supported by the connection 231 of FIG. 2b.

Connected to the ontology derivation computing system 220 is a modeling system 214 supported by the computing system 217, its local storage 218 and a display 216, in concert with other input devices. The combined system 216, 217, 218 supports the processing and display of the modeling system 214 of FIG. 2*a*. The graphical user interface of the modeling system 214, presented in FIGS. 7-47, are displayed on display 216.

Both the reasoning system 202 residing on computing device 227 and the ontology derivation system 201 residing on computing device 220 are connected by some effective means (229 and 222 respectively) to other computing systems, shown as clouds 230 and 223 respectively. These remote systems at least support the flows from elsewhere of pertinent information. In the case of the reasoning system 202 residing on computing device 227, this is 205 of FIG. 2*a*. Similarly, remote computing and storage system 223 support at least the input of outside information 210 (FIG. 2*a*).

The system illustrated is one example of a hardware system, chosen for clarity. The computing devices 217, 220, 224, 227 may be any device capable of performing the programmed operations. They need not have local storage 218, 221, 225, 228 as described, but have information stored by other means known in the art, including distributed stores or hard drives residing inside or outside the computing device.

Each computing device 217, 220, 224, 227 need not be discrete, instead being a collection of connected computing devices acting in unison. Similarly, computing devices 217, 220, 224, 227 need not be separate computing devices. Functions can be combined in any manner, including the functionality of one or more of computing devices 217, 220, 224, 227 being combined in one machine. For example, the computing device 217 serving as a modeling system client to the computing system 220 supporting other functions of the ontology derivation system can be combined into one computing system.

The system as illustrated shows displays 216, 213 to support human users. Either client can be directed by non-human agents controlling the process. The modeling system of FIGS. 7-47 can be displayed in other parts of the system, for example 223, or other displays for other users not shown.

Both the computing device 217 (with 216 and 218) and the computing device 224 (with 223 and 225) may be multiple systems supporting multiple collaborating users. Some elements of the system are not shown; for example computing systems 220, 227 may have user input devices similar to 216, 223, and computing systems 217, 224 may have direct or indirect connections to outside resources similar to 222, 229. Other connections may exist, for example, computing systems 217 and 224 may have direct or indirect connections similar to 231.

FIG. 3 is an exemplary method of operating the system of FIG. 2*a*. FIG. 3 illustrates the key steps involved in moving from one stored state of knowledge to another in a reasoning cycle prompted by the appearance of new information. For example, in FIG. 2*a* 207*a* and 208*a* are the initial collection at one state of facts and relevant ontology structures respectively. 207*b* and 208*b* are similar collections populated after the appearance of new facts 205 and a subsequent reasoning cycle producing another state. FIG. 3, therefore, depicts the steps by the reasoning and ontology derivation systems in such a cycle of parallel computation of reasoning and ontology derivation systems (201 and 202 of FIG. 2*a*, respectively), so that one derived ontology at one state e.g, 208*a* is changed into the next derived ontology of the next state, e.g, 208*b*. Note that all of these states are dynamic, and a change in any one, e.g., 208*c*, can trigger a change in previously calculated 208*a*.

FIG. 2*a* illustrates two levels of abstraction in the system: ontological as processed by the ontology derivation system 201 and inference as processed by reasoning system 202. FIG. 3 introduces a third level used by the modeling system 214 to derive ontologies. This third level is introduced below as the information associated with step-group 310. (Later, FIG. 6 will expand on this to introduce a fourth level associated with 610.)

In FIG. 3, the beginning step assumes that an initial ontology exists 301, however sparse. Embodiments can be built that use an external reference ontology or federated set of ontologies that do not change but that have views that are dynamically derived. Alternatively, the initial ontology or ontologies can be imported into the system with the downstream processes actually modifying the ontology.

The beginning step 301 also assumes some initial facts in step 302. These include reflexive facts about relevant situations. Necessarily, initial situations include the self-referential facts of being an initial situation, and being handled by the system.

Step 301 is processed on the computing platform 220 of FIG. 2*b*, performing the operation performed by the ontology derivation system 201 of FIG. 2*a*, fed by 212 and 210 if externally supplied.

Initial facts and facts about situations 302 are tentatively interpreted by the current state of the ontology 301 as presented by the system. Using adaptive rules within the modeling 214 and ontology derivation 201 systems internal representations of situations are derived 303 and stored in 208*a*. These use a distinctly separate modeling and computational paradigm supported by the modeling system 214 designed to accommodate dynamics that normally elude reasoning systems. These special objects and their dynamics of 303 and 307 are described in later FIGS. 7 through 47. They also are stored in 208*a* of FIG. 2*a*.

Figure 5:
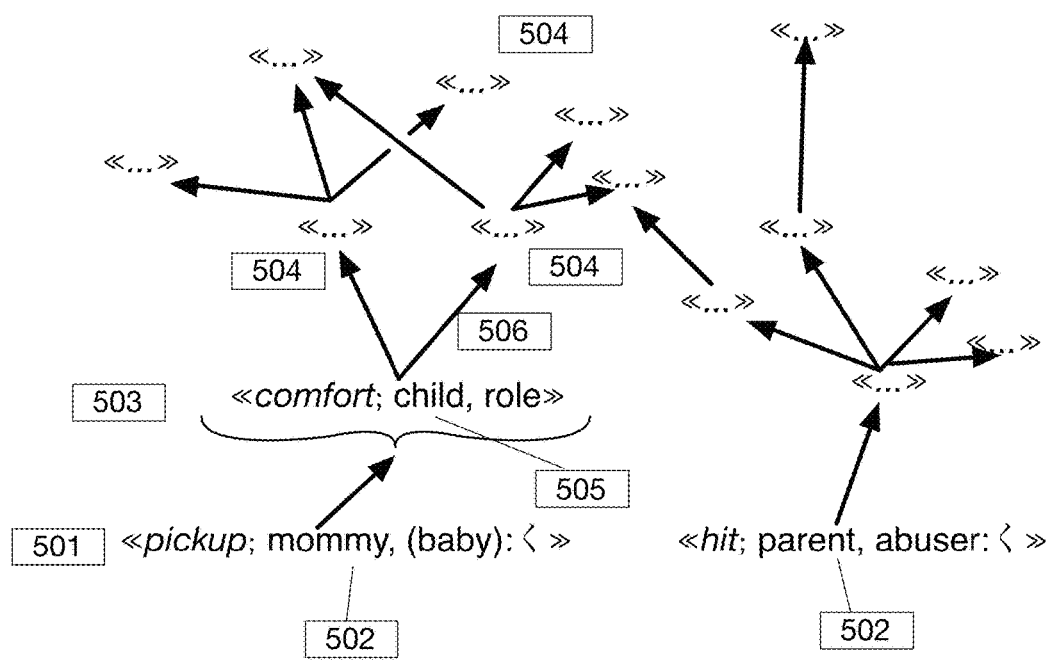
FIG. 5 shows example ontology graphs used by the systems and methods described herein.

These objects and dynamics are applied to the then current state of the ontology 301 to present a view of the ontology to the reasoning system. This view is a derived ontology graph 304. In the described embodiment, the derived ontology graph as described in FIG. 5 is the central result of the ontology derivation system 201.

FIG. 3 is organized in three step-groups. Step-group 311 is comprised of steps 301, 304 and 308 which are steps producing results that can be visible to a user or reasoning system. An example of a user in this context is the reasoning system 202 of FIG. 2*a* in the computing system 217 and display 216 of FIG. 2*b*. Steps 304 and 308 produce and adjust structures, e.g., ontology graphs, that resemble ontologies and can be used as ontologies. The nature of these structures is described in further detail in FIG. 5. At this point, it is sufficient to know that when seen by a conforming reasoning system, they play a traditional role as ontologies. Like a traditional ontology, their purpose is to provide an interpretive reference structure, but unlike a traditional ontology, they modify according to the implications of new information as it comes in.

The steps in step-group 310 perform the operations involving the modeling system 214. The steps in step-group 310 are executed on the computing device 217, using the display 216 and stored on disk 221 of FIG. 2*b*.

The steps in step-group 311 perform the operations involving ontology derivation system 201. The steps in step-group 311 are executed on the computing device 220 and stored on disk 221 of FIG. 2*b*.

The steps in step-group 312 perform the operations involving reasoning system 202 (possibly with reasoning client and interface 215). The steps in step-group 312 are executed on the computing device 227 (possibly with 224) and stored on disk 288 of FIG. 2b.

The ontology graphs of step-group 311 contain information that supports their role as ontologies when seen from the reasoning system. They also contain additional information not present in normal ontologies, information used to inform the mechanisms of steps 303 and 307. This additional information in an ontology graph is used by the system, in concert with other information to be described, to re-derive the ontology graph as shown in FIG. 3. The cycle of operations from one ontology graph to another constitutes one 'cycle.'

Each cycle creates another version of the sequentially produced states. The first three of these are shown in FIG. 2a as 207a, 207b, 207c, in concert with 208a, 208b, 208c. These extend to as many such states as required.

Each cycle additionally recomputes a new version of ontology graphs of prior states. For example, the third cycle of the step-groups of FIG. 3 will reconfigure the ontology graphs of 208a based on the structure of 208c.

Step-group 310, comprising steps 303 and 307 are steps that generate and maintain key information and functions used to modify the ontology graphs. This key information is created and managed by the ontology engineer using the modeling system 214 of FIG. 2a. The modeling system 214 has a graphical user interface system used by the ontology engineer. This graphical user interface and modeling system 214 is described in FIGS. 7 through 47 and displayed on the display 216 of FIG. 2b. As depicted, these structures depend on information from other steps in all step-groups, as well as past states of the system.

The steps in step-group 310 modify the ontology graphs of step-group 311 and that in turn modifies the interpreted semantics of step-group 312.

Step-group 312 comprises steps 302, 305, 306 and 309, which are steps associated with a reasoning system such as 202 of FIG. 2a executed on the computing device 227 (possibly with device 224) of FIG. 2b. Some embodiments will have this reasoning system be developed by others and integrated into the system by a programming interface. Other embodiments will have specially designed reasoning systems that are more deeply integrated in the system and which take advantage of some of the aforementioned additional information in the ontology graph. This additional information can be accessed by suitably structured reasoning systems to accept knowledge of many relevant but implicit situations, and present them as facts.

The reasoning systems of some embodiments may be built to take advantage of additional structure in the ontology graphs beyond simple interpretation. These reasoning systems will have enhanced ability to reason over situations.

An example is that a simple reasoning system, typical of the current art, is not capable of self-aware reflection, because it cannot reason about the situation in which it exists and is performing its tasks. But the step-group 310 manages situated information of this type and can present some of this as facts in the ontology graph. Because they are now facts and not situations, they can then be accessed by the reasoning system thus: "it is a fact that I exist and can reason in such and such way."

Other possible embodiments of the invention keep this additional information hidden because of the limits of the reasoning system. It could be maintained outside the system. But in that case those reasoning systems will still be more powerful than without the explicit self-awareness because of the work performed in step-groups 311 and 312 but largely invisible to the reasoning system. This is because the ontologies still dynamically adjust as if there were some self-awareness.

In these other embodiments, a traditional relationship between ontology an inference is used, the ontology graphs derived at step 304 (and described in FIG. 5) serving the role of ontology.

The reasoning system 202 of FIG. 2a may be a federated amalgam of reasoning systems, working together for collaborative work. Reasoning systems can be wholly computerized, wholly human, or a synthesis of the two. All of these types are candidates for a federated amalgam.

Returning to FIG. 3, an initial set of objects and dynamics is derived in step 303. These are used to modify pre-existing ontological information to produce a tentative ontology graph in step 304. Persistent stores are inherited down each step-group; for example, step-group 312 uses information created and stored in step 306 and all previous instances of step 306. Step 306 similarly uses information from step 305 and so on for each step-group.

The ontology graph in the described system is used by a single reasoning system on a single computing device 227 of FIG. 2b. In step 305, the facts that are presented to the reasoning system for a cycle of reasoning in step 302 are resituated based on the current ontological state as presented in the ontology graphs derived in step 304. Now that facts have their current meaning assigned, the reasoning system can perform the central work it was designed for, to calculate some resulting inferences in step 306, also referencing the ontology graphs.

The results from step 306 constitute new information and must be used in reconsidering the working situations used internally to generate the ontology graphs. Step 307 is where this reconsideration occurs, creating new situation-like structures as indicated (labeled in the figure as governing situations and ambassadors). These are described later in FIGS. 7-47

Next, in a like manner similar to the way step 303 generates the ontology graph of step 304, the new structures in step 307 adjust the current state of the ontology graph adjusted in step 308. Using the now adjusted ontology graph, step 309 suitably reinterprets the meanings of the information it is managing: namely inferences, their component facts and all previous states.

Said another way, every time something happens in step-group 312 (the reasoning system), there is a trickle effect powered by dynamics of step-group 310 that produce ontology graphs in step-group 311, that can have the effect of re-adjusting anything in step-group 312.

This is the cycle logically shown in FIG. 2a, where successive persistent states of ontology graphs (in 207a, 207b, 207c) provide interpretive context for successive persistent states of facts and inferences 208a, 208b, 208c.

FIG. 3 represents only one cycle of reasoning. As new facts are presented, the cycle starts over, with previous information conveyed by the loop 313. Other information in the system from step-groups 310 and 311 persists in the system by respective feedback loops not shown. If FIG. 3 represents the steps associated with a reasoning cycle shown in FIG. 2a as 207b and 208b, then the next cycle just described will at its completion produce states 207c and 208c.

Seen from the point of view of the reasoning system 202 of FIG. 2a on the computing device 227 of FIG. 2b, the process is simplified. As with any reasoning system, it has to know what the meaning of the pertinent facts are, and this is why it must reference an ontology.

FIG. 3 shows this ordinary process at steps 305 and 306. FIG. 2b shows the communication path as 231. FIG. 2a shows the logical interface as 216a, 216b, 216c. A key difference between this system and the ordinary system is that the reasoning system also consults the ontology after the inference cycle is complete at step 306 of FIG. 3. The ontology will have adjusted, perhaps significantly since the last inference cycle, and the new meaning must be adjusted accordingly in step 309.

Figure 4:
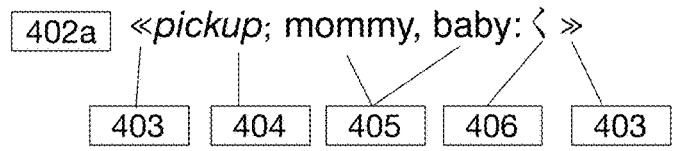
FIG. 4 shows exemplary data structures used by the systems and methods described herein.
Figure 4:
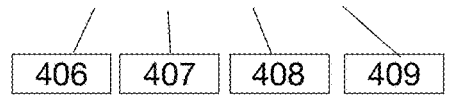
Figure 4:
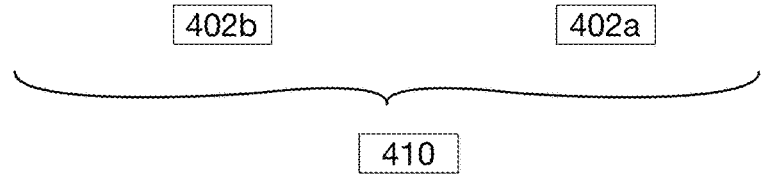
Figure 4:
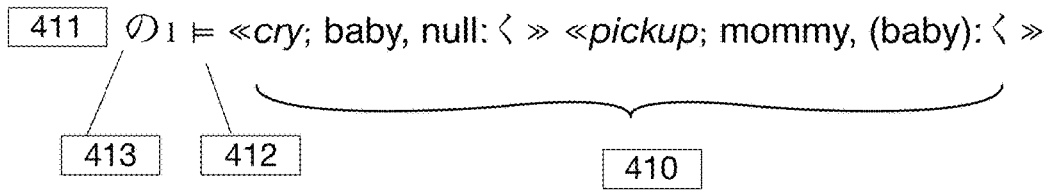

FIG. 4 shows an example of the information of the reasoning system, typical of step-group 312 of FIG. 3. FIG. 5 shows an example of the information type associated with ontology graphs, typical of step-group 311. Items 608, 609, 610, of FIG. 6 show an example of functions and categories, information typical of step-group 310. Subsequent FIGS. 7-46 focus on details of an example modeling system that creates the specific categories and morphisms 607 that derive the ontology graphs 604.

One possible embodiment not illustrated incorporates an internal reasoning system where computing devices 224, 227 are combined with computing device 220 of FIG. 2b to support reasoning system 202 (with reasoning client and interface 215) of FIG. 2a. This can be where all the reasoning occurs, or a way of federating a number of external reasoning systems using technologies known in the art, for example blackboard sharing.

FIG. 4 illustrates the internal representation of elements in an embodiment of a reasoning system 202 regardless of physically where that logical operation is executed.

Facts are represented as triples, following two well known practices.

One relevant practice is the Resource Description Framework (RDF), a set of related standards from the World Wide Web Consortium for representing knowledge such that web-related services can support reasoning systems. RDF is designed to work seamlessly with other web standards.

RDF triples are comprised of subject, predicate, and object. A simplistic example is the fact that "The mommy picked up the baby" would have the subject as "mommy," the predicate as "pickedup" and the object as "baby." A very large and robust set of existing web services and tools support all uses of this standard.

A second practice that uses a similar convention is the logical theory of situation theory. Situation theory is a theory in mathematical logic, as described in "Logic and Information" by Keith Devlin, Cambridge University Press, ISBN 978-0521499712.

Situation theory represents facts as infons which can be constructed to match RDF triples. The syntax is <<relation; parameter 1; parameter 2>>, which can be constrained to map directly to and from RDF triples. This convention is shown in FIG. 4. The term used in situation theory is 'infon,' and that is used here.

Infons are used to support all of the information stored in items 207 of FIG. 2a and step-group 312 of FIG. 3.

U.S. application Ser. No. 13/919,751, which has been incorporated by reference herein, refers to these as 'topoiesis infons.'

A version of infons called 'ontology infons' support all the ontology graph-specific information stored in states 208a, 208b, 208c of FIG. 2a and step-group 311 of FIG. 3 in steps 302, 305, 306, and 309. Ontology infons are the form of information stored and operated upon in step-group 311, comprising the building blocks of ontology graphs. Ontology graphs in turn perform the function depicted by states of 208a, 208b, 208c in FIG. 2a. They are similar to the infons of FIG. 4 and are described in FIG. 5.

An infon is a standard representation of a fact. Any chunk of information, information element or logical statement can be expressed in infon form. In the described embodiment, infons are used throughout the reasoning system, either as the normal form for an internal reasoning system, or translated into infon form if the reasoning system is an external reasoning system or systems.

The ontology derivation system can retrospectively change the internal structure and meaning of infons stored in inferred states (e.g., 207a, FIG. 2). The pathway for this is shown in FIG. 2a. Some future state of the ontology graphs stored in states 208a, 208b and so on, provide information back through channel 211 to the ontology derivation system 201. As advised by the model supported in the modeling system 214, adjustments are computed and promulgated to already-stored versions of ontology graphs in states 208a, 208b, 208c, adjusting inferences in states 207a, 207b, 207c accordingly.

This process is supported in the step-groups of FIG. 3 where step 307 recomputes all ontology graphs of all states 208a, 208b, 208c. Step 309 in turn recomputes all states of all inferences 207a, 207b, 207c.

The embodiment described herein uses infons but any suitable normal form can be employed. FIG. 4 shows an infon in informal notation 401: denoted by single carats enclosing a natural language expression. The formal notation shown in 402a consists of the following elements:

enclosing double carets 403.

a defining relation 404. The relation is between two parameters. Both relations and parameters are ontologically defined, meaning that for each element, the system has ready, persistent access to an ontological graph of logical statements that define each term encountered to some axiomatic primitives. Sanserif fonts are used for the relation and its two parameters. The relation appears in the infon first in italics.

the two parameters 405. The position of the parameters is significant. The embodiment prefers (but does not require) relations that operate from one parameter to another. Possibly they transform or nest the interpretation of parameters as described below in connection with FIG. 5. In the case of a natural language statement and its RDF equivalent, the first parameter is the subject of a statement and the second is the object. For example, the statement "the mommy picked up the baby" would have the relation "pickup" 404, the first parameter 305 as the noun "mommy" and the second parameter 405 as "baby." The relation "pickup" is tenseless because its placement in time is part of the placement in situation.

an interpretive function denoted by the Japanese character "Ku" 406. This function is assembled on the fly based on a secession of functions that capture situation dynamics. This is described in FIG. 6.

All infons are binary, having only two parameters. Any complex fact with more than two arguments can be perfectly resolved to at least one collection of binary infons. Any suitable syntax for infons can be used, including RDF; the example is only one suitable syntax. Decomposition rules are described below in connection with FIG. 5.

The Ku operator has three components 407, 408 and 409 as shown in the composing statement 414. These are denoted by suffices 1, 2 and 3. The combination of Ku operations described are not prescriptive. Many other decompositions are possible depending on the implementation domain, the categories selected and the engineering of the situation dynamics that derive the ontology graphs. In this embodiment, the first of these 407 reinterprets the infon based on what infons have come before in an infon stream that influences the present infon. If, for instance, previous infons infer that the context is sport and gifts, then this first component 407 shifts the ontology to favor the interpretation for "Tommy boxed the bat" toward a baseball bat in a gift container.

In the present embodiment, the second component 408 of the Ku function similarly reinterprets the infon, but this time based on the infons that appear later. For example, it may be revealed that the previous sports gift context does not apply (perhaps it was a dream), and Tommy is now endangered in a cave.

This phenomenon of retroactive revision is common in human interpretation, and is explored in detail in "Unputdownable: How the Agencies of Compelling Story Assembly Can Be Modelled Using Formalisable Methods From Knowledge Representation, and in a Fictional Story About Seduction." By Beth Cardier, Phd Thesis for the University of Melbourne, Melbourne, Australia, 2012. This document is also wholly included (in draft form) in filing 61/732,326).

In this case of Tommy, the interpreter retroactively reinterprets the infon. Perhaps in the interim, a great many infons after this one will have been interpreted via the first component of the Ku function, based on the initial interpretation. Therefore, the second component of Ku will trigger perhaps a series of reapplications of the first component, some of which in turn will recursively trigger applications of the second component.

The third component of Ku 409 in this embodiment comes directly from the situation dynamics to be described below, and associated with step-group 310 of FIG. 3. It similarly affects the interpretation of the infon. Some dynamics may include multiple contexts that all apply, with one governing. This is often the case with deliberate ambiguity, metaphor, poetry, irony and sarcasm—all being phenomena that are widely found.

Infons can typically be generated by two methods. One leverages natural language parsing techniques to map concepts to infons as indicated in FIG. 4 in the transition from 401 to 402, producing an infon structure that is human readable. This is illustrated by the transition from 401 of FIGS. 4 to 402*a*. Not all infons will be easily understood by a human reader. A preferred embodiment will use a type system and translation methodology to maximize this readability so that even though the notation is formal, the tokens can be human-interpreted.

A second method of generating infons is the interpolation of Resource Description Framework triples. This sometimes requires extensive preparation because the typical formation of an RDF triple assumes a closed world and a static interpretation. The embodiment allows open worlds, the open set of ontological possibilities and a dynamic semantics. So for example, information about tense needs to be split out if it appears in an RDF triple and assigned to a new triple that basically records the situation of placement time associated with the source RDF.

This effect is apparent in infon 402*a*. The relation 'pickup' is tenseless. The situation regarding whether the action is in the future, present or past is assigned via the then-current ontology graph.

This method of infon generation can leverage the substantial number of tools, existing ontologies and studies on description languages coming from the Semantic Web community. Translating information of many kinds into RDF triples is known practice in the art and supported by many tools. So this path serves as a general method of integrating any reasoning system.

Users can manually create infons as well, and this is supposed in the case where a user employs a compatible user interface. The user can enter a new or derived fact, even one that references a situation, and have it be accepted via step 302 of FIG. 3 just like any other fact.

A feature of the invention is that an embodiment may itself be coded using just infons. In this case, the relations 404 of infons that represent code are functions in the programming sense and the parameters are parameters of the function, either two operands, or a source and target. In this way, the system can be fully reflexive and modify itself.

Infons can represent facts, collections of facts and inferences or results of transformative processes. An infon can also hold a token for a situation. When browsed by human or automated process, they can be expanded to their constituent infons and then, as earlier described, the ontological graphs can be traced. Therefore, each element in an infon represents a terminal node in a possibly very large infon graph structure. This is shown in FIG. 5.

An important feature of embodiments described herein is that the step-group 310 of FIG. 3 dynamically maintains the links that construct this ontology graph in the steps indicated in step-group 311 of FIG. 3 which in turn is executed by the reasoning system 202 of FIG. 1.

In conventional notation of logic, an inference or predicate expression may consist of facts connected by logical connectives. For example in the expression: "<all men are liars> AND <Tom is a man> THEREFORE <Tom is a liar>", "AND" and "THEREFORE" are logical connectives. The embodiment can support a very broad class of connective types sufficient to cover any encountered situation, real or fictional. These connectives are subsumed in the Ku function.

The embodiment constrains the logical connectives in two ways. They must define a linear logic, and that logic must be intuitionistic. The first constraint requires non-commutative connectives. The result is that the order of the facts in the expression matters. The facts-you-know (and have tentatively interpreted) constitute one of the salient situations that bear on the appearance of a new fact.

The requirement for an intuitionistic logic is satisfied automatically from linearizing the logic, in most practical implementations of linear logics. Both of these forms of logic have been well understood for decades and are well known in the art. Just as it is possible to map any structured information into infons, so too it is possible to map any set of codable operations into a linear, intuitionistic system by means known in the art.

FIG. 4 shows a statement 410 consisting of two infons 402*a*, 402*b*, capturing the two phrases "the baby cried" 402*b* and "the mommy picked it up," 402*a* respectively. These two phrases are well understood as test phrases for situated reasoning. They were first presented in "The Baby Cried, The Mommy Picked It Up'" by Harvey Sacks in 1992 and were recast in the context of situation theory in "Language at Work," by Keith Devlin. CSLI Publications. 1996.

In this case, the reader can assume the connective is of an "and-then" type. In the case of the second infon being placed in the same statement and after the one that preceded it, the identity of "it" will be weighted toward "baby." This is indicated in the infon with parenthesis thus: "(baby), showing that the assignment of "baby" to it is situationally derived.

The semantic interpretation of elements in infons is normally not explicit. The user will need to consult the relevant ontology graph which serves the traditional function of an ontology. But in the case of indefinite pronouns, the notation captures the inferred (but tentative) substitution of "baby" for "it."

410 shows only two infons but the expressions can be arbitrarily long. Also, 410 shows a strictly linear appearance, but complex branch structures and networks can be supported. These can be graphically displayed to show parallel non-dependent expressions or presented linearly with "while" type connectives.

The first infon 402b of 410 illustrates one artifact of enforcing the two-parameter rule. The statement has no second parameter, so is populated with a null designator.

FIG. 4 further shows a fully situated statement 411. It consists of a statement 410 comprising a combination of connected infons (e.g., 402a, 402b). The two other elements are a 'turnstile' relation 412 which discriminates between right and left hand sides, and a token 413 denoting an object such as used in step-group 310 of FIG. 3.

As with the Ku function, Japanese (hiragana) kana characters are used to denote types native to the derivation system. When they appear in these situated statements 411, they can be read as 'situations.' This situated statement 411 can be read alternatively: "the situation on the left hand side of the turnstile 412 is supported by (or partially defined by) the structured facts on the right of the turnstile;" or "the structured facts on the right of the turnstile 412 are interpreted within the situation on the left."

These situated statements 411 form the basis of the ontology derivation system. The objects on the right are those native to step-group 312 of FIG. 3. The objects on the left of the turnstile 412 are those native to step-group 310 of FIG. 3.

FIG. 5 shows an exemplary decomposition of a semantically situated infon 501. (The infons of FIG. 5 are functionally identical to the infons 402a of FIG. 4.)

The figure schematically shows part of an ontology graph assigned to one of the parameters, "mommy." When the infon 501 needs to be interpreted by the reasoning system, it will import the structure of its entire associated ontology graph. For example the parameter "mommy" may appear with the anchor of its ontology graph as the infon that represents "<a role that comforts children>." This is illustrated in the example ontology infon 503. Note that ontology infons in this example do not have an associated ku function of infons (native to the reasoning system) because they are not a direct constituent of the information being examined.

Ontology graphs are highly changeable and the root ontology infon 503, nearby ontology infons 504 and their connectives 506 are derived by the system based on dynamics known to the derivation system. FIG. 5 shows only one instance, one state of such a graph. In this figure, the state is one in which the reasoning system assumes that the "mommy" who picks up the baby is doing so in the role of someone who comforts children.

Ontology infons deeper in the graph may include less immediate but still essential information about women, mommies, mothers, parents, parent-child relationships and so on.

An embodiment is possible that linearizes the ontology graphs and captures the ontology relations, here shown as arrows, as ku functions. In this case, ontology infons will be identical to infons. In this case, the graphs can be expressed in the form 410, allowing for computational efficiencies once in the system. Such an approach is required in the previously mentioned case where the entire system is stored as infons.

The use of RDF, structured tools and ontologies allows ontology infons to be stored as shown in FIG. 4, where each of the three internal components has a definitional expansion as other ontology infons.

These expansions continue either until they exhaust the ontology by ending at axiomatic primitives, by terminating at a detected circularity of by reaching a user-defined depth of definition. This definitional depth can be determined arithmetically by the number or depth of arrows 506, the number of nodes in the expanded tree or graph, or some compound evaluation that may employ ontological metainformation not shown in FIG. 5. The resulting structure is the ontology graph for a given infon.

Such ontology graphs can be quite large. As situated influences change, these graphs can be modified in profound ways, in turn having profound implications on information in the reasoning system.

Note that infons in the ontology graph will be shared by other infons in the reasoning system. For example, FIG. 5 also shows an infon that may be known to a human reasoner, related to the fact that some parents hit their children.

When a human reasoner gets the two pieces of information: "the baby cried," and "the mommy picked it up." The default interpretation is that "it" is the "baby," the mother is picking it up in response to it crying and with the purpose of comforting it. The management of situations in the human mind does something like ontology graph derivation, adding extra meaning to these two bare statements.

Now suppose a third piece of information is suddenly received: "the mommy hit the baby again." A human reasoner will go back in memory and re-adjust what they previously assumed. Now the default interpretation is that the baby is crying because the mother hit it, and in an abusive pathology, she is assaulting it again.

The ontology derivation system performs this sort of reinterpretation by shifting elements in the ontology graph, changing weights and performing other complex operations as described in later figures. The shifts of elements in the ontology graph are in part caused by including new reference situations. As noted, some of the history of these operations can be attached to the ontology graph for access by specially designed reasoning systems.

The derivation system can be embodied using set-theoretic abstractions and functions as disclosed in U.S. application Ser. No. 13/919,751 filed on Jun. 17, 2013. Alternatively, it can be embodied using group-theoretic abstractions and functions as disclosed in U.S. application Ser. No. 13/290,439 filed on Nov. 7, 2011.

A preferred embodiment uses abstractions and methods from category theory. Category theory is a well developed area and has been applied in many domains. In particular, it has been applied in situations where logical structure needs to be understood and modified. It has also been applied as a foundation for a programming paradigm known as functional programming.

The embodiment employs both category theory and functional programming using tools and techniques that are well known in the art. In particular, the extraction of logical structure into categories via the notion of logical topology on well formed expressions is widely practiced. The infons of FIGS. 4 and 5 and the linear intuitionistic rules of composition provide an extraordinarily well ordered basis for this extraction.

Somewhat related is the fact that the dynamics of the derivation system map well to categories and category operations in a manner that is straightforward and codable by a number of mature functional programming languages.

The design of the embodiment illustrated in FIGS. 2a, 2b and following employs these basic notions:

All of the dynamics of the system are cast in the context of operations in situation theory.
Some nuanced definitions of situations internal to the derivation system are devised as necessary to model the dynamics. These are not necessarily visible to the reasoning system.
All situations are modeled as categories, including the situation-categories directly extracted from infon statements.
All situations are captured as components of an extended definition of a narrative, exploiting the linear nature of the expressions and the episodic nature of new information.
All derivation operations are performed as morphisms between categories. (The distinction between morphism and functors is discussed below).
All such morphisms are implemented in a functional programming language.

Each of these notions can be readily handled by someone skilled in the art. A novelty is in composing them in this manner.

FIG. 6 illustrates the abstraction levels in the system. It relates to other figures in the following way: FIG. 2a illustrates the logical components of the system. FIG. 2b illustrates the physical components. FIG. 3 illustrates the primary steps of a processing cycle producing states of the system.

FIG. 3 is divided into step-groups. Steps and step-groups have previously been mapped to logical and physical components. Step-groups 310, 311, 312 also map to basic abstractions used in the system. Step-group 312 uses abstractions illustrated in FIG. 4. Step-group 311 uses abstractions illustrated in step-group 312. Stepgroup 310 uses abstractions illustrated in FIGS. 7-47.

FIG. 6 shows how all these abstractions relate.

Concerning FIG. 2a:

Situationally interpreted knowledge 601 is the knowledge generated at each state of the successive states (e.g., 207a, 207b, 207c) by the reasoning system 202 (possibly with a user at client 215). Dynamically derived ontology graphs 604 are the ontologies generated at each of the successive states (e.g., 208a, 208b, 208c) by the ontology derivation system 201 (with the modeling system 214). Categoric dynamics and morphisms 607 are the structures generated at each successive state (e.g., 208a, 208b, 208c and so on) to produce the ontology graphs at those states. Dynamics modeling method 610 is the collection of principles that are implemented by the modeling system 214 and described in FIGS. 7-47.

Concerning FIG. 2b:

Situationally interpreted knowledge 601 is that computed by 227, possibly with computer 224 and stored in local storage 228. Dynamically derived ontology graphs 604 are the computed product produced by 220, with the aid of 217. Categoric dynamics and morphisms 607 are the computed product of 217, the modeling system client. The abstractions of the dynamics modeling tool and method 610 are what is displayed and engineered on the display 216 to support the modeling client 217. The abstractions of 610 are described in FIGS. 7-47.

Concerning FIG. 3:

Situationally interpreted knowledge 601 is the information used in step-group 312. Dynamically derived ontology groups 604 are the information used in step-group 311. Categoric dynamics and morphisms 607 are the information used in step-group 310.

The dynamics modeling tool and method 610 is the previously mentioned fourth abstraction not explicitly shown in FIG. 3. It is the set of abstraction, described in FIGS. 7-47 that are used to compute the abstractions of level 607 and in turn those of 604 and 601.

The goal of the system is to produce correctly interpreted facts and conclusions 601 as received and generated 602 by a reasoning system. These are the logical objects 410 of FIG. 4.

This occurs by the application 603 of dynamically derived ontology graphs 604 that provide all the semantics of the system. The ontology graphs 604 are dynamically generated from a general ontology, reference ontologies and other information 605 by the mapping 606 of categoric structure from a tailored collection of categories and morphisms between them 607 designed to accurately produce the ontology graphs 604.

These in turn are generated by an expert or expert system or combination of both in a modeling process using a method and tool 610 as described below in FIGS. 7-46. This model is applied to candidate categories, functors and morphisms 608 to produce 609 the mathematical objects that will project the desired effect. These mathematical objects are the same as 413 of FIG. 4.

An important technique is that used in embodiments of the invention is the Curry-Howard correspondence, which proves that any well formed set of related categories can be directly mapped to functional programming code. Example functional programming languages are Lisp, Haskell, Clojure and Scala.

The categories and morphisms that are generated by the modeling method 610 are mapped to code, which in turn at 606 acts to produce the ontology graphs 604.

Figure 7:
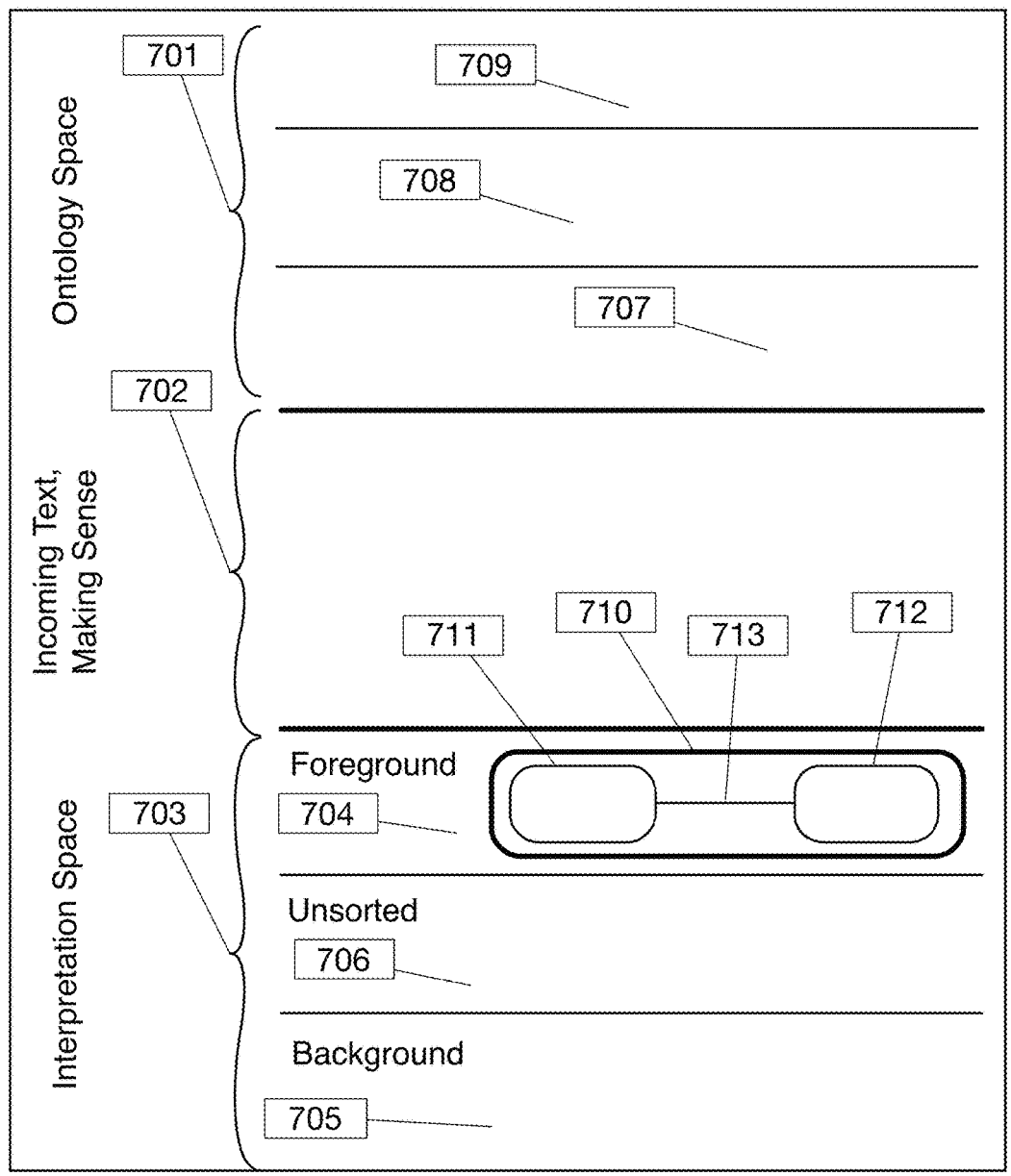
FIG. 7 shows portions of a graphical user interface according to embodiments described herein.

FIG. 7 illustrates basic zones and elements of a modeling system graphical user interface shown on the display 216 of FIG. 2b, providing the logical services shown as the modeling system 214 of FIG. 2a. It is the system that controls step-group 310 of FIG. 3 to produce the ontology graphs of FIG. 5. The modeling system illustrated in FIG. 7 and successive figures uses the abstractions of 610 of figure as described in the drawings 7-47 to manage the abstractions of 607.

The modeling system is described in detail in "Unputdownable: How the Agencies of Compelling Story Assembly Can Be Modelled Using Formalisable Methods From Knowledge Representation, and in a Fictional Story About Seduction." By Beth Cardier, Phd Thesis for the University of Melbourne, Melbourne, Australia, 2012. This document is also wholly included (in draft form) in filing 61/732,326. Diagrams therein describe an embodiment that uses both color and animation to present and engineer the model. The document contains versions of the FIGS. 7-36 in color and in videos that illustrate the progressive dynamism. That document uses the term: 'story ontology' for what is described here as 'derived ontology graph.'

The modeling system of 214 in FIG. 2a and interface displayed on 223 of FIG. 2b models the infon expressions, for example 410 of FIG. 4, as narrative statements. Therefore, an equivalence exists between a sequence of facts and a story or a story, and also between text and facts. Regarding the model described below and in the cited PhD dissertation, 'story' is the term used for 410 expressions and 'text' is used for 'facts.'

That modeling system 214 has a graphical syntax that uses time as a horizontal axis and significant zones along the vertical dimension of a canvas. The basic object is a rectangle. Relationships and attributes are captured by rounding of corners, placement on the canvas, enclosure, and connectives as lines and funnel-like shapes. In alternative embodiments, color, other styles, animation and higher dimensions may be used to enhance the usability of the interface.

The model syntax as described is closed to the world modeled, meaning that the modeler has no visibility into the larger system. This is because what is being captured are dynamics that by definition are not well handled by a conventional reasoning system.

The sequence of facts is modeled as a story, facts appearing incrementally. The model is optimized for three features of the dynamics:

Non-explicit agents that affect meaning but that are not directly apparent in the source story.
Causal succession, meaning the sequences of what causes what by agents including those noted above. This included possible inferred causal outcomes.
Unexpected structures.

Notions of governance appear in two instances: governing ontologies and background/foreground (context/agent). The former is displayed in an upper zone on the canvas and the latter in a lower zone.

FIG. 7 shows the model canvas with three zones 701, 702 and 703. This forms the canvas of a user interface for a modeling system 214 of FIG. 2a to control the tasks described by step-group 310 of FIG. 3. The model itself uses the abstractions of 610 of FIG. 6, controlling the mathematics of 607 that via ontology graphs 604 (and shown in FIG. 5) influence the interpretation of infons 601 and 410.

The bottom zone of the canvas is the 'interpretation space' 703.

The features of the interpretation space are established in relation to two parameters: background (context) and foreground (agent). Agents emerge from the background by virtue of their unexpected features, facilitating transitions between situations, and in the process creating an impression of causal succession of situations.

This activity is recorded in the bottommost area of the graphical model where two situation bands represent the parameters of foreground 704 and background 705. Objects from the general ontologies and local reference situations are placed within these bands, where they are managed by a new, higher-level operator called 'governance.'

Governance is a term devised for embodiments of the invention, being a form of influence that can be exerted by an object over others, modifying their associative priorities towards its own. This unique form of imposition makes it possible to perform the functions mentioned above, with diverse situations modified towards each other's structures.

Governance is thus the device that makes it possible to accommodate aspects of divergent general ontologies in the model, in spite of potential barriers to conceptual transfer between different situations whether they are general ontologies, story ontologies or contexts. In the method and system, such differences are not a barrier, because governance can manage multiple contexts.

'General ontologies' in this are conventional ontologies.

The interpretation space records which entities in a story are agents and which are context, and can then change these attributions, even if they are non-explicit. The features that enable these shifts also facilitate the assembly of an ontology graph.

The theoretical basis comes from narratology, which does offer some description in regards to the way agents emerge from a 'background' but its approaches do not extend as far as this model. There is also no consideration of how agency is attributed using these parameters in narrative theory, or how unexpected elements are formed.

The model displayed in the modeling canvas of FIG. 7 graphically links general ontologies and ontology graphs, focusing on the way governance facilitates transitions between them. Simultaneously, it builds the mathematical structures 607 that computationally perform 606 the same logical functions A typical use scenario would have a user in front of the modeling system 214 of FIG. 2a. A reasoning system 215 may be automated in this example. The user of the modeling system 214 is manipulating structures in the model of the modeling system 214 to allow the (in this example) automated reasoning system to fully understand the story.

In the context of FIG. 3, the user of the model is determining and structuring components as described in FIGS. 7-46 in step-group 310 so as to affect interpretation at successive states of 309, being the knowledge resident in the reasoning system.

In the context of FIG. 6, the user interacts with the model of the modeling system 214 via the interface described in FIGS. 7-46. That user creates the structures of 610, with the effect that intermediate structure 607, 604 is generated internally to produce situationally interpreted knowledge 601, that at any time can be seen by a user of 215, as situated infon expressions 411 of FIG. 4.

In other words, the modeling system described in FIGS. 7-46, supported by the modeling system 214, displays structure 610. It internally generates and manages but does not explicitly display the structures 604, 605, 607, 608, though any of the operations described in FIGS. 7-46 can be "zoomed" into to examine these structures.

The modeling system described in FIGS. 7-46, internally performs the operations 603, 606, 609 of FIG. 6. These are implicit in the modeling method supported by the modeling system 214, but can be explicitly viewed by similarly zooming in.

In creating and structuring these intermediate structures 607, 604, the notions of agent, cause and governance are central These capabilities are not simply a matter of switching the notion of 'agent' between nodes of the model, based on their linguistic structure, or building meaning from piecewise interpretations of words and phrases. Higher level interpretive structures cannot be constructed by the mere addition of one existing meaning to another to get their sum. The agencies of interest cannot be discovered that way either.

In the dynamics of system 610 of modeling system 214, no concepts are intrinsically agents, because agency is designated by the way the concept sits within the structures built by the story text. A story-specific means of identifying and tracking agency is therefore needed, in order to leverage the structures afforded by narrative.

An example of features of the model 610 is illustrated through the story: "Red Riding Hood as a Dictator Would Tell It" by H. I. Phillips from 'The Trials and Tribulations of Little Red Riding Hood,' by Jack Zipes, Routledge. 1993. ISBN 978-0415908351.

This story is chosen as an example because its text provokes the construction of new conceptual structures, and at the same time, indicates which of them are causal agents. Even though it does so in a more deliberate manner than traditional "Red Riding Hood" versions, like them it adjusts its attributions of agency as the story progresses, drawing from multiple local reference situations and their supporting general ontologies. Unlike those other stories however, halfway through this story switches its agency attributions to mostly non-explicit agents and situations. This results in a final interpretation that cannot be gathered wholly from the explicit facts in the text.

As a story progresses, semantic objects are sorted into one of two interpretive roles, as shown in FIG. 7, being the overall organization of the user interface of the modeling tool of the modeling system 214. These are: background 705, being concepts that inform the nature of the emerging story ontology and foreground 704, being concepts operating as agents within and around it.

Depending on the way a concept is used by the story, it is placed in a band that represents one of these criteria. This position determines what sort of influence that conceptual object's structure has over the interpretation of other objects, both explicit and non-explicit. When an object is influential in this way, it imparts aspects of its associative priorities to the structure of the other objects.

Graphically in the user interface of the modeling system 214 displayed on 216 of FIG. 2b, interpretation space is composed of three bands: foreground or causal agents 704, unsorted terms 706 and background or causal field 705.

This bottom band 705 records entities that form the emerging ontology graph. These concepts populate the causal universe of a particular set of facts or a story, designating what can happen. The structure of what-can-happen emerges as the story is articulated, a field of inferred associations supported by the text.

Incoming text can always potentially revise what is known about the story so far. When a new conceptual structure is identified as standing out from the existing field of associations, either because it is prominent or anomalous in some way, it is positioned in the top band, called the foreground, containing causal agents 704. These objects extend what can happen with new developments, and so are agents.

The purpose of the structures on screen that represent derived ontology graph is to encompass all agents that appear, so in the case of agency being identified through anomalous behavior, designating an object as unexpected in this way can depend on when it is observed. For this particular criterion of agency, the model uses the moment in which new text has been introduced. This is when aspects of its interpretation fall outside what is expected for the present ontology graph, but before that network has adjusted to include it.

Between these bands lies an intermediate area: unsorted terms 706, which serves a double purpose: it holds concepts that bridge the foreground and background, and can also capture terms that are emerging as significant, but have not yet distinguished which of the two other bands they belong to. In the unsorted terms situation band, the difference between a network that is bridging or pending simply depends on the number of connections to its objects. Pending objects are less connected.

The situation bands in the interpretation space are visually the same as those 707, 708 and 709 in the ontology space 701, but they differ functionally, in terms of the sort of information they can arrange, and the principles by which they arrange it. This space is further described in a later figure.

The nodes in the interpretation space have special affordances that objects in the current art do not usually have. For this reason, they are called 'ambassadors.' These are the objects used in the label of 610 in FIG. 6, standing for the totality of the complex generative structure that appears on screen. Ambassadors are fragments of conceptual networks, rather than a single concept or relation, which is the case in the upper bands. They are known as ambassadors due to the way these lower nodes stand in for pieces of larger frameworks or the interactions between them.

An ambassador looks like a node (a rounded box with a text label), and represents a section of a larger conceptual network, such as a local reference situation or a general ontology, or the product of interactions between such situations. It is the representation of a phenomenon in literary cognition, it is the sharpest of all impressions that a reader gleans from a word or phrase, the interpretive meaning that stands in for what has been read, immediately after it has been read. It therefore records which aspects of a reference structure the story has named, and the associative scope inferred by that naming. This has the effect of elevating the named aspect for special attention above other parts of the inferred situation. This interpretive anchor is represented by an ambassador.

FIG. 7 shows an ambassador 710, suitably placed in a foreground zone 704. In one embodiment, a version of the model and user interface can use color, texture and all available graphical conventions to convey additional information associated with the provenance and roles of objects and relationships. The model is intrinsically animated as new information comes in to trigger a cycle as shown in FIG. 3, to produce successive states as shown in FIG. 2a as 207a/208a, 207b/208b, 207c/2108c and so on.

The ambassador 710 in this example contains two nodes 711 and 712, linked by a relationship 713. An example that will be extended below in FIGS. 9-18 may have node 711 be associated with the value of 'wolf,' node 712 be associated with the values 'kind, sensitive qualities,' and the link 713 being a persistent representation of the generative history associated with the ambassador in prior states of the story.

After the nodes 'wolf' and 'kind, sensitive qualities' have been linked and contained in a box 710, they now operate as a single conceptual unit. Due to the way 'kind, sensitive qualities' supports 'wolf' (by a means that will be described in FIGS. 15-18) and by the inherited structure that 'wolf' gains from the traditional fairytale, this compound node is designated as an agent. It is therefore placed in the foreground situation band, which designates ambassadors as agents. In the model, ambassadors are generated in response to each new chunk of text, as the most important interpretive aspect it has inferred.

Figure 8:
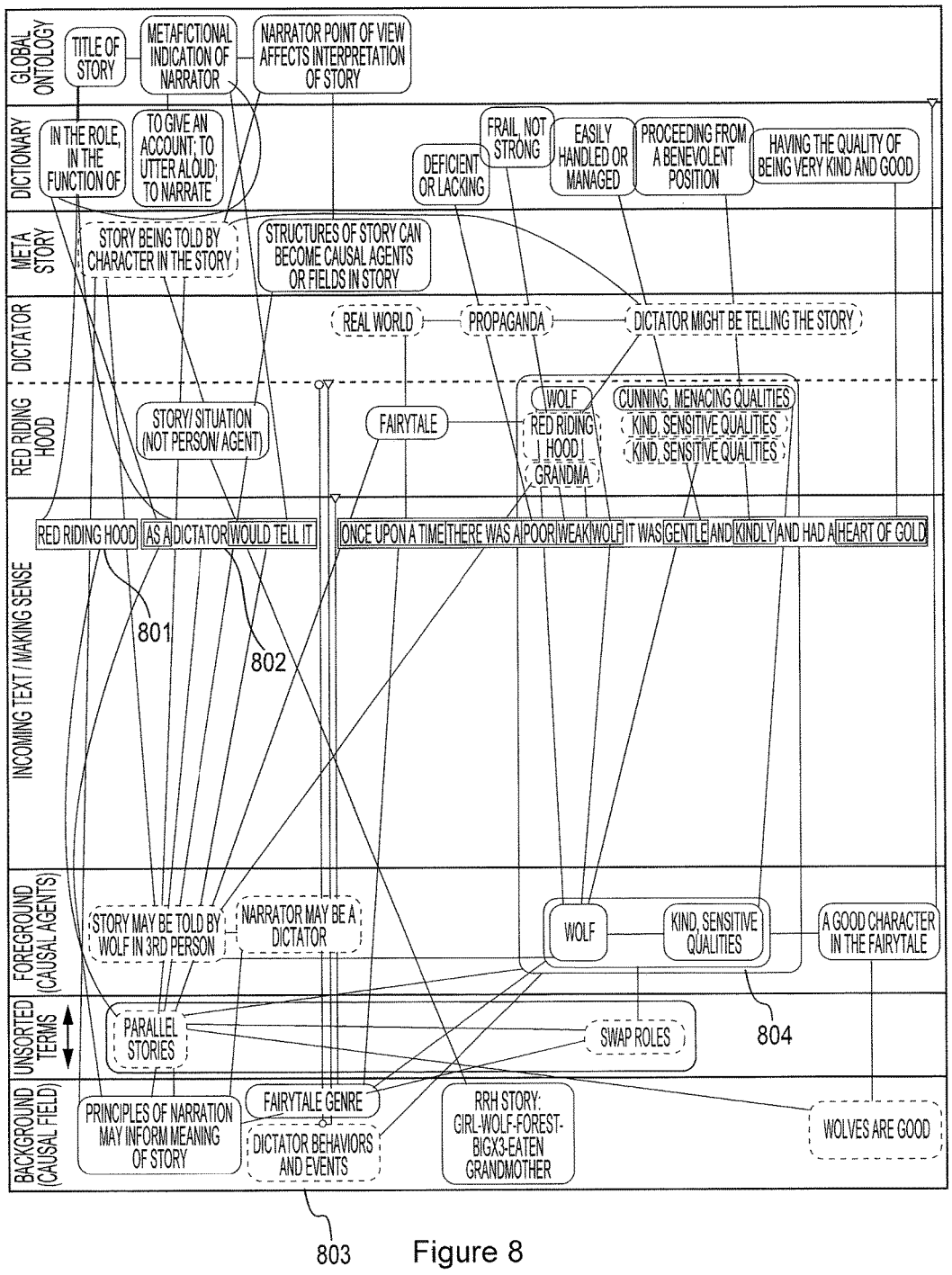
FIG. 8 shows portions of a graphical user interface according to embodiments described herein.

FIG. 8 illustrates the complex generative dynamics associated with the assignment of an ambassador as occurs in step 303 of FIG. 3 to create the structure 610 of FIG. 6. FIG. 8 illustrates the complex fabric of active and passive relationships that may be shown at any moment on the screen. All of that structure, all of the past structure that will have been displayed, and much of the projected structure (as described in FIGS. 41-46) will be relevant to how 610 controls the structures of the system, for example as presented and stored in 207a/208a, 207b/208b, 207c/208c and so on.

At the end of each cycle of FIG. 3, changes in this interpretation space and all of the associated generative operations form categories. These are the categories 607 of FIG. 6 and structures they influence.

As noted earlier, the system allows for self-reflection. A supported mechanism for meaningful self-reflection is the constraint placed on the relations between categories. Under normal conditions, categories are defined by elements and morphisms among them. Categories can be related or transformed by 'functor' relations. But collections of categories can be categories themselves if functors are coerced to also be suitable morphisms. In this way, the system can be allowed to 'see' itself. An 'engaging' system, i.e., reasoning system 202 coupled with ontology derivation system 201, therefore, exhibits an urgent compulsion to derive ontologies that make coherence out of multiple, incoherent structures.

As the story progresses, operators called 'funnels' manipulate these bricks and indeed other elements of the model, altering their arrangements. The arrangement of ambassadors is informed by the structure of the general ontologies from which they were drawn—wherever possible, their organization and modifications follow the same associations as the source. Graphically, that connection is indicated by persistent lines that join them to local reference situations in the ontology space 701.

'Funnels' are transformative operations, coded as morphisms. They have a graphical syntax and a type system (noted as 'instance' 1, 2 or 3), disclosed in later figures.

In spite of being tethered to their sources, an ambassador is also able to form or exhibit new associations that might not be accounted for by the original. This is possible due the special capabilities of ambassadors, of which there are two kinds: those that represent structure from a single general ontology, and those with a compound or newly built structure.

Existing and new connections weave between upper and lower spaces like the arrangement shown in FIG. 8. The figure is only to show the relative complexity of relationships among elements of the model; details are disclosed in later FIGS. 9-36.

In FIG. 8, attention is drawn to how ambassadors in the bottom bands are persistently connected to the upper structures, from which they were derived, as well as to each other with lines. This is similar to models in the art, but unlike those, the structures in the described method become more refined as the story progresses. For example, when the first words of the title "Red Riding Hood" 801 appear, their representative ambassador stands in for all general inferences concerning the story and character of Red Riding Hood.

When the additional words "Would Tell It" 802 appear, they indicate that it is the story that is inferred (rather than the character or history). As a consequence, that ambassador 803 immediately changes, to show the inferred scope is limited to the narrative alone. The example ambassador 710 of FIG. 7 is shown in FIG. 8 in one of the stages of the process 804.

Graphically, modifications of an ambassador's terms are reflected in changes of title. As more information is added by the story, the conceptual structure represented by the ambassador is altered further to reflect these effects (as is its title). As such, each ambassador represents a particular cluster of ideas, which refine as the story further specifies them.

Another important feature of ambassadors is that they can be persistently connected to multiple local reference situations. This mimics the way a reader connects separate ideas and contexts as the story progresses. For example, the story's description of the wolf as having "kind, sensitive qualities" joins two inferred situations: the already active Red Riding Hood situation, plus the global ontology, which contributes definitions of the descriptive terms and general knowledge about character roles in fairytales.

Over a series of stages, these two situations combine to produce an ambassador that identifies the wolf as the good character in this particular fairytale. When a node is connected to two local reference situations, it complicates the notion of inherited structure—if each is representative of a different general ontology, which associative priorities should the node inherit? If the concepts in the nodes can be combined through abstraction, they are. Otherwise, the notion of governance guides interpretation. The mechanics of governance are disclosed below.

An example of the first option is the above example in which two situations combined to produce an ambassador that identifies the wolf as a good character in this particular fairytale. In order to manage this combination, a precedent set in another area of the model applies: the instance (3) associative funnel operation, details of which are in FIG. 17

The instance (3) associative funnel operation creates abstracted 'umbrella' nodes to bridge semantic clusters. When ambassadors are connected to multiple local reference situations, the connection occurs using this operation. These 'abstraction' ambassadors represent a generalization that is a best fit between a range of factors: the parts of the contributing situations that are most salient to each other, the fragment of text that prompted their activation, and the overall emerging story ontology. These abstract objects therefore perform an important role in the connection of disparate conceptual structures.

Figure 9:
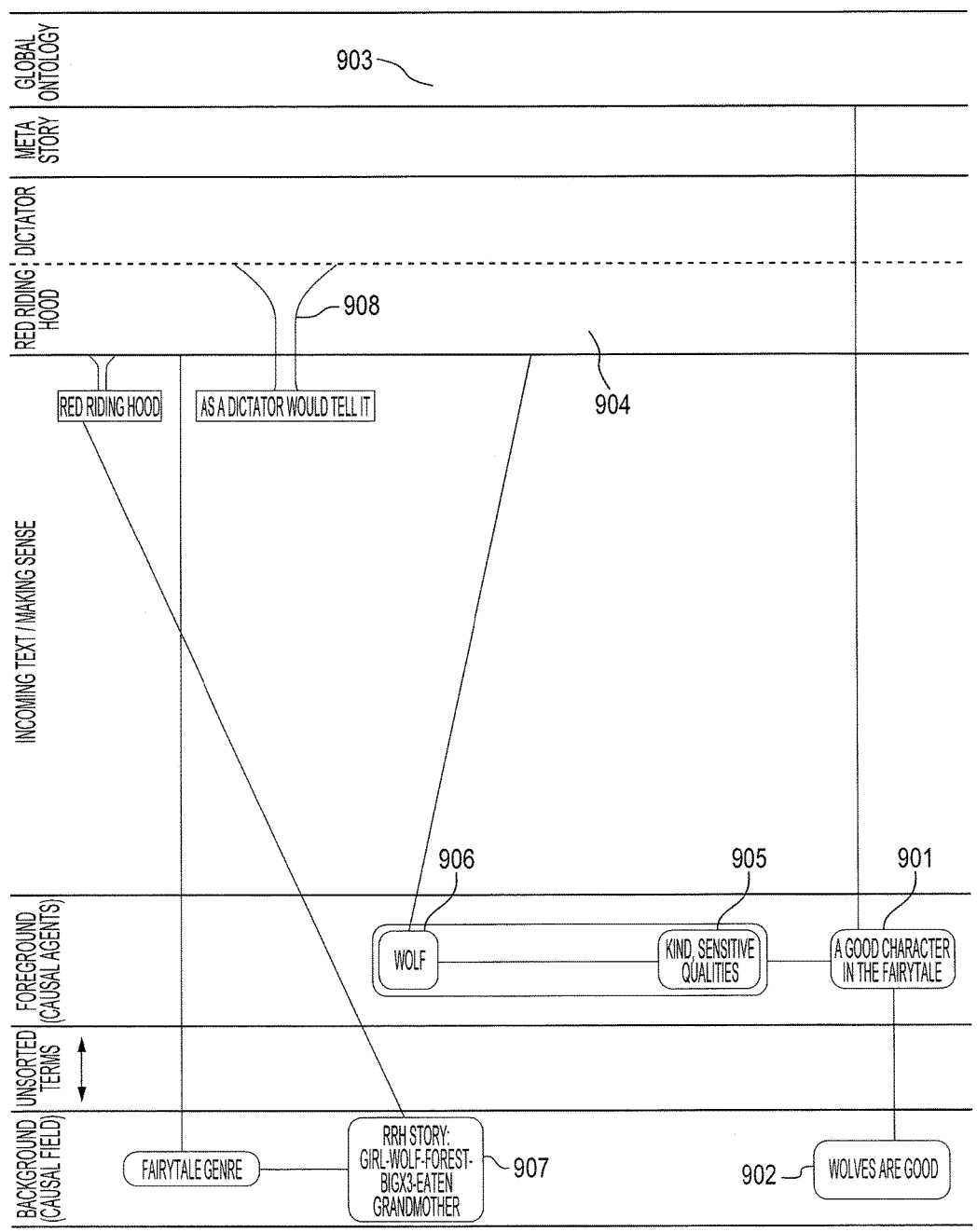
FIG. 9 shows portions of a graphical user interface according to embodiments described herein.

FIG. 9 separates out some key components of FIG. 8 to illustrate the generative process.

Of importance is how the two ambassadors 'A good character in the fairytale' 901 and 'Wolves are good' 902 remain persistently joined to their parent situations through other nodes. The ambassador 'a good character in a fairytale' 901 is joined directly to the global ontology 903, and indirectly to the Red Riding Hood situation 904, through the intermediate steps of 'kind, sensitive qualities' 905, 'wolf' 906, and 'RRH story' 907. In this way, connections with existing, diverse general ontologies, and new emerging story structure, can be demonstrated simultaneously.

Ambassadors combine into a new story ontology. They can perform one of two roles in this process. They can act as nodes, representing structure from only one source situation. Or they can act as links, and feature new associations that bridge these inherited structures. These two kinds of structure—general-ontology and story-derived—behave as nodes and links at a meta-level. In a human reader, these two kinds of ambassadors represent the distinction between already-known associative inferences and those that are newly forming from them.

As such, an ambassador can represent different degrees of development away from the structures of the general ontology to which it is connected—it can be similar or divergent. The role it plays in the story (agent or not) often depends on the degree of development from that source structure.

Figure 10:
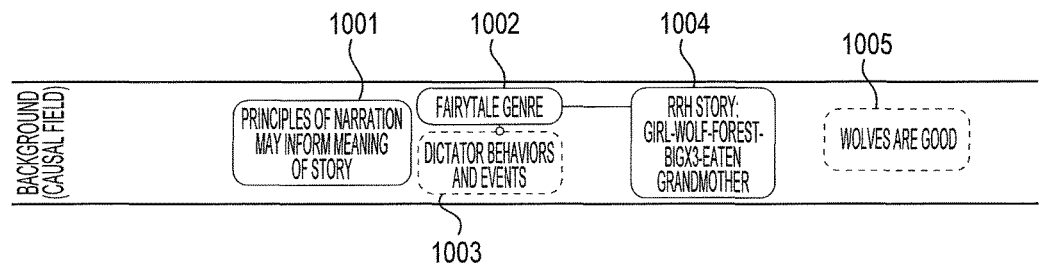
FIG. 10 shows portions of a graphical user interface according to embodiments described herein.

FIG. 10 shows an example of a row of ambassadors, each of which bear the name of the part of the network from which they were drawn. The first four 1001, 1002, 1003 and 1004 were extracted from single situations in the global ontology, while the last 1005 features new story structure.

From left to right, the first three ambassadors 1001, 1002 and 1003 carry the same titles as their parent local reference situations in the ontology space, inheriting their associations. The fourth ambassador: 'RRH Story,' 1004 is derived from a refinement of one of these situations. The final node: 'Wolves are good,' 1005 has emerged from the story structure as well as a local reference situation—it is an example of an ambassador that was abstracted from multiple sources.

In the interpretation space, the role of 'node' can be performed by any ambassador of the first kind—an ambassador drawn from a sole general ontology. This is a select piece of an existing network that operates as a discrete unit, and which by itself has no means by which to relate to other units drawn from other general ontologies.

In this sense, it can be compared to an ontology in the current art that requires additional bridging structure in order to connect to another system. These ambassadors are usually recorded in the background band, where contextual information is arranged. They can also appear in the foreground band—it is possible for any conceptual structure to be an agent in the foreground band, including entire individual situations—but it is not as common. An example of a context behaving with agency might be when the distortion of a particular genre is not simply a context for action, but actually participates in the action.

The bridging structure capable of linking these nodes is the second kind of ambassador. This ambassador behaves as a relational fragment. It usually represents only a small cluster of concepts, because it marks a single step in the building of new structure by the story. The box titled 'wolves are good' 1005 is an example of this. These 'linking' ambassadors can be found in any of the Interpretation bands. When compared to ontologies in the existing art, requiring interoperability, these ambassadors fulfill something like the role of structures that can connect elements of different general ontologies. They are more difficult to compare to these existing systems, however, as their structures are based on story-based assembly mechanisms, and nothing like them exists in the current art.

These two types of ambassador work together to construct relationships between heterogeneous general ontologies and previous instances of the story ontology using the associative structures of the story itself. Because the story ontology is built from semantics, the relations expressed by the narrative provide the material for new links. Naming a single entity brings with it clouds of associated inferences, any of which can carry conceptual structures that are incompatible with the others.

At the same time, however, the relationship between the named aspects of those situations is indicated by the way they are actually mentioned in the story. This creates a structure of both compatibility and incompatibility, which is referred to as 'tension' and contributes to the system in a unique way. While there might be no provision in general knowledge for how two particular situations might be connected, the new link created by the story provides the first suture towards achieving it. As the story progresses, it will add to this connection, constructing a bridge between the general ontologies from which it draws. This work is therefore guided by a particular feature in fiction: the way the associations of a story divert from commonly expected paths in order to transition between conceptual structures.

Graphically, this new architecture is tracked via the positions of the ambassadors in relation to each other. Even though a story-structure ambassador acts as a link, it is difficult to depict these as actually performing a joining function. In practice, story-structure ambassadors share different amounts of common structure with the general-ontology ambassadors they connect, so a more accurate representation would show overlap between them. Instead the graphical syntax is less prominent lines to connect both kinds of ambassador in a rudimentary way.

The method considers story in a particular manner: as a step-by-step transformation of story ontology. During this metamorphosis, the story indicates that a few clusters of concepts are causally significant to the transition, thus identifying them as agents.

The method indicates the distinction between agent and context. This is shown graphically with the background and foreground bands of the interpretation space. Whenever concepts are extracted from the text's inferences, the first means of classification is to determine whether they are part of the background (and therefore associative situational detail) or part of the causal unfolding (and therefore an agent).

One way that agency is initially determined is the degree of consistency an ambassador has with a general ontology that has already been inferred. As the story progresses, agency can be determined in other ways, but at the start of a story, when there are no other structures to refer to, any distinction-from-the-background provides clues as to where agency might emerge. Following is an illustrative list of some of the ways the system and method can identify the emergence of agency as the story progresses, simply through the structural arrangement of concepts.

Surprise: The agent is identifiable because it indulges in rogue, non-generic associations. In terms of the model, such activities usually require more narrative explanation, and therefore can be identified by a relative abundance of node and link attachments to the suspected agent.

Focus shift: Agency is indicated by a change of focus from an established situation to a more specific part of it. This can be indicated by any scope or subject shift. The level of detail may be the same as other descriptions, but the scope has changed, to be relatively more local than that which has already appeared.

Repetition: If an entity is mentioned briefly once, it is likely to be part of the background. If mentioned twice, there are a range of potential roles it could fulfill: it could be a more important aspect of the background; or it could be passively linked to the protagonist; or it could become an agent later in the story; or, it might be a key part of a situation that has agency. If mentioned a third time, the entity will usually be classified as an agent. By this time, it will likely govern its own cluster of satellite concepts.

Proximity of repetition: The above rule has a limit in terms of how many words or cycles the critical frequency of repetition must occur within, relative to the length of the story. The frequency is domain dependent.

Tension between inferences: The degree of tension between inferences can help elevate an infrequently-mentioned entity to the status of agent. For example, when Kafka uses the word 'insect' in the first line of "Metamorphosis," the premise and consequential activities are so unexpected against its inferred background that this concept is weighted with agency.

Governance: After a particular term has been mentioned, it accrues agency if subsequent concepts link to it or begin to follow its associative priorities.

Zooming: Agency is indicated when the story provides relatively more detail about one entity over others. In terms of the model, this manifests as there being more concept nodes and links attached to the agent than other entities.

Inheritance: In this case, the structure of the reference situation in the ontology space matters, when assessing whether the nodes connected to it have agency. If a concept has causal agency in the reference situation, and it is part of a governing situation, there is a good chance it will still be an agent when it appears in the story. An example is the 'wolf' in both traditional versions of the story and "Red Riding Hood as a Dictator Would Tell It."

The above indicators can suggest which ambassadors are candidates for agency in a story, pushing them from the background to the foreground. Conversely, if these indicators are absent, the system and method can detect that an event or protagonist is unremarkable or represented to be unremarkable. If these indicators are absent and then become present, the system and method can detect the emergence of agency, or phenomena related to the emergence of agency, such as the possibility that such indicators were concealed before that emergence. This principle is based on the way a writer is able to conceal the importance of a conceptual structure, as occurs in the style of a detective thriller.

These criteria were identified by subject matter expertise of the user of the modeling system 214 of FIG. 2*a*.

For example, some possible agents come to drive the story and others recede, and a practice-based understanding of how a concept comes to impart its associative terms, is required to model how such a transition between different conceptual structures would be managed.

Here is one way in which agents are identified. First, the anomaly would tentatively attach to a few nodes in an existing paradigm, anchoring itself to the elements they shared in common. That fraught point of connection—the shared concept—acts as a pivot. It is important that the rogue concept is linked to both systems, because a negotiation can then occur between them. As the old conceptual framework turns into a new one, the pivot represents a sole point of consistency. As it inherits a new structure, as it pulls the rest of the old system onto new terms.

An anomaly attaches to correlating features in an existing 'background.' This has the effect of elevating both the anomaly and selected background terms for special perceptive attention. The coupling becomes a fixed joint, an anchor for the tendons of conceptual transition that will seem to rearrange all other features around it. In terms of agency, the anomaly and the now co-opted background elements appear to be a united entity that are collectively central to the change, because they remain stable whilst the rest moves.

In a story, there are numerous pivotal points such as this, acting in concert to indicate how one temporarily fixed point can become the next, until the end. This incremental progress enables a user to track how one idea, entity or situation can become another. It is particularly important when the destination structure cannot be easily assumed because it contains unexpected elements. Our system and method thus enables a reader to accurately understand an unexpected outcome, by leading them through each significant step of the transformation, via a series of temporarily stable points. These pivots act as causal agents, and identifying the above structures is a key means by which our system and method identifies them.

While this accounts for some of the dominance of an agent, it is likely that an agent's significance also depends on an additional feature of the pivot described above. The transition does not only act on a node; it also acts on the entire story ontology. It is therefore not simply a conceptual fulcrum; it is also an ontological fulcrum. At each tipping point, one instance of the story ontology turns into the next. This causes the interpretive parameters shift, due to the way the anomaly prioritizes its own associative structure over those that existed before. The pivot therefore acts like a fresh interpretive lens, reconfiguring previous structures onto its terms. Such influence can occur at a range of levels and degrees, and is referred to as 'governance.' Governance is an important higher-level structure in terms of determining dominant agency in stories.

The terms 'governance' and 'governing' refer to a form of structural imposition. As many local reference situations might compete to have their structures used by the story, a method is needed to designate which take priority; governance fulfills this role. But it is not simply a prioritization method. It also accounts for the adjustments that all conceptual structures can perform on each other, so they can connect or evolve. Governance makes it possible to join multiple general reference situations, so that their combined effect on interpretation can be considered. Governance therefore also makes possible the 'situating of situations,' in which structures derived from multiple general ontologies are themselves arranged into a network, so the effect of simultaneous inferences on interpretation can be determined.

Properties associated with governance are central to how the structures displayed in the model 303 and 307 of FIG. 3 build the ontology graphs of FIG. 5.

Governance operates within the overall model in several ways. When a situation is designated as a governing entity, it flashes and is followed by an 'association-forming funnel' that indicates the region affected by it.

Figure 11:
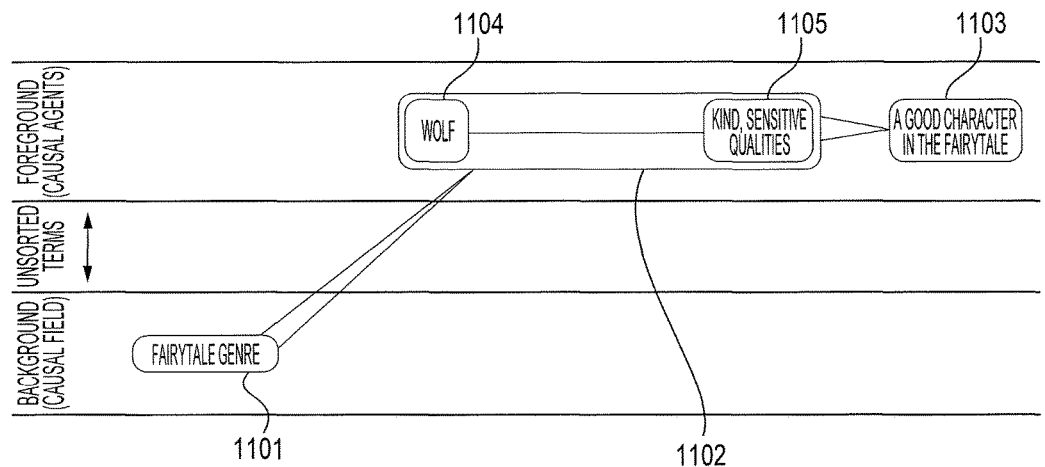
FIG. 11 shows portions of a graphical user interface according to embodiments described herein.

An example is illustrated in FIG. 11 where the situation 'fairytale genre' 1101 is acting on a conceptual situation: 'wolf with kind, sensitive qualities' 1102, to produce a new node 'a good character in the fairytale' 1103. The governed region is indicated by being encircled with an association-forming box.

Governance can operate at a range of degrees. Its most far-reaching form is the governance enacted by the final story ontology. When a new story network is complete, its associations act on the final interpretation of the entire story, retroactively imparting its priorities on all previously built structures. This can result in major, meaning-altering revisions of the entire network.

In its most local form, governance acts through an individual word, such as "Wolf," in the phrase "there was a poor, weak Wolf." Here, the words "poor" and "weak" are interpreted on the terms of the governing word, "Wolf" Their associative range thus conforms to a scope of qualities appropriate to a fairytale wolf.

Between these two extremes is the most frequently used governance operation. Every time a text chunk appears, a situation is found or created from a general ontology in order to interpret it. When this situation is found, it governs the incoming text chunk, in order to provide source structure for that interpretation. Graphically, when this sort of match occurs, the ambassador for the reference situation flashes to show its influence over the token. That governing ambassador is then persistently connected to the chunk, to record it as a source of interpretation.

The influence of a governing situation does not stop with that initial token. A range of additional follow-on effects are likely to be generated across the rest of the field, following the threads already connected to the token. When this occurs, the governing situation again flashes and is graphically connected to new elements, as it modifies their structures. Any node that is later joined to that chunk can also be influenced by its existing governing associations.

For example, in FIG. 11 it has been established that the node 'wolf' 1104 is governed by the 'fairytale genre' ambassador 1101. After 'kind, sensitive qualities' 1105 is attached to 'wolf,' 1104 the governing situation: 'fairytale genre' 1101 also applies its structure the newly coupled element. This results in the production of a new node, 'a good character in the fairytale,' 1103 as can be seen in the figure. At a cultural level, ontological situations are capable of such governing behaviors.

When situations are arranged in relation to each other, they influence each other to different degrees. That relation is not fixed, however: the strength of this influence can change as the story progresses. There are three degrees of these: non-established, mutual, and dominant/supportive.

In the case of non-established relations between situations, no graphical indicator is used. This is the default starting state for all situations; they are unconstrained by any other structure until the story builds connections between them. Once a connection is made, however, the relationship between inferences will fall into either mutual or dominance/supportive roles.

Mutually-influential relations are most likely to occur when the story infers multiple reference situations equally. This mutual influence can occur in a gentle manner, where concepts from each situation are drawn together through a gradual exploration of similar structures. This is the case in Walter de la Mare's "Little Red Riding Hood," where reference structures for the traditional "Red Riding Hood" story and a situation of a 'rural rustic setting' gradually cohere.

A more extreme example of mutual influence is a forced but equal interaction between inferences. This is the case with the Red Riding Hood and Dictator situations in the title "Red Riding Hood as a Dictator Would Tell It," where the two situations compete to dominate the incoming text, and contribute to two different possible interpretations in the process—one that follows the explicit story text, and another that does not. As this story progresses, the mutuality of the influence of these two possible interpretations is eventually disrupted so that one becomes dominant.

The most complex governance relation between situations is Dominant/Supportive. In terms of a human reader, this effect manifests as there being a key idea by which others are understood. This main idea is dominant, while the rest are supportive. Once dominance has been established, a governing situation can have a range of degrees of influence over other elements. In the most influential case, its associative networks are completely prioritized over those of another situation, effectively replacing them. This occurs when one situation is deemed to be a better match than another for a chunk of text. This is similar to the method of switching between inferential situations used in the current art in situation theory. An example is the way in which the 'Dictator' situation is deemed to have more influence than the explicit meaning of the text, which suddenly recasts the 'poor, weak' wolf as nefarious.

At the other end of the spectrum, dominant/supportive situations can act with more co-operation. An example of this is when multiple conceptual structures are merged into one entity, as in the case when the traditional "Red Riding Hood" story (in which the wolf is the villain) intersects with fairytale conventions of trusting the narrator. In the model, these features blend to form a new ambassador that combines them: "The wolf is a good character in this fairytale."

The influence of multiply-joined ambassadors is complex—before they can act as governors, the degree of participation that each of their source situations plays in their structure must be determined. This is the situating of situations earlier mentioned. It is achieved by noticing which sources have the most influence over the elements within and associative priorities of that object.

Between these extremes are a range of modification types. Briefly, some examples of other manifestations of dominant influence include:

The dominant situation can draw out elements in the supportive situation that are most similar to it.

The dominant situation can alter elements in the supportive situation that are most similar to it, and link to those.

The dominant situation can modify the terms of the supportive situation, in order to link to it.

A common factor in all these instances is the way governance can 'modify.' In the example model, any conceptual structure can impose its influence, not just the literary style of a text. Governance concerns the relationship between many situations simultaneously, located across an entire story, so the model captures a situation's ability to modify structures so they can be bridged, allowing new relational structure to be created through bridging abstractions, and the distortions of governance.

Given its capabilities of bridging and modification, governance is an important aspect of interpretation, in terms of causality. Two notions are correlated, in order to describe causal transition: the way governance can transfer structure between situations, and a notion of causal carry-over from cause to effect carrying partial persistence as well as change.

Causal agency is defined as a special kind of constraining operation. A causal agent is a situation that manages the rearrangement of other situations, and, in the process, changes the associative priorities of them. This enables the tip between causal states where all the objects similar to the first are followed by objects similar to the second.

Here, the governing situation takes one derived ontological structure in which its objects are 'similar' to each other, in that they share the characterization of a particular context, and transforms them so they are in some way reflective of its own derived ontological structure (and therefore become 'similar' to each other via another contextual characterization). This description of causal agency enables the definition to include both the sort of agents usually identified by narratology, such as characters and events, as well as higher levels of structure, such as the situations of a story ontology.

The devices that indicate agent candidates are: surprise, focus shift, repetition, proximity of repetition, tension between inferences, governance, zooming and inheritance. For example, when looking for a repeated use of entities, it is the repeated governing behavior of entities that reveals dominant causal agency. Whenever a zooming of focus is detected, it is the zoom that accompanies a shift in governing terms that matters. When a situation accrues other concepts as supporting entities, it is the degree of influence that the combined edifice has over structures across the whole story ontology that determines how causally central it is.

The situations that emerge as the overall dominant causal agents are therefore those that contribute most to the transformation of the entire story ontology, from beginning to end. Agents are designated as causally central when their associative structure has the greatest influence over the whole text's interpretation. Their relationship with other candidates is measured according to the degree to which the others' governances are surrendered to them. Particular conceptual structures thus emerge as consistent guiding terms throughout the story, as they vie for dominant governance, until it is eventually established.

Governance thus indicates causal agency as part of its role in the construction of the story ontology. It controls the way ambassadors bridge disparate elements of source inferences, making it possible for fragments of diverse situations to be connected. By allowing the imposition of structural priorities, governance enables a tip from one situation to the next, preserving some elements and pulling the rest onto its terms, in a manner that can imitate causal unfolding. When situations are not readily reconcilable, it imposes modifications or manages the creation of abstractive nodes so that links can be made.

Governance is therefore a central factor in accurate contextual interpretation. When determining the meaning of a real-world entity, the concern is not only limited to one context. In stories, interpretation depends on multiple referential situations and the relationship of their supporting ontologies with each other. It is a network that shifts its arrangements, as more information is introduced, or another situation emerges. These transitions are managed by conceptual structures that can be non-explicit or unexpected. Governance is the mode by which such conceptual structures are managed, designating some as agents, and informing the impetus of inferences towards the final story ontology.

An illustrative example that demonstrates the dynamics displays the conceptual structures built by the first few lines of the story "Red Riding Hood as a Dictator Would Tell It," the case used throughout the FIGS. 7-36.

Examples 1 and 2 concern a sequence of operations that interpret the story's title. These cases focus on how the interaction between multiple situations and tentative agents establishes a foundation for more complex interpretive devices, to come later in the story. In examples 3 and 4, these more complex structures come to the fore. Here, the interaction between multiple situations and tentative agents provokes the construction of two different possible agent networks, which are each composed of tentative agents. These two possible interpretations are incompatible, in a way that fulfills the criterion for 'Tension.' These two possible interpretations also require further information for their incompatibilities to be resolved, in a way that accords with the notion of 'causal anticipation.' Together, these mechanisms combine to model an aspect of causal impetus.

At the end of examples 2 and 4, the figures illustrate comparison slides, from the two different "Red Riding Hood" stories. This is a visual snapshot of the divergent structures identified in that chapter. Equivalent slides from each story are compared, in order to reveal how the same stage of different versions of a story can exhibit very different interpretive frameworks. These comparison slides indicate that, in accordance with the goals of the method and system, the model is able to track the differences in structure and agency between two stories with the same characters and plot. They provide a way to systematically visualize the fact that if a story was expressed otherwise, it would have created a very different effect, and would, in fact, be a different story.

In each of the four examples, central behaviors of story engagement are examined:

1) Managing Multiple Sources of Conceptual Structure

This example shows how more than one local reference situation can become primed as an inferential reference. Taxonomic devices regarding the suspension of governance indicate an initial relationship between these situations.

2) Identifying a non-explicit term of agency

This operation depends on the cumulative effect of multiple, inferred general ontologies. They accrue until a tentative term of agency is generated—the node 'parallel stories.'

3) Using governance in the construction of new conceptual units.

This graphical representation depicts the way local governance operations direct the interpretation of text chunks. It results in the creation of new conceptual unit, 'wolf with kind, sensitive qualities,' which has been structured in accordance with the associative priorities of the two situations bearing on it.

4) Supporting the emergence of tentative interpretive agent networks, including aspects that are incompatible and unexpected.

Here, inherited concepts from the traditional version of "Red Riding Hood" are used to construct new associative structure for this modern version of the story. The new and traditional versions are in conflict regarding the inferences surrounding the term 'wolf,' so a series of operations resolves this incompatibility at a local level. This resolution requires an inference from outside the already-established local reference situations, thus establishing a non-explicit and unexpected term of causal agency. This contributes to the generation of additional structure, and through a series of operations, two different, tentative agent networks emerge, representing competing inferences regarding the story's final form.

Example 1 illustrates managing multiple sources of conceptual structure. This example depicts the management of multiple local reference situations, at a stage when there is little initial information about their relationship. In this case, governance helps to relate them.

Figure 12:
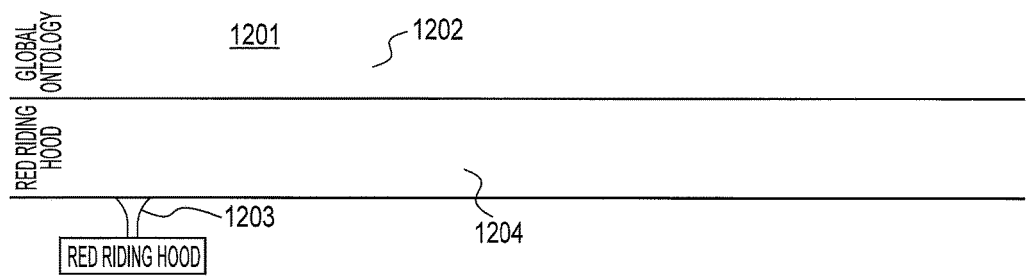
FIG. 12 shows portions of a graphical user interface according to embodiments described herein.

The first part of this sequence uses the concept of 'pullers,' to be described below. FIG. 12 illustrates a puller. The first words of the title ("Red Riding Hood") 1201 appear in the model. This is shown as 205 in FIG. 2, 302 of FIG. 3 and 602 of FIG. 6. Those words prompt the extraction of an equivalent reference situation from the global ontology 1202. This effect centers on the device of the puller 1203, which pulls local reference situations out of the global ontology band.

Even though the ontology space in the model is similar to a range of referential knowledge structures in the current art, this is novel in that pulling a discrete situation from it begins to mark a unique feature. As subsequent words stream in, this Red Riding Hood situation 1204 will be the first point of reference for salient terms.

Figure 13:
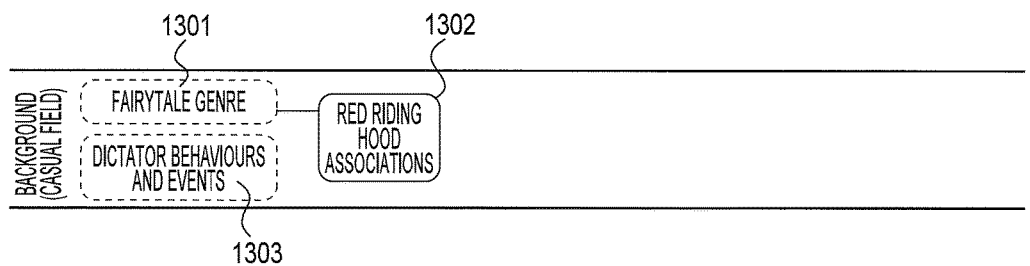
FIG. 13 shows portions of a graphical user interface according to embodiments described herein.

When a new reference situation is drawn out, a record of this must also occur in the interpretation space, so its influence over the story can be tracked. FIG. 13 shows an example of this. In this case, two ambassador nodes are deposited in the background situation band: 'Fairytale Genre' 1301 and 'Red Riding Hood Associations' 1302. The background situation records the most expected inferential associations for a text chunk. Given that "Red Riding Hood" is a well-known story in the fairytale genre, and the conventions of fairytales are likely to govern it, the ambassador 'Fairytale Genre' 1301 appears, even though it has not been explicitly mentioned. In order to indicate the governance relation between these two ambassadors, the 'Fairytale Genre' 1301 ambassador is positioned on the left side of 'Red Riding Hood Associations' 1302. This left-hand placement indicates governing dominance. So far, these ambassadors control the anticipated causal associations and direction for this story—that of the traditional "Red Riding Hood" story.

When the second half of the title text appears, 'As a Dictator Would Tell It,' a second reference situation is needed. This phrase does not register within the available inferences in the Red Riding Hood situation (indicated when a funnel travels from the text chunk to that situation band and flashes on the screen of the modeling system 214 to indicate conflict). The global ontology is therefore consulted for a possible match. General associations with dictators are called up, and extracted as a new situation band, named 'Dictator.' Once that second situation is pulled out of the global ontology, an equivalent ambassador node is again deposited in the interpretation space.

The governance relationships between the two reference situations so far are noted in the interpretation space. With the appearance of a second local reference situation, and not yet much indication of their governance relation, their ambassadors are positioned on top of each other.

Figure 14:
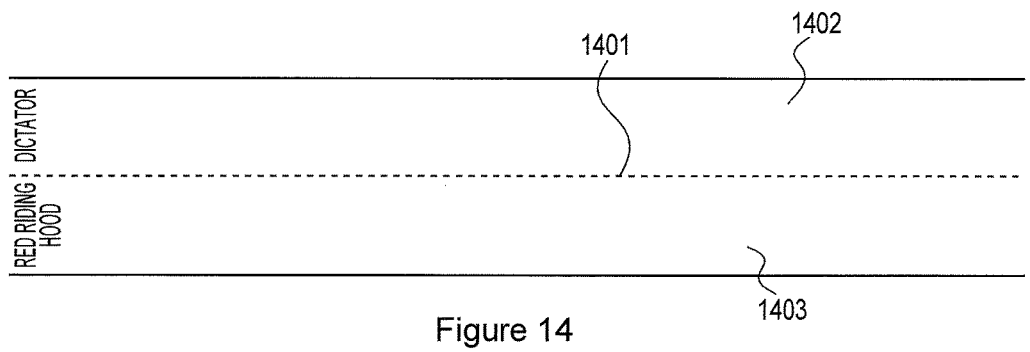
FIG. 14 shows portions of a graphical user interface according to embodiments described herein.

FIG. 13 shows the relationship between the inferred local reference situations, given the story so far. Both ambassadors 1301 and 1303 are potentially dominant, so they are positioned together on the far left of the background situation band on the screen 216 of FIG. 2b of the computing device 217 running the modeling system 214 of FIG. 2a. Both are suspended because their governance relation is unconfirmed. This suspended status is also reflected in the bands of the ontology space from which they were drawn, which are separated by a dotted line, to record that one does not dominate the other. FIG. 14 illustrates this, the dotted line 1401 between the Dictator situation 1402 and the Red Riding Hood situations 1403.

This device of suspended governance enables multiple reference situations to simultaneously contribute to interpretation, even if their structures are tentative and non-explicit. That provides a basis for the construction of more than one possible agent network—the building of which will be shown in the following examples. Such ambiguity makes it possible for competing interpretations to emerge.

This suspended governance situation indicates tension, in the form of possible outcomes that need further information in order to be resolved. The suspended governing status of the two potentially dominant ambassadors will provide the foundation for two separate possible projections of future ontological structure, as shown in example 4. For the moment, the effect created by this undecided dominance is one in which the outcome is anticipated to be some sort of combination: the traditional trajectory of either "Red Riding Hood" or an event involving a dictator—the novelty of which also supports the two principles 'building new ontologies and 'unexpected associations.'

Figure 15:
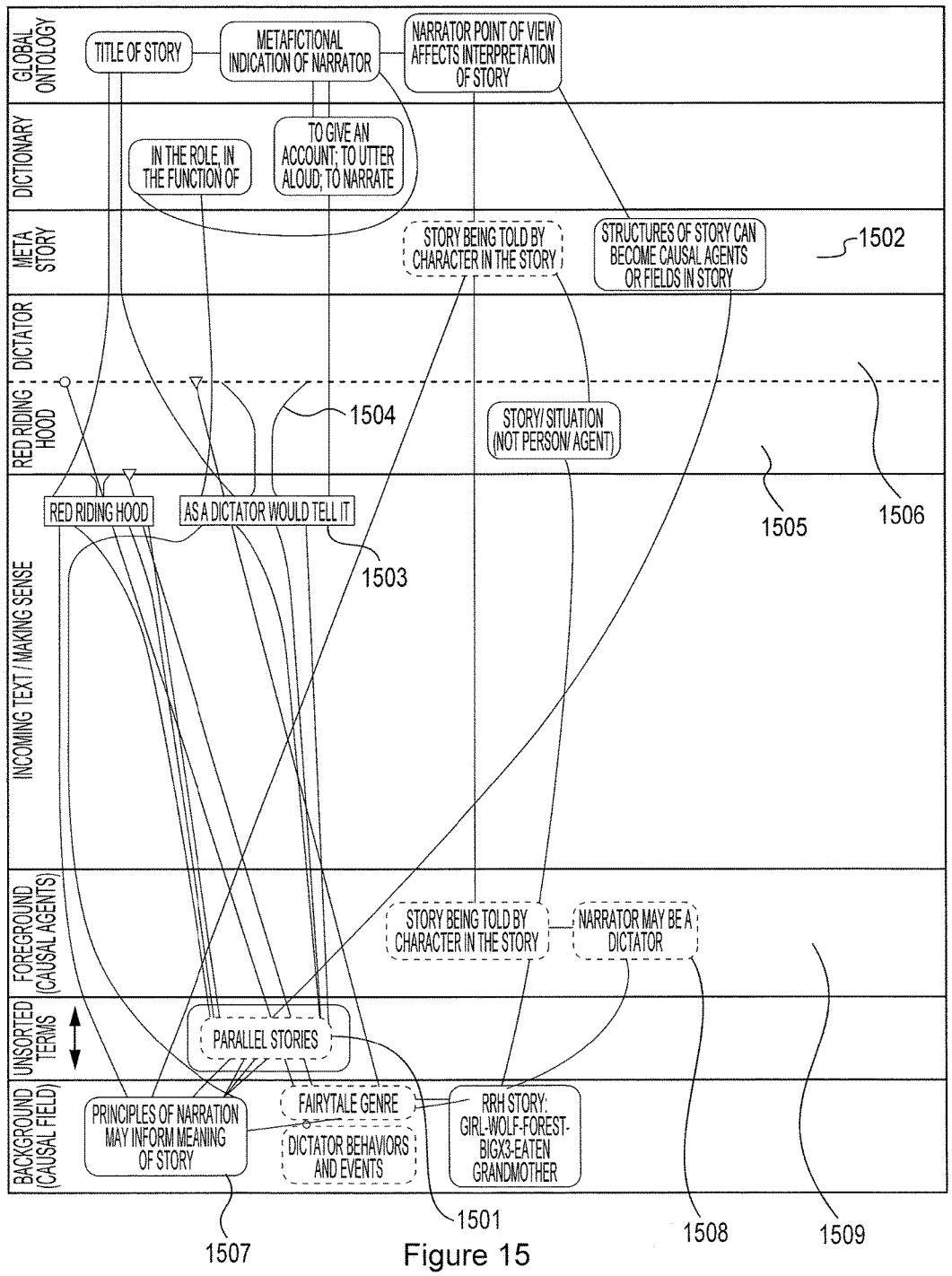
FIG. 15 shows portions of a graphical user interface according to embodiments described herein.

Example 2 illustrates identifying a non-explicit term of agency. FIG. 15 shows this example, which demonstrates the complex operations needed to create the non-explicit agent node 'parallel stories.' 1501 An additional local reference situation ('Metafiction') 1502 is established, and structure is built between this and existing local reference situations. A non-explicit agent is constructed in order to bridge some of the structures emerging from these situations.

The first part of this sequence will be repeated in the disclosure of the instance (2) funnel operation. In that example, the text chunk "would tell it" 1503 contains inferential structure not accounted for by the established Red Riding Hood and dictator situations, so a funnel 1504 pulls out a meta story reference situation, in order to account for the needed additional structure.

The generation of this additional local reference situation necessitates a fresh assessment of new possible relationships between objects across the field. It also requires an appraisal of governance between that new situation and those already established. The implied relations between these local reference situations (Red Riding Hood 1505, dictator 1506, and meta story 1502) is that one story is being told via the terms of the other. The meta story situation is therefore the bridge—it accounts for the way the two other situations are connected via narration. The meta story situation band is therefore designated as dominant, in accordance with the rules of dominant agency described above: it directs the relationship between the other two, imposing the structure of its terms and creating a bridge between them.

Graphically, this dominance is indicated by the ambassador being positioned on the far left of the background situation band 1507 (the other ambassadors shift right, to make room). This dominance is also indicated in the ontology space, when the meta story situation band is shifted to the top of the other local reference situations.

The presence of a new governing situation prompts the generation of a variety of other nodes. Some aspects of these are tentative. In this example, some tentative nodes form into two separate, speculative networks. This supports the engagement principle 'causal anticipation,' because these networks require further information for their relationship or existence to be confirmed.

The construction of these alternate, suspended nodes can be seen in the final part of this sequence. After the meta story situation band is established as dominant, an instance (3) associative funnel (not shown in the figure) scans the field for further abstractions. Funnel types are disclosed below. By combining inferences from existing reference situations, as well as general grammatical meaning drawn from the ontology space, the funnel produces the inference 1508 that the 'narrator in this story might be a dictator.' This node is placed in the foreground band 1509, as a potential agent. That determination of potential agency is based on existing connections: the dominant governance it inherits from the ambassador 'story being told by a character in the story,' plus the sorts of story-governing activities usually performed by a narrator. As the existence and agency of both these ambassadors is not yet confirmed, however, they are suspended.

In the final moments of this sequence, another instance (3) associative funnel infers that the Red Riding Hood and Dictator situation bands are the equivalent of two stories, which are being considered simultaneously. This operation draws from multiple sources—the dominant 'metafiction' ambassador, the two local situations it governs, and the grammatical relationship between them. This conceptual infrastructure is combined to produce the tentative ambassador, 'parallel stories.' The generation of this non-explicit node is crucial for the later interpretation that the narrator of the story is using this dual structure to be deceptive.

Together, examples 1 and 2 illustrate how multiple governing situations can lead to suspended states and suspended nodes. By combining these inferences, the non-explicit agent 'parallel stories' could be generated. The next two examples illustrate how these foundations can lead to multiple possible emerging agent networks.

The next two examples are drawn from a later sequence of operations, which more directly show the power of the system. Example 3 sets up the illustrative structures, while example 4 shows how they unfold. It illustrates how governance constructs new conceptual units and begins with the first two sentences of the story's text (the previous two examples concerned the title alone): "Once upon a time there was a poor, weak wolf. It was gentle and kindly and had a heart of gold."

Figure 16:
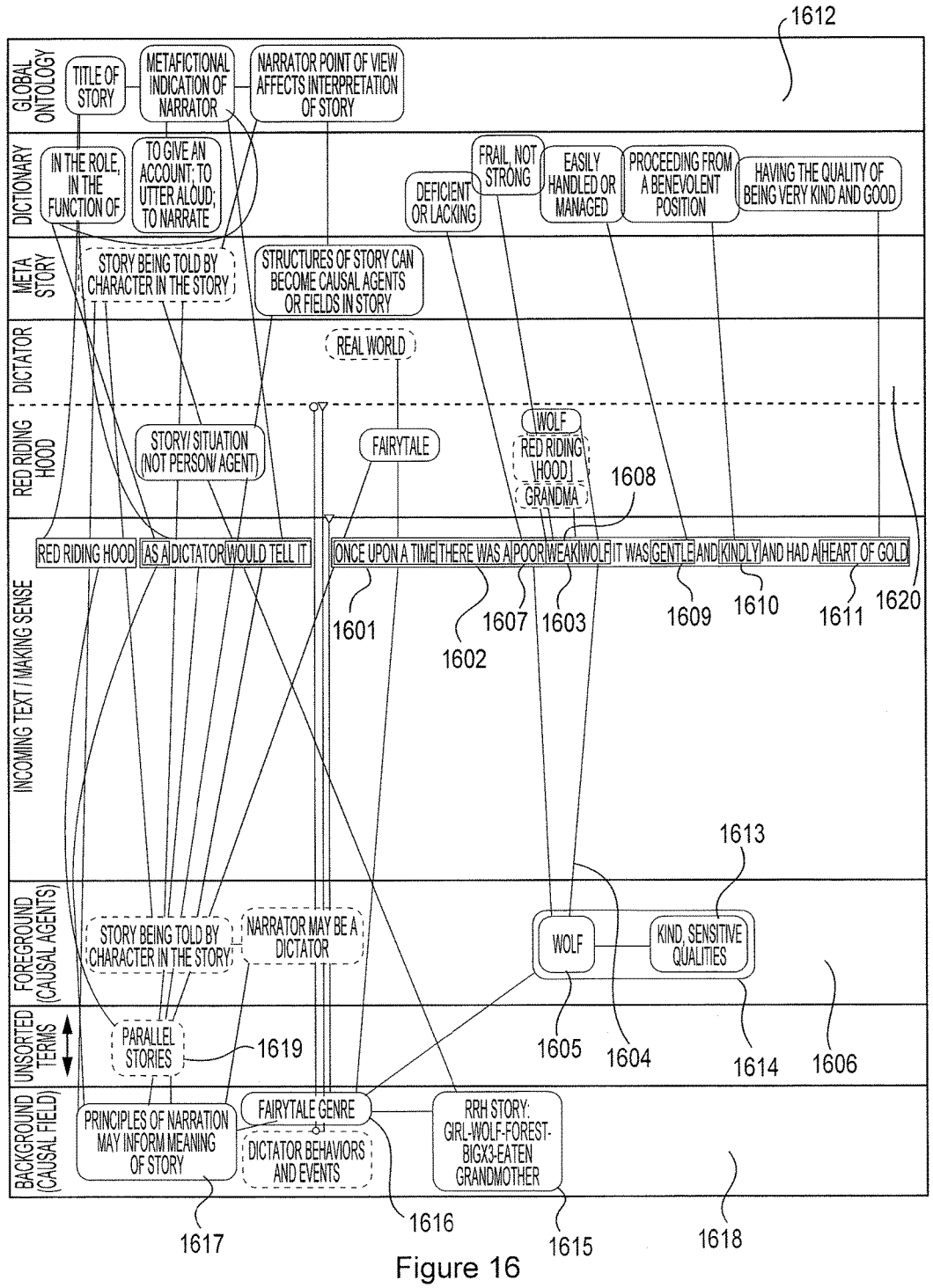
FIG. 16 shows portions of a graphical user interface according to embodiments described herein.

FIG. 16 illustrates this being a view of the screen 216 of FIG. 2b displaying the model at that instant. In this example, inferences regarding the traditional Red Riding Hood story contribute to an interpretation of the new incoming text, even though aspects of that text conflict with the traditional reference. The featured governance operations generate a non-explicit ambassador, 'wolves are good.'

The sequence begins with the appearance of the first lines of text. The first complete chunk is "Once upon a time" 1601. How such chunks are created is disclosed below.

Following the identification of "Once upon a time," the tokens "there was a" 1602 and "Wolf" 1603 are activated and flash. The term "Wolf" prompts an instance (1) funnel 1604 to find a correlation in the Red Riding Hood situation band. This equivalence is straightforward, as the wolf is also a prominent character in the traditional story.

The wolf is identified as an agent character in the traditional story, which means it could exhibit causal agency in this new text, through inherited structure. The rest of the sentence describes qualities of the wolf, creating numerous connections to it, which can also be an indicator of causal agency. A funnel deposits the node 'wolf' 1605 in the foreground band 1606, and the term 'wolf' is accorded local governance over its associated terms. The conceptual structures associated with 'wolf' will inform the interpretation of these terms—this is the operation of interest here.

First, interpretations of these descriptors are sought. There are five: "poor" 1607, "weak" 1608, "gentle" 1609, "kindly" 1610 and "heart of gold" 1611. "Heart of gold" 1611 is recognized first, because it is a larger chunk of text, in accordance with the rule that the largest possible section of text is matched. The other four words do not provoke any specific inferences as a group, so a simple dictionary definition for each is called from the global ontology 1612. These definitions are deposited in the foreground situation 1606, where their associations will support the governing term 'wolf' 1605.

Next, a combined interpretation of 'wolf' and its supporting terms is sought. An instance (3) associative funnel (not shown in the figure) determines that together, these descriptors (including 'heart of gold' 1611) can be generalized to a common abstraction, 'kind, sensitive qualities' 1613. This abstraction is substituted for the list of descriptors, and connected to the node 'wolf' 1605. An association-forming box 1614 is drawn around both nodes 1605 and 1613, indicating that they now operate as a conceptual unit. In this way, a new conceptual unit is constructed, using structures drawn from the local reference situations and general ontologies.

This new conceptual unit 1614 is then assessed in terms of the structures built by the story so far, to see if additional connections can be generated. Each governing situation applies its associations, in turn. In this case, 'wolf' 1605 is governed by three situations: 'Red Riding Hood Story' 1615, 'fairytale genre' 1616 and the metafictional node, 'Principles of narration may inform meaning of story' 1617. The associations of the ambassador 'Red Riding Hood Story' 1615 have already been applied, so we now move to the associative priorities of 'fairytale genre' 1616.

When the associative structure of 'fairytale genre' 1616 is applied, an additional node is generated. This new node 1614 represents the non-explicit notion that such qualities suggest that the wolf is 'a good character in a fairytale.' In turn, that new piece of information also generates additional structure: the background 1618 converts the node onto its own terms, and deposits them into its band as an ambassador: 'wolves are good' 1613 creatures in this emerging universe.

Finally, these new non-explicit nodes are registered against the structures already established across the entire field. This causes a second round of tentative inferences to emerge. The ambassador 'parallel stories' 1619 (which is connected to inferences regarding dictator behaviors) imposes its own terms on the newly generated situations, which now include 'a good character in a fairytale' and 'wolves are good.' Associations regarding the duplicity of dictators, when coupled with the possibility that the narrator of the story is a dictator and is speaking from the perspective of the wolf, raises the possibility that the explicit information conveyed by the text is false. The node 'wolves are good' 1614 is therefore converted into a suspended state, because it might be in doubt.

In this manner, the governance of multiple situations progressively modifies the interpretation of the text. As a result, two different possible agent networks begin to emerge, and with them, conflicting interpretations. If terms from the 'dictator' 1620 band become the dominant agents, the explicit meaning of the text will be undermined, and the interpretation will be that the narrator is lying. However, if the tentative structure drawn from the explicit text becomes dominant, traditional inferences regarding the "Red Riding Hood" story will be discounted, and instead the traditional heroines of the story will be seen as persecutors.

These possible outcomes contain unexpected elements, and are not compatible with each other. Given the unexpected inversion of the role of the wolf, which begins as sympathetic, the outcome cannot be easily assumed from the information provided. This makes a foundation for causal impetus regarding the non-explicit nature of agents and regarding the principles of 'causal anticipation' and 'tension.' Story drive can stem from the reader's desire to discover which of the incompatible possible interpretations will prevail, and curiosity about how one of them will be discredited.

Example 4 illustrates how the resolution of that tension contributes further to the story's forward-directed inferences, supporting the emergence of tentative agent networks, including aspects that are incompatible and unexpected. In this example, the previously built structures combine to resolve ontological conflict.

Non-explicit bridging concepts are formed, some of which participate in contrary agent networks. This creates a combination of expected and unexpected structure, which provokes the need for more information from the text, in order to know how the multiple tentative possible outcomes are resolved.

Figure 17:
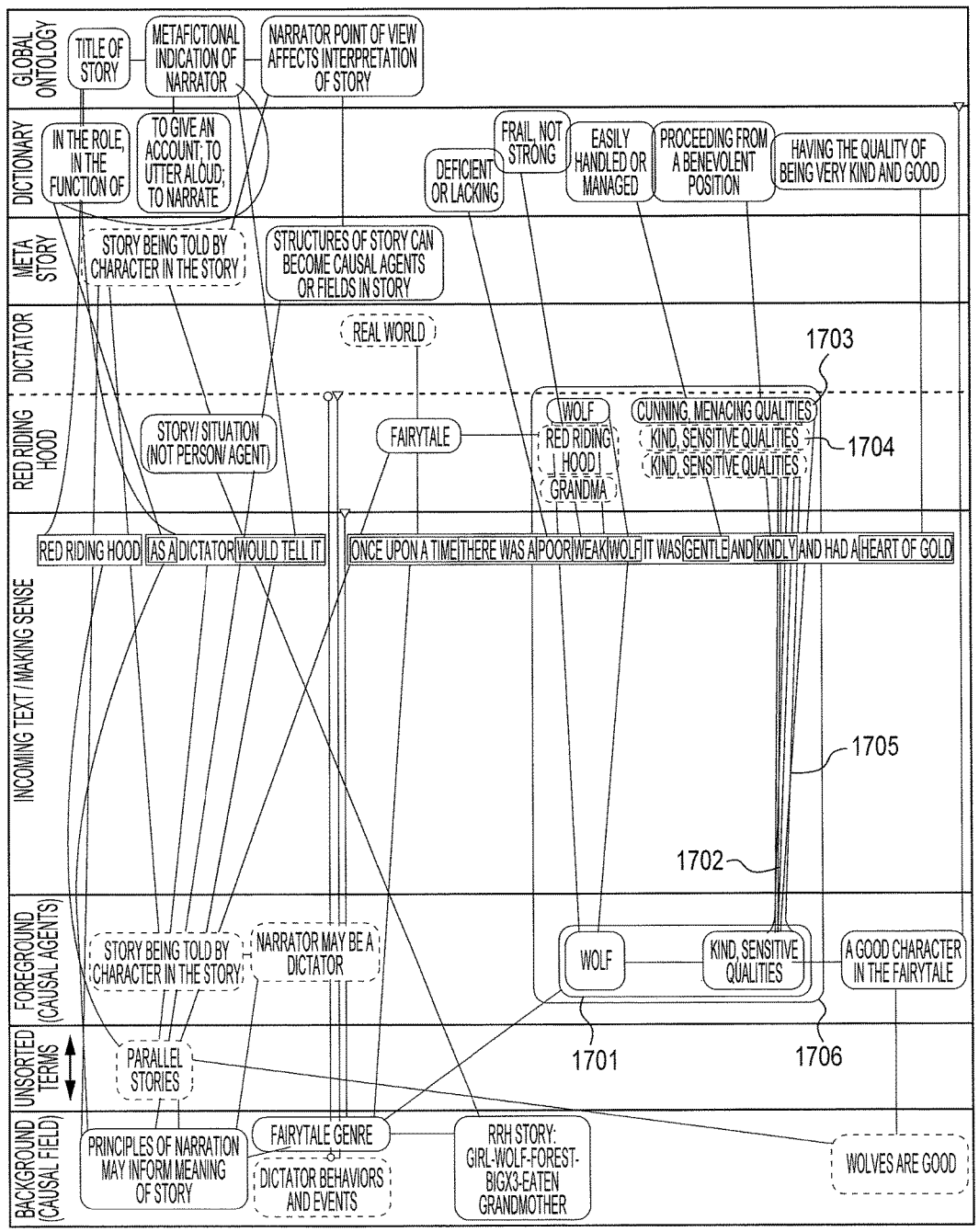
FIG. 17 shows portions of a graphical user interface according to embodiments described herein.
Figure 18:
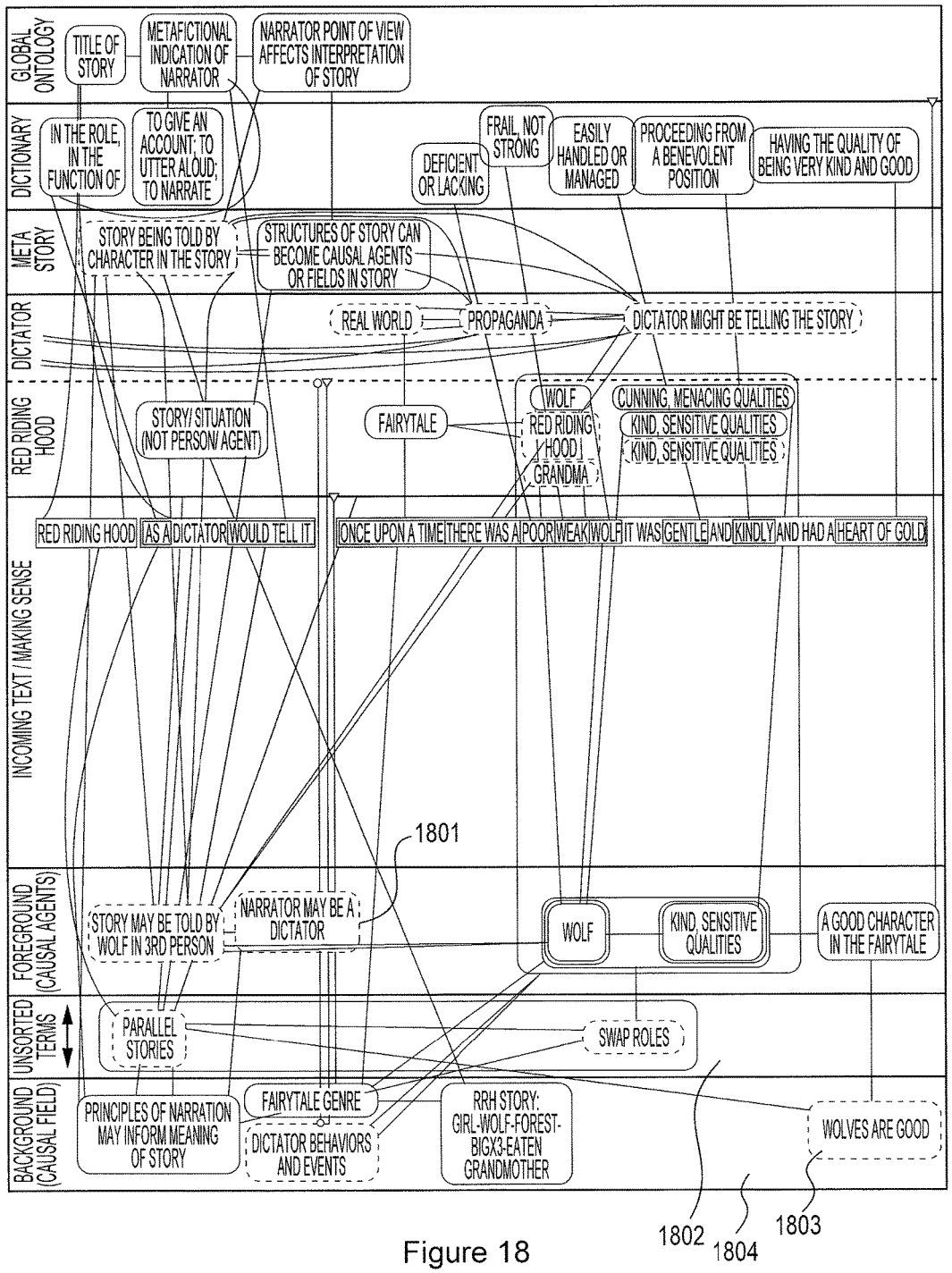
FIG. 18 shows portions of a graphical user interface according to embodiments described herein.

FIG. 17 illustrates example 4, which begins with a local resolution of conceptual conflict. In the traditional "Red Riding Hood" story, the word 'wolf' is associated with menacing qualities. On the other hand, the text asserts that he is kind and sensitive. Further inferential structure is needed in order to reconcile these two notions.

The animation commences when the 'fairytale' ambassador in the foreground band imposes its associative priorities on the newly established situation 'wolf with kind sensitive qualities 1701.' This second application of the 'Fairytale' ambassador's governance over this node occurs in a different manner from the previous example.

There, it acted more locally, to deduce that the wolf was being identified as a good character in a fairytale. It now compares this assumption with the structures associated with the traditional version of the story, in the Red Riding Hood reference situation. In order to represent this, an instance (3) associative funnel 1702 pulls equivalent characters and attributes from the Red Riding Hood situation, enabling a graphical comparison. A conflict is detected: in the traditional version, the wolf is "cunning, menacing" 1703, whereas in the new version, he is "kind, sensitive" 1704.

This supports the engagement principle 'Expected and Unexpected Associations,' because the new story has utilized expected structures from the fairytale, but has also diverged from them.

Three operations follow, in order to set up the conflict resolution. A conflict funnel 1705 extends from the Red Riding Hood reference situation, indicating that an outright conflict of conceptual structure has been detected. A transformative funnel answers from the compared situation, indicating that a resolution will be sought. A transformative box 1706 then encircles the area of conflict, ready to investigate it.

This series of operations shows how the previous principle of engagement, 'Expected and Unexpected Associations, can lead to 'Tension.' There is a partial connection between the reference and story ontologies, yet there are also some elements that are not reconciled. A bridging structure is needed, one that can cohere an aspect of these conflicting elements. This accords with the definition of tension, as an imperative that drives "some central, cohering artifacts that does not yet exist, but could." The model as displayed now goes through the process of attaining this sort of cohering form, on a local scale.

Details of conflict resolution of this kind will be disclosed in FIGS. 33-36. In summary: during this process, the funnels identify that narrator has attributed the menacing attributes, which are usually associated with the wolf, to the female characters in the story. Again, this supports the principle of 'Unexpected Associations.'

The conflict between these two situations is now coupled with additional information. This supplies the conflict itself with additional structure. An instance (3) associative funnel seeks a match for this conflict in the global ontology, and returns with the notion of 'swapped roles.' This new concept satisfies a number of matches: it allows the two conflicting structures to be preserved, whilst bridging them with contextualizing structure. It also fits with the other emerging conceptual units, which have guided this theory, such as 'parallel stories.' Although it is not yet clear how 'parallel stories' and 'swapped roles' are related in this story, their generic similarity, in terms of their dualness, suggests that there might be one, and they are linked. The creation of this new node also adheres to the prescription of the principle of 'Tension.' In order to resolve the conflict between divergent entities, a cohering conceptual structure is attained.

The establishment of this new, cohering node has created another unexpected association with the Red Riding Hood situation, however—'swapped roles.' It can be tolerated by the existing conceptual structures because it is connected to them, but it does diverge from traditional associations for the story. Being unexpected, this new conceptual structure makes the story's outcome more difficult to predict. This is heightened by the two tentative and emerging agent networks, which are based on the incompatible nodes: 'narrator might be a dictator' 1801 (in the foreground band 1802) and 'wolves are good' 1803 (in the background band 1804). These can be seen in FIG. 18.

Two non-explicit agent networks are beginning to emerge, and jostle for validation. One reflects the explicit meaning of the text and its inferences (regarding 'Wolves are good' 1803), while the other reflects a different cluster of non-explicit inferences (concerning the more sinister, 'Dictator might be telling this story'). The only way to discover which interpretation will dominate, and how the story will resolve, is to consume more text. So the reasoning system 202 of FIG. 2*a* accepts the next chunk of the story 205. This is also shown as 302 in FIG. 3, using infons of type 402 in FIG. 4.

The text appears in the incoming text band of the screen displaying the modeling system on the modeling system 214.

Together, these features lead to the final principle: 'causal anticipation.' The multiple references and uncertain governance relationship between them, when coupled with unexpected associations, makes several interpretations possible. The terms on which each are based are fundamentally different: either wolves are trustworthy and misunderstood, or they are the opposite. As each candidate outcome is founded on a different yet incompatible arrangement of agent concepts, tension exists between their networks, needing resolution. Yet these two networks are also locked together by bridging agents. That connection coupled with conflict stimulates an impetus towards a cohering form that will resolve it, in the manner of an engaging story.

Figures 19A, 19B, 19C:
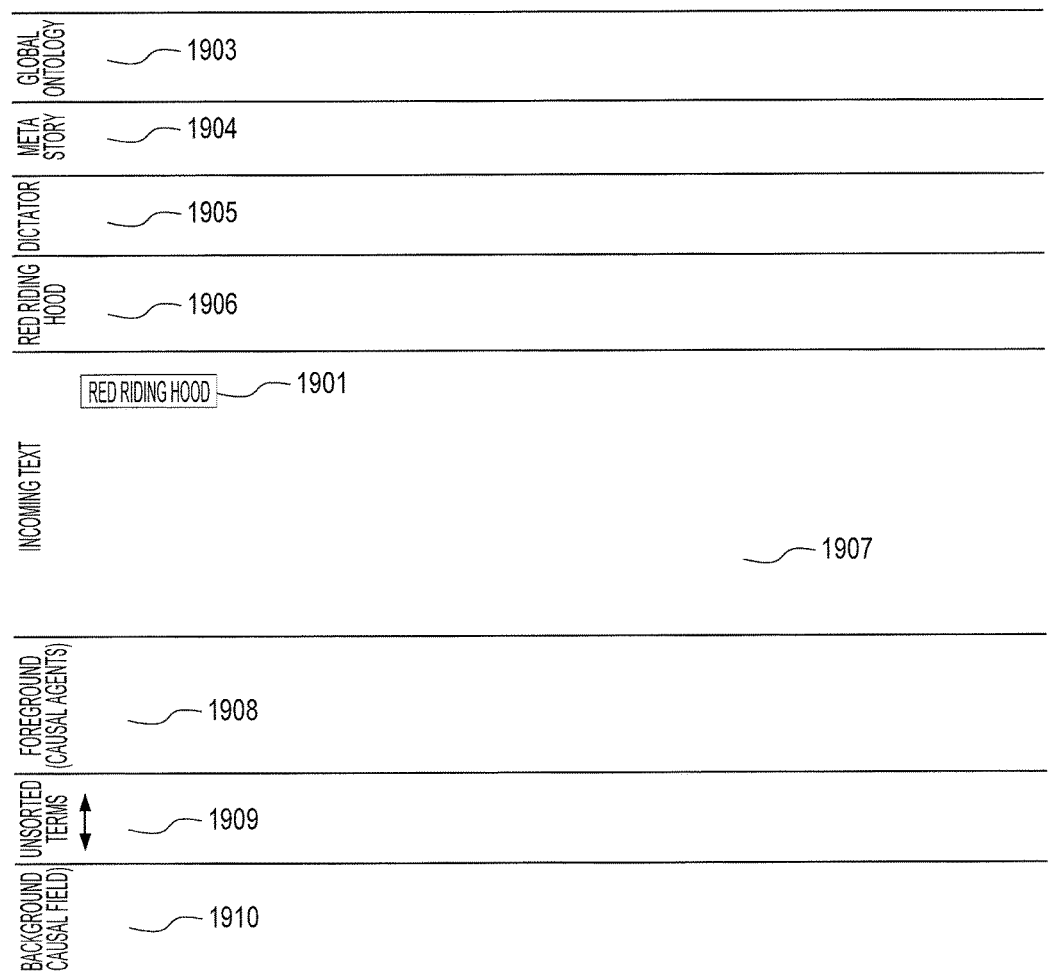
FIG. 19a shows portions of a graphical user interface according to embodiments described herein.
FIG. 19b shows portions of a graphical user interface according to embodiments described herein.
FIG. 19c shows portions of a graphical user interface according to embodiments described herein.

FIGS. 19*a*, 19*b*, 19*c* illustrate some basic elements of the model, expanding on some elements of FIG. 7. 1901 is an incoming text token. This represents a chunk of information, stored internally as an infon of type 402. It is depicted as sliding into view on the screen 216 of FIG. 2*b* into zone 702, in order to emulate the way that the words of a story are apprehended incrementally. They appear sequentially to start each cycle as depicted in FIG. 3. Each semantic token is denoted by a rectangle. All other representations are inferences.

The appearance of a token triggers a sequence of interpretive functions, during which the system finds concepts from local reference situations to associate with it. Inferred concepts are visually indicated by concept nodes (also referred to as nodes). These are indicated by rounded rectangles 1902 of FIG. 19*b*. Nodes play different roles in the model, with the role indicated by its context, plus in some embodiments a designated color.

As each fragment of incoming text appears, associated conceptual structures are found and graphically connected to it, in the form of nodes and links.

The next device is situations, and the means by which these are managed enables new contexts to be grown—this is unique to embodiments of the invention compared to the existing art. The difference lies in the presence and eventual integration of structures drawn from multiple general ontologies. In a story, overlapping, inferred situations act as a joint filter through which its text is interpreted. This interaction between text and contexts generates a new situation—a story ontology—which serves as an overall interpretive frame. Special notations were developed to represent the inter-situational behaviors between them.

First, multiple situations are represented as black bands that extend across the display as shown in FIG. 19*c*. Example ontology bands are global 1903, metastory 1904, dictator 1905, Red Riding Hood 1906.

Incoming text is 1907. The lower bands have already been shown in FIG. 7: foreground 1908, unsorted 1909 and background 1910. The 'possible outcome states' band is not depicted in this diagram.

In FIG. 19*c*, bands are grouped at the top and bottom of the diagram as they would be on the display. These are all situations, but the upper and lower groups do not perform the same role. Their division represents complementary aspects of interpretation: at the top are situations drawn from general ontologies (the ontology space), while at the bottom, the agent network is recorded (the interpretation space).

The structural shift between these two zones is indicated as the eye travels downward. Situations at the top are characterized by associations that are commonly used in the public domain—expected associations. Underneath are the increasing degrees of narrative affordance needed for the construction of the story ontology. As the model moves away from the generic situations of the ontology space, therefore, it enters territory that can begin to allow story behaviors, such as retrospective revision, the integration of multiple situations with different general ontologies, and the coherence of fragments of structure. By representing the two complementary kinds of inference as oppositional zones, it became possible to show how stories are built from interaction between them.

Figure 20A:
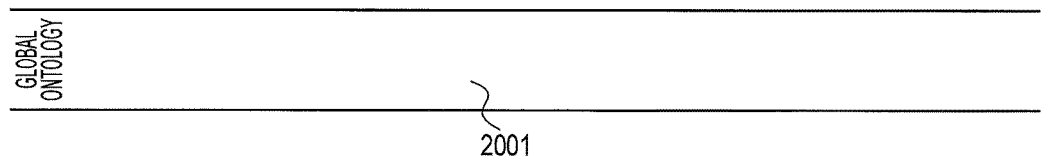
FIG. 20a shows portions of a graphical user interface according to embodiments described herein.

The global ontology is depicted as a single band 2001 of FIG. 20*a*, which stands in for all the general ontologies, as well as any other relevant generic frameworks, as a pool of available references.

Figure 20B:
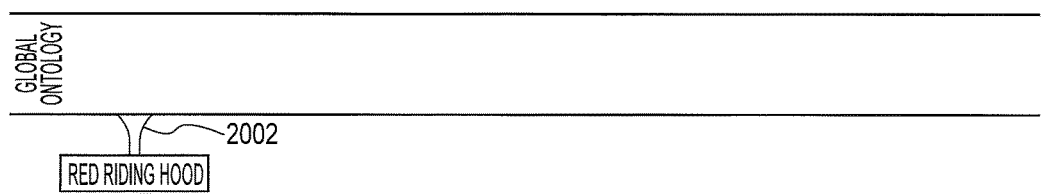
FIG. 20b shows portions of a graphical user interface according to embodiments described herein.
Figure 20C:
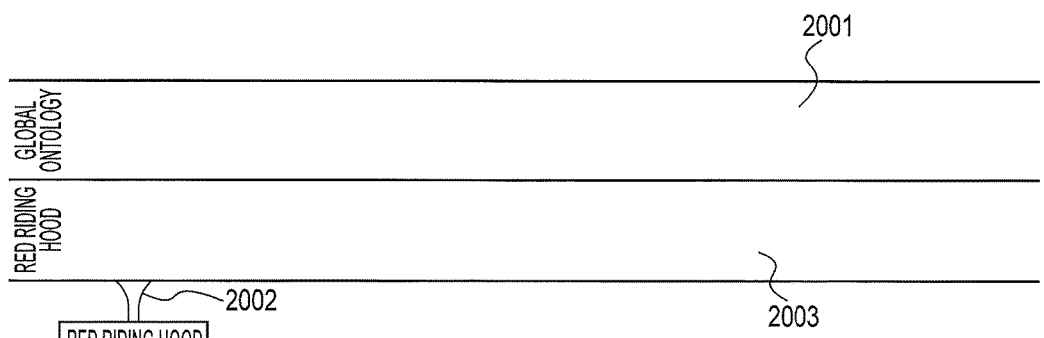
FIG. 20c shows portions of a graphical user interface according to embodiments described herein.

This top part of the model could be accommodated using existing systems as in FIG. 1. This global ontology contains a range of general knowledge, including the networks of assumptions associated with familiar phrases (e.g., "Once upon a time"), names (e.g., "Red Riding Hood") and human situations (e.g., "family"). When a salient match is found for the incoming text token, the model generates a link to a local reference situation in the ontology space. This linking is performed by a transformer operation known as 'Puller.' Visually, a puller is a cone 2002 that extends from the token to a reference situation as shown in FIGS. 20*b* and 20*c*.

After the puller connects with a local reference situation, the system performs a look-up, comparing the token to structures within it. When a match is found within the global ontology, its group of associations is visually extracted for future reference.

FIG. 20*a* illustrates the ontology band at the beginning of the story, consisting of only one band, the global ontology 2001.

In the figure, the phrase "Red Riding Hood" has activated a group of associations within the Global Ontology, and extracted them, as a local reference situation. Some of the concepts that would be returned by the whole phrase "Red Riding Hood" are: fairytale, grandmother, wolf, forest, authors of "Red Riding Hood" stories. In this model, such associations are isolated and grouped as an independent context, priming them to become the first point of reference for future incoming text.

Drawing situations out of each other vertically causes bands to become layered. Layering the bands makes it possible to illustrate how particular aspects of situations emerge and are connected with each other as the story progressively references them. In the ontology space, when a layer is a subset of one of those above it, then the subset inherits whatever pattern of interrelationships existed in the reference sources.

There is a hierarchy among these layers of local reference situations. The more dominant a situation, the closer it will be to the top. The global ontology band always occupies the crowning position, because from it, all other local reference situations are drawn. These top bands signify a form of general cultural memory, but this is only the starting point of interpretation—whether for humans or a computer.

When the first words of story text appear, the most commonly assumed inferences act as the initial point of reference. The story might not retain any of these general associations as it progresses—indeed, if it did not develop beyond them, it would be difficult to generate enough impetus to be pursued to the finish.

The extraction of local reference situations from one or more general ontologies is another point of differentiation for this model. Local reference situations are persistently linked to their source general ontologies, so they can continue to draw from them. However, these extracted situations become the initial point of consultation when the system seeks that cluster of concepts in the future.

For example, if it has been previously established that the 'Red Riding Hood' mentioned in the title refers to the story itself, and not the character, future references will first attempt to draw from references to the story, rather than those for the character. This rule privileges the most specific form of a local reference situation for interpretation. The more specific it is, the more nuanced the conceptual framework it brings with it, which supports two of the engagement principles, 'building new ontologies' and 'tension.'

Computationally, in order to call the most specific version of inferred situations, the system attempts to match the largest possible chunk of incoming story text first. For example, when seeking a match for the entire token "Red Riding Hood as a Dictator Would Tell It," the system would try to match that whole phrase. If no match within the local reference situation could be found, the system would step to a less specific level, to seek a match in the larger pool. If it steps up through all the layers of generality until it reaches the global ontology and still no match is found, linguistic rules would break the chunk into the smallest number of component pieces.

In this case, these would be "Red Riding Hood" 2003 of FIG. 20*c* and "as a Dictator Would Tell it." If no match could be found for these, they would be broken into even smaller pieces, and so on, until only individual words were left, and their definitions sought in the most specific reference situation possible.

It could be the case that no multiple-word matches will exist for tokens. A particular story might rely on the subtle, unexpected associations between individual words. In fact, there might not be any multi-word chunks contain familiar phrases. Here, a single token look-up would be needed for every word in the story, using dictionary-like definitions as the basis of interpretation.

Even in the case of a single-word look-up, this system and method produces interpretations in a different way from the current art, because of the way it can handle references to multiple situations and their supporting ontologies. The use of multiple general ontologies, rather than one alone, makes it possible to create non-general interpretive structure, and manage conflicting situations and the tension between them. Further, systems in the current art with a single, static general ontology cannot return interpretations that have not already been anticipated by the system, whereas the described system and method can.

Figure 21:
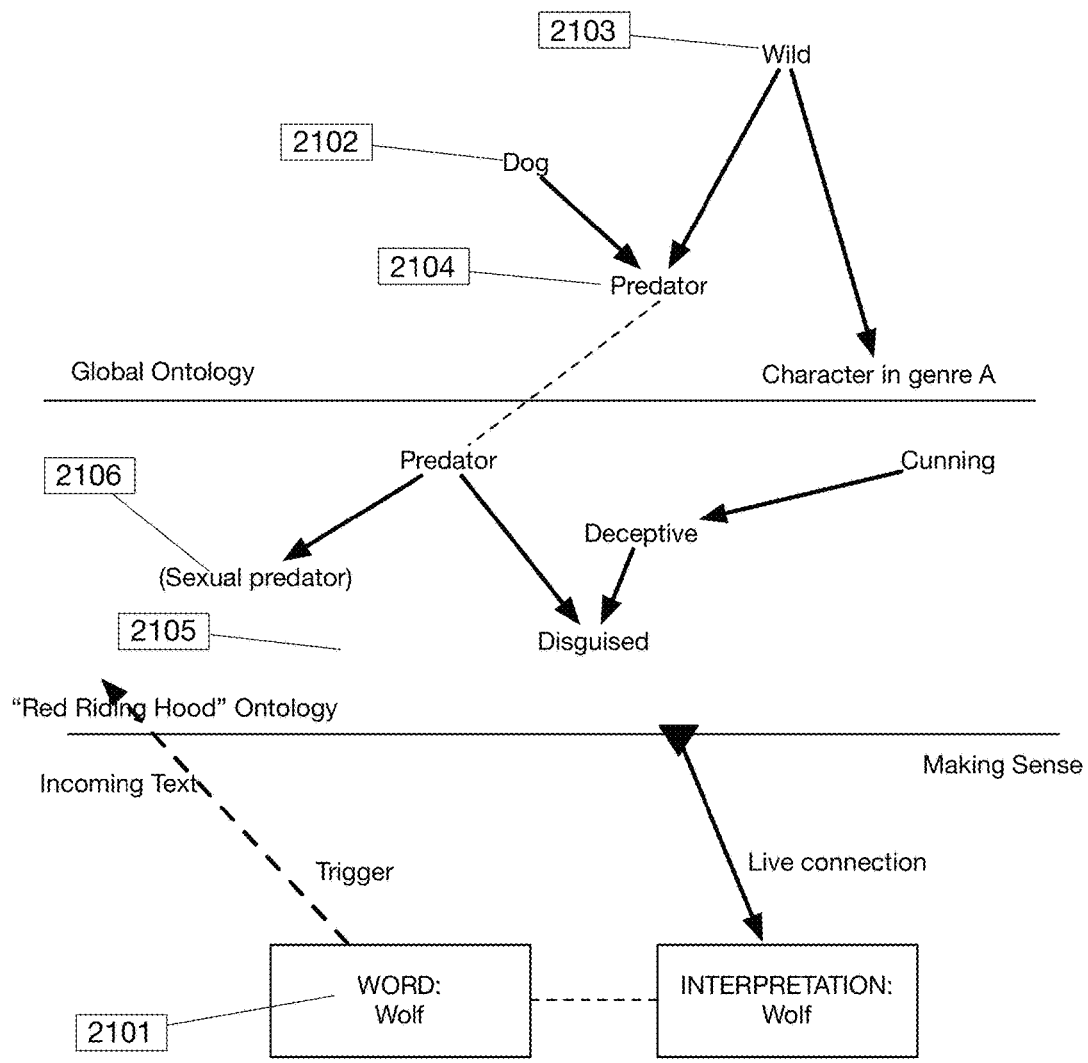
FIG. 21 shows the internal dynamics of methods and systems described herein.
Figure 22:
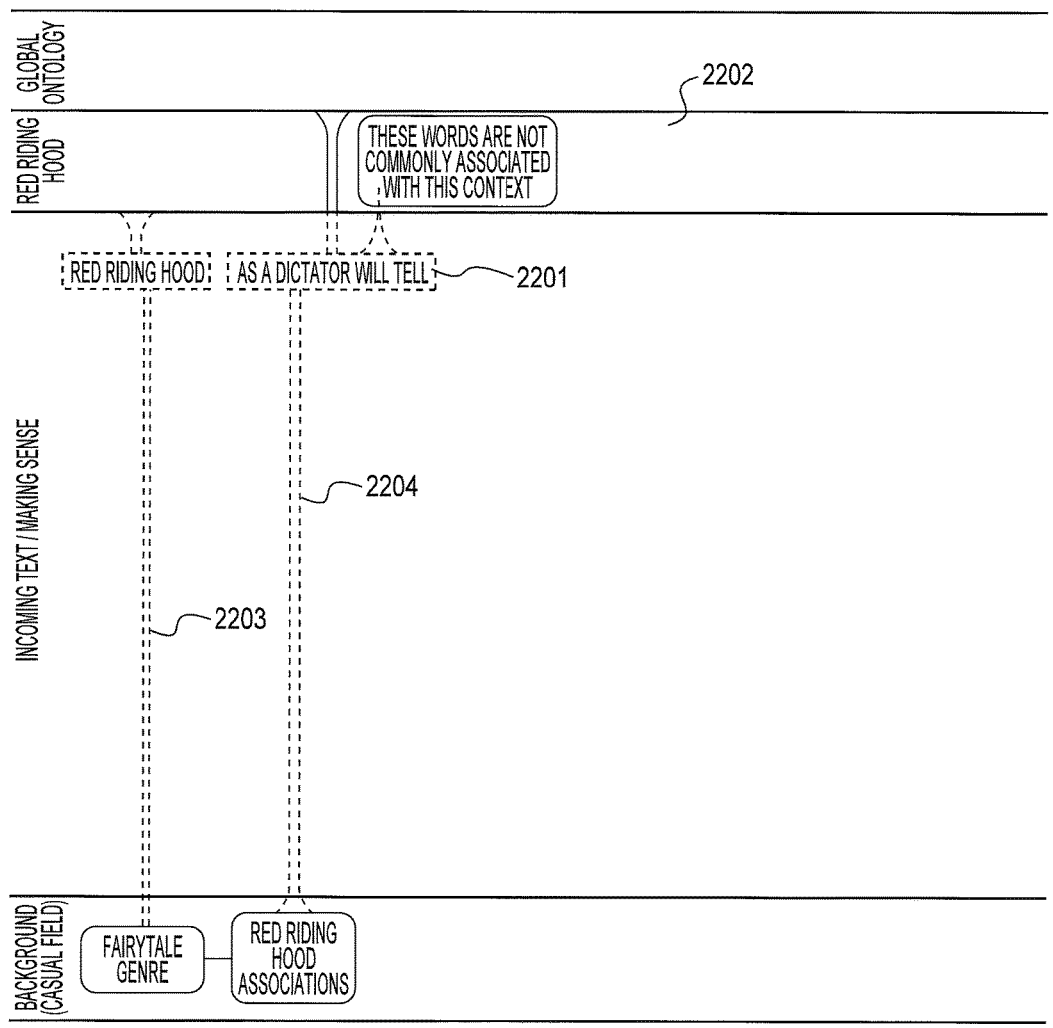
FIG. 22 shows portions of a graphical user interface according to embodiments described herein.

FIG. 21 shows the case where a word-only look-up might occur. In the modeling system 214 (working with the ontology derivation system of FIGS. 2*a* and 2*b*) this is shown in FIG. 2*a* by the paths 216*a*, 216*b*, 216*c*, where a word in 207*a*, 207*b*, 207*c* would look for the root ontology infon of 208*a*, 208*b*, 208*c*. This is also the operation 603 of FIG. 6.

Representationally in 207*a*, 207*b*, 207*c*, this connection with multiple general ontologies and the local reference situations derived from the ontology graph is managed by the Ku value 406 of FIG. 4.

FIG. 21 illustrates some dynamics in the building of a derived ontology graph as seen from the perspective of the modeling system. The appearance of the word "wolf" 2101 in the story, triggers the adjustment of the ontology graphs previously built. The appearance of "wolf" 2101 is that step shown as 302 of FIG. 3. FIG. 21 shows some internal dynamics of 304 as viewed by the modeling system as one of the user interfaces as displayed on 216 of FIG. 2*b*.

In FIG. 21, the system considers not just one situational inference, but two. When the terms returned for "wolf" 2101 (dog 2102, wild 2103, predator 2104) are filtered through another ontological situation (Red Riding Hood 2105), the array of meaning becomes more specific (the wolf is a character who may be a sexual predator). These arrangements can change, due to the progression of the story. For example, if the word "wolf" 2101 precedes tokens that allude to the Red Riding Hood story, initial associations might be limited to "dog, wild, predator." 2102. 2103 and 2104.

After the "Red Riding Hood" chunk has been parsed, however, the associations will adjust to include notions of a sexual predator 2106. This feature offers an explanation for how context-specific interpretations can be generated by our system and method. It also shows how choices of word sequence can drastically affect the interpretation of a text.

The ontology space of the embodiments described herein therefore enables the representation and refinement of multiple local reference situations. Here, the convention in the art of a single, static general ontology as a reference is replaced by multiple general ontologies, so that new and unexpected associations can be generated through their interaction. The activity is driven by the tension that exists between dissimilar or incompatible situations and their supporting ontologies. In order to infer the most specific version of these ontologies possible, and therefore create maximum tension when they interact, the most local instance of these local reference structures is prioritized for inferencing. Whenever a particular situation is called as a reference by the text, the most specific instance of that situation (having been refined by the text) is consulted first.

This prioritization of the most specific reference situation is demonstrated by the way they are graphically drawn out of the global ontology. When the words of the text appear, a puller emerges on the screen 216 of the client computing device 233 of FIG. 2b to visually extract a local reference situation band out of the global ontology, or even out of another local reference situation. An example puller is shown in FIG. 12.

These simple modeling choices are also realized in the design of a system, so that it can relate multiple general ontologies by finding connections, new bridging structures and correlations across them. In both the graphical, methodical and system models, this offers the possibility of more contextually specific interpretations, even when a sole token is involved.

All elements in this framework are dynamic, whether graphical, methodical or systematic, so that a progressive interaction between elements can be recorded. This, therefore is an ontology graph 304 of FIG. 3 and of FIG. 5.

FIG. 8 illustrated a complex model of effects in the graphical and systematic representation, without defining all the elements. These effects are the result of the interaction and integration of multiple yet different conceptual structures. They include: transfer between situations; finding equivalence between dissimilar situations; tentative existence; nesting situations; relations between multiple situations; and, situations being subjected to each other's associative priorities.

Of the operators that contribute to and construct these effects, the funnel is central. The funnel, as illustrated in 908 of FIG. 9, is an operator that instigates change. As such, it is a core structure-building device in the dynamic model. In terms of narrative, it represents an associative connection between actual text and the inferences it provokes. It also represents connections between multiple inferences. In the graphical syntax, it behaves like a moving arrow, drawing a link between any two objects and creating an attachment between them. A funnel can change the position and arrangement of concepts, leaving behind an association between the areas of transference. That persistent connection is demonstrated by a line.

A funnel is therefore inherently dynamic, in that when animated it extends over a short period (such as 1-3 seconds from base to point) and retracts as though in response to the activities it has provoked are finished.

Funnels find equivalences between contextual elements and link them. As this can occur between situations with very different general or story ontologies, it represents one of the most radical elements in the model. A funnel is a bridging operator that finds similarities across dissimilar situations, in the manner of finding analogies or connecting situations in the manner of metaphor.

In the same manner as these literary structures, a funnel is guided to find similarities in dissimilar situations by the given constraints of the text so far. These constraints might be provided by the actual story text ('wolves are always good') or by the emerging story ontology. The manner by which funnels find these connections will be explained below, in the description of the three associative funnel types. The three associative funnel types, instance 1, 2 and 3, are disclosed in FIGS. 33-36.

A state indicates what sort of influence a taxonomic element has over its surrounding objects. Each represents a stage in the process of structure-building. In order to record the simultaneous development of many elements, states can be represented by some suitable style, and can apply to all graphical objects. Each state signals a different degree of action, in terms of its ability to influence other elements.

The state of the model as displayed on the screen has a larger cycle that begins with the appearance of a text chunk and finishes when all the structure is stable. These states and cycles are the same as described in FIGS. 2 and 3. Within those cycles, each node has a state. A list of these states is:

Neutral
Suspended
Persistent
Activation
Generated by Activation
Association-Forming
Conflict
Transformative
Governing
Operation anchored in system rather than story States do not apply to pullers or pushers (because they always perform the same task in the ontology space), or wedges (because they are an extension of state notation). Circular wedges relate to suspended states, and triangular wedges are left behind after state activity involving situations.

Like states, objects also occupy roles on a spectrum of increasing agency, so some are often associated with states. In principle, every state can be applied to every taxonomic element that does not contradict that state's behavior, but in practice a user will rarely have instances of funnels that are governing, suspended or system-anchored. As funnels are used to establish first associations, the states that indicate an association has already been made or is being reactivated cannot be represented by funnels.

(The programmed example in the Cardier thesis is illustrated by colored screen shots and videos. They use assigned colors in the interface to help discriminate roles.)

When a new chunk of text enters the field, funnels seek to match it with situations that can support its interpretation. These matches are sought in the ontology space, as inferences of "general knowledge" by accessing the ontology graph. Basic rules of prioritization direct how these interpretive matches are identified. These rules hold true until structures generated by the text take over the determination of associative order. At that stage, the emerging field of relations itself guides what sort of inferences and associations will be activated.

Until other story structure is established, there are two main prioritization rules for funnels, when they are finding an inferential match with situations or concepts. The first rule is that, whenever connections for a new object are sought, the structures that have been already built are tried before new ones are generated. For example, in FIG. 22, when the text "as a dictator would tell it" 2201 enters the frame (defined below), the Red Riding Hood situation 2202 is consulted first for matching associations, because it has already been established.

If no match is found within that prioritized situation, and no others have been established, the bands flash to indicate conflict and the funnel refers back to the global ontology to pull out a new local reference situation as in 1203 of FIG. 12.

In the model, the attachment of details to a 'global interpretive frame' is represented by the way a funnel seeks inferential matches in general ontologies in the ontology space. If none exists, a new inferential situation is sought.

One reason for this rule is that a story establishes a new referential framework as it unfolds. This reflects the way a human reader cooperates with the process of cumulative meaning construction by prioritizing the new interpretative structures established, rather than starting afresh with generic assumptions for every additional phrase.

The second association rule concerns the priority order in which already-pulled-out situations are searched. Situations that have already established dominance are prioritized, followed by the others. Some factors that can confer dominance on a situation are: that it was inferred first, most recently, or most often.

These associative priorities help confer structural uniqueness on the start of a story. The first few words or sentences of a story establish a gateway, in the form of foundational inferences, through which the following terms attempt to negotiate their meaning. Writers and narrative theorists have noted the importance of the beginning of a story. In linguistics, the notion of 'prospection' names this effect, being the interactive force of a sentence that extends to the end of the sentence following. In the model, even if subsequent sentences are not an exact fit for those initial inferences, if they are close enough, they will be squeezed into it—this is how some unexpected interpretations can arise.

In this way, the first few tokens of text inform the story to come, subtly defining and constraining its associations. The earlier a concept is inferred, the more opportunity it has to influence the interpretive structure of a story. A similar principle of prioritization applies to the ending of a story, where the final interpretive structure applies its associations to all preceding structures. This completed story ontology is thus highly influential over the ultimate meaning of the text. A story's meaning depends on its ending, and we read in anticipation of the structuring power of those endings.

In this case, the prioritization order occurs in reverse, so the last situation to be interpreted retrospectively is dominant, and modifies the rest of the story. Once a funnel has established a connection, evidence of this link remains, as a residue termed persistence.

When a funnel 2204 retracts, evidence of its connection remains in the form of a persistent line. This persistent structure represents the way an association made by the story is available for recall once it has been constructed. Graphically in the user interface, persistent structure illustrates connections between objects that are no longer active. 2203 is an example.

Any object can be persistent, except those that instigate change (funnels, pullers and pushers). When a new chunk of text enters the system, the persistent structure is tried first, in the search for salience. If a match cannot be found, the global ontology is consulted instead. That prioritization occurs because the persistent lines were built by the story, and so are the most recent and specific interpretive structure available.

In the current art of representing general ontologies, it is common to represent links between concepts as lines. The dynamism of the disclosed model brings new implications to this convention. A structure can be repeatedly modified, moved, and its elements reused, with that reuse becoming the basis of additional structure. For this reason, a state is needed to indicate when a persistent object is being reactivated.

The reuse of persistent structure signals the state of activation. When activated, the object flashes to indicate activation, and then the lines connected with it flash in the direction of the association.

Figure 23:
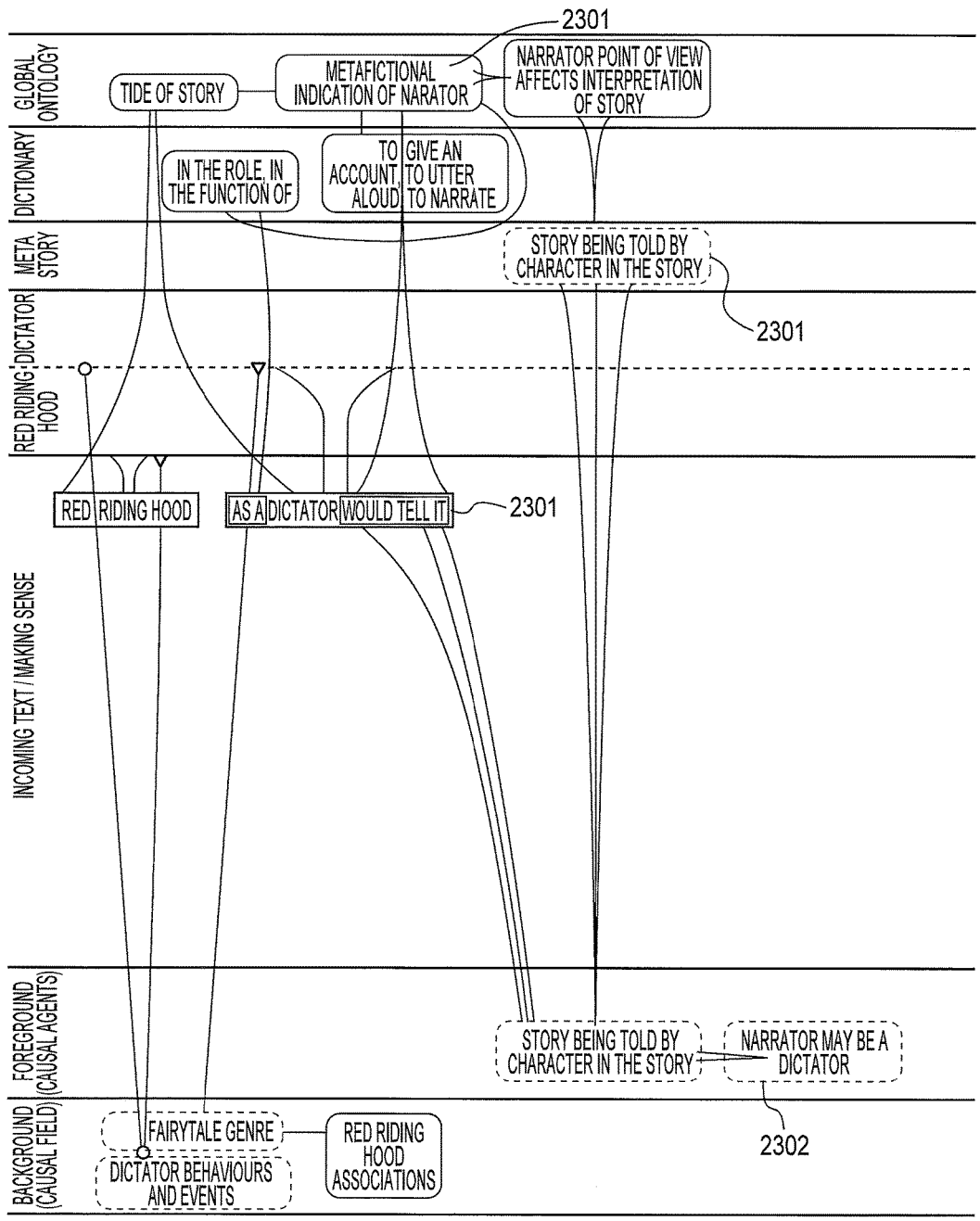
FIG. 23 shows portions of a graphical user interface according to embodiments described herein.

FIG. 23 illustrates reactivated nodes 2301, here drawn shaded. Some of the persistent structure from a previous operation has reactivated. This produced a new node, 'Narrator may be a dictator.' 2302 When this matching activity is spent, it returns to its persistent structure state.

The reactivation of structure can also provoke new cycles of association. Having been arranged in relation to a particular field, persistent structure can change when reactivated later, after the ongoing story has altered the surrounding structures.

This is one of the ways in which interpretive revision is represented, which is a characteristic of texts that infer multiple and different conceptual frameworks, because new information can recast that which has come before, changing its interpretative foundations. Such revision is critical, if the emergence of unexpected agents is to be captured by this model.

Figure 24:
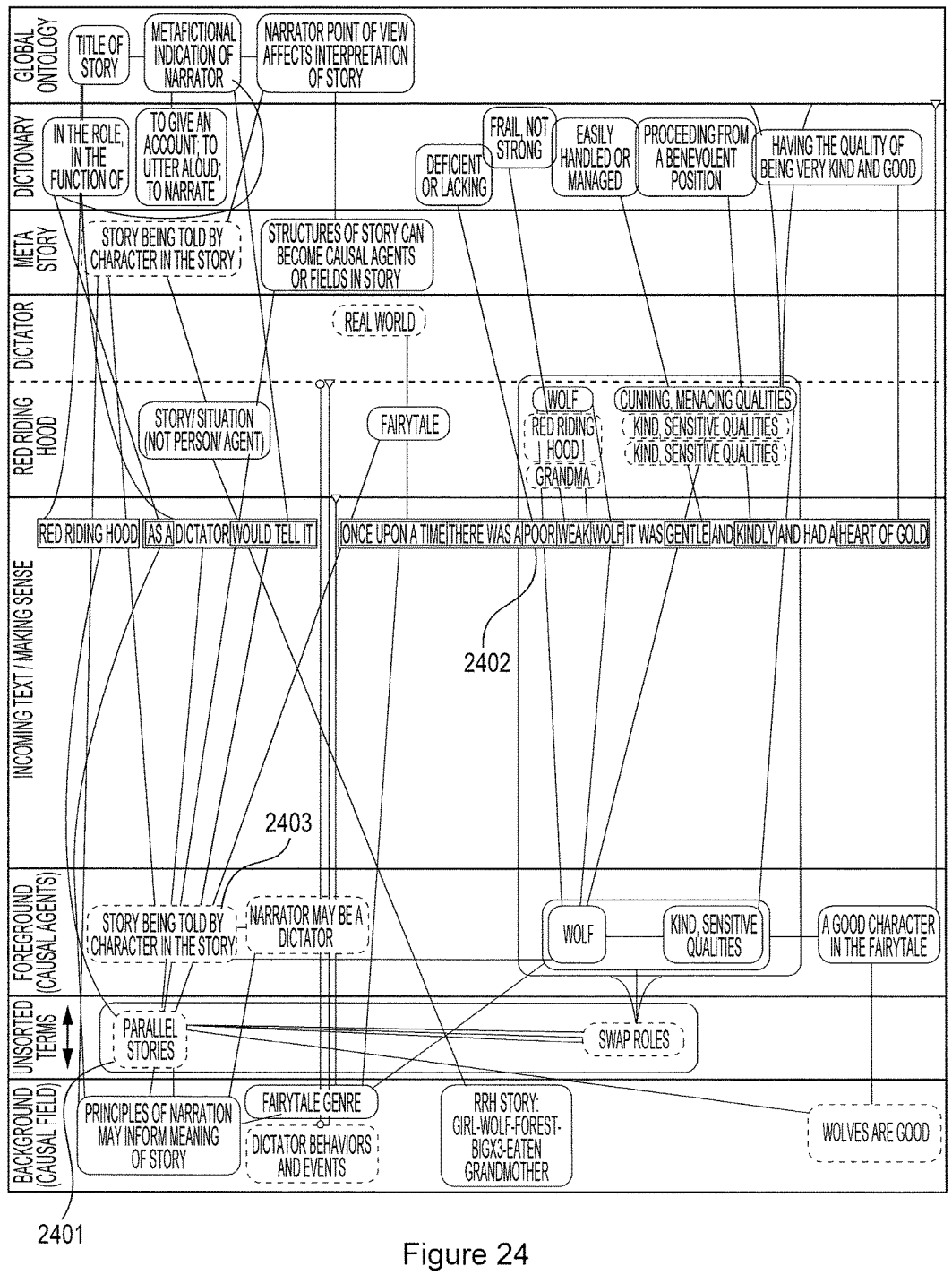
FIG. 24 shows portions of a graphical user interface according to embodiments described herein.

Representing this characteristic of revision requires a way to indicate when activated nodes tipped over this threshold and became part of a new cycle of generation. When an already active node generates a new association in the same cycle of activity, it flashes to indicate re-generation. FIG. 24 shows a node 'parallel stories' 2401 being activated. In FIG. 24, it has flashed to indicate that a new associative cycle is starting. If the same cluster of re-generative nodes is activated more than once, they will be grouped together in a situational box, in order to persistently operate as a unit.

The means by which funnels establish equivalences between different general and story ontologies is important.

Story structure is different from logical structure. This is why the statements 411 for FIG. 4 are implemented in a two-sorted logic. On the right hand side of the turnstile 412 are statements 410 using the logic of the reasoning system. On the left side 413, objects designated by Japanese characters use the 'logic' of category theoretic morphisms, shown in FIG. 6 as 607. Therefore the system of FIG. 2a is a novel implementation of two-sorted logic as well as a novel extension of the art in situation theory. Situational dynamics are modeled as story structure in the manner described here where structures in the model map to category theoretic objects and operations which in turn derive ontology graphs.

A key insight of this new structure 413 on the left hand side is the notion of situating the situations. This is a higher level of organization, in which interpretation is filtered through a network of inferred contexts, which are related to each other in a manner similar to nodes within a general ontology. Governance is a key principle by which these situations are organized.

In order to transfer conceptual structures between dissimilar situations, the method uses the device of analogy, in which networks of partial ontological correspondences are made. Equivalence-finding can be seen in the way a reader matches the inferences provoked by the story with others that are a similar structure. This equivalence will rarely be an exact match, because the conceptual spaces being joined are not compatible, in a manner that is similar to analogy or metaphor. The manner by which this occurs is described below, in the section on funnels.

A purpose of the model will not usually be to build an actual metaphor, but to understand the relations of one situation by viewing it through the lens of another—for example, to understand the nature of one political rally in terms of another.

A mathematical operation in the set of 607 is needed with its graphical interface of the modeling system 214 that can replicate this matching behavior. The model builds on the funnels, which discover equivalences—mappings—between conceptual situations, allowing the mathematical equivalent of creating an analogy, where the objects of comparison are topology-informed structure.

This (partial) equivalence is a feature of analogy-making in humans. In the model, this ambiguity has been harnessed to replicate a range of narrative behaviors. The first is the state of suspension.

Suspension occurs when a concept returned by an inference is tentative. This occurs in several different circumstances, when the inference is: non-explicit and subtle, or the result of imprecise analogical matching between two situations (as mentioned above), or the consequence of equivalence-finding that relied on groups of multiple situations on both sides. The method seeks to understand how unexpected agents emerge, and suspension offers one part of the answer to that question. Suspension allows arrays of concepts to be recorded as possibly relevant, but not yet confirmed.

Later text might recast these suspended elements, demonstrating that they are valid interpretive entities, and perhaps even pivotal agents. The implied imprecision of suspension required a representation that shows when an association is suspected but not yet confirmed. This suspended state is indicated by a dotted line.

Figure 25:
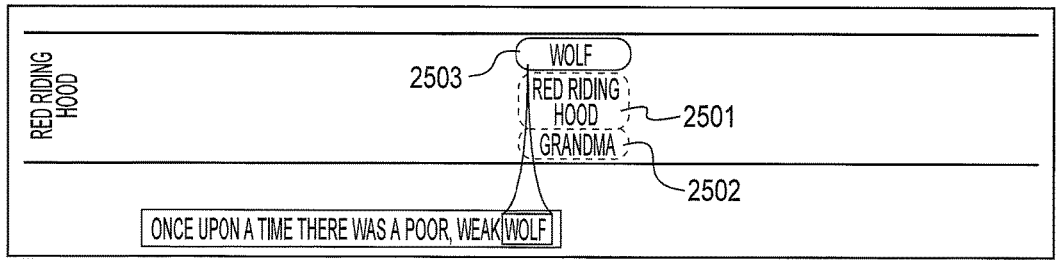
FIG. 25 shows portions of a graphical user interface according to embodiments described herein.

Nodes such as the above are placed within the graphical model as shown in FIG. 25 in which the suspended nodes 'Red Riding Hood' 2501 and 'Grandma' 2502 have been tentatively matched along with 'wolf' 2503. This creates a field of concepts that do not yet have agency, but can be easily recast so they do. In a story, this enables revelations of agency that are unexpected, yet still have a sense of inevitability. Nodes are the most commonly suspended objects, because they can be produced whenever structure-matching between situations occurs and the left-over information is deemed potentially relevant. Suspended nodes can also be produced if they compete for the same position in a situation.

Figure 26:
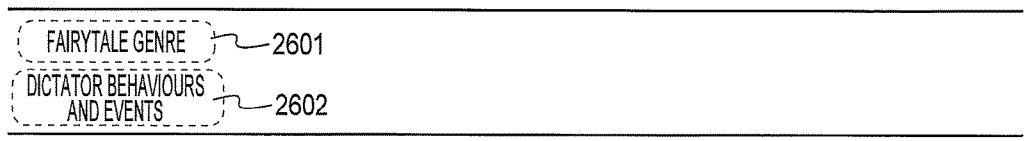
FIG. 26 shows portions of a graphical user interface according to embodiments described herein.

For example, in the sequence represented by the below frame, the node named 'Fairytale Genre' 2601 of FIG. 26 had a neutral state until a competing inference returned a node 2602 that could occupy the same position. The two nodes thus become suspended over the same interpretative position.

When the story has not yet indicated which of multiple nodes is more likely to occupy a contested location, all are transformed from neutral to suspended states. If subsequent text indicates which node should actually hold that position, the states and relationship of nodes will be altered again. 'Dictator behaviors and events' 2701 and 'Fairytale Genre' 2702 are now in a different relation.

Figure 27:
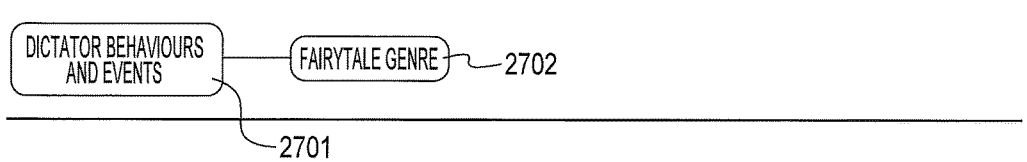
FIG. 27 shows portions of a graphical user interface according to embodiments described herein.

In FIG. 27, the two previously suspended objects have been converted to a neutral state, after their relationship has been established. Nodes are not the only suspended objects—there can also be suspended situations, suspended structure between objects, or a suspended governance relation between situations. All are indicated by a dotted boundary or line. Objects will be suspended whenever: multiple situations are difficult to compare, or the scope of interpretation is uncertain, or two potential inferences occupy the same situational position. The operator that facilitates these processes is the funnel.

Funnels can be of three different types, in order to map how connections can be made across situations, in spite of their inexact matches.

These are three different instances: 1) matching inferences are found within one situation, 2) matching inferences are discovered across more than one situation, 3) existing structures can be matched to abstract 'umbrella' concepts, thereby gathering them into a new, higher-level situation. These operations all require equivalence-finding, but differ in the way the result is channeled.

In all examples of the instance (1) associative funnel, the match is sought within one situation only. This occurs when one situation alone can account for the interpretation of a text token. An example of this is when the character name 'Red Riding Hood' is found within the reference situation 'Red Riding Hood.'

Figure 28:
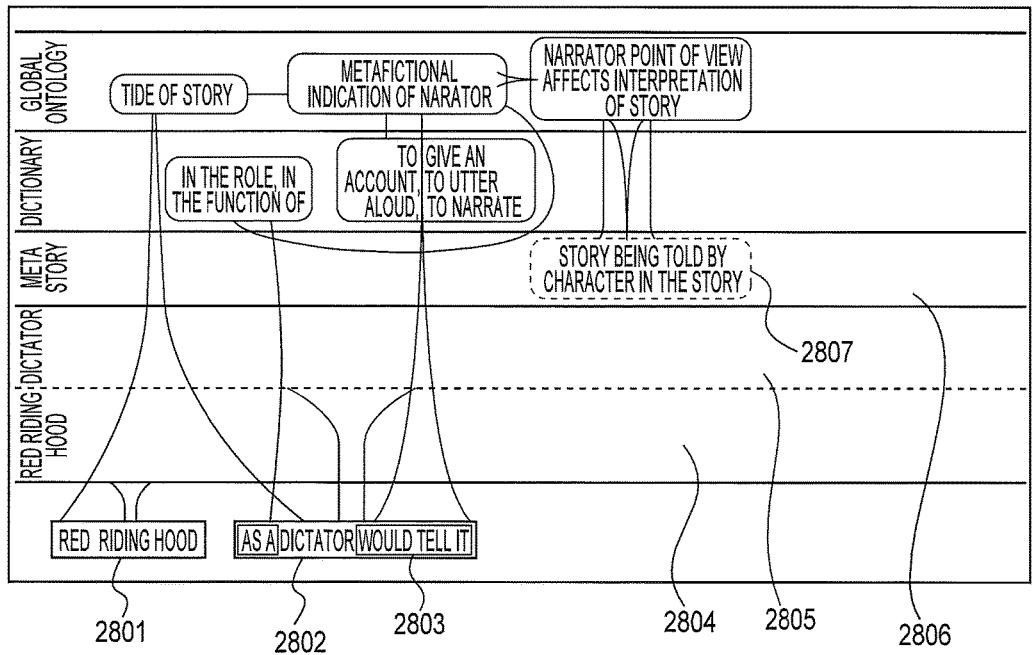
FIG. 28 shows portions of a graphical user interface according to embodiments described herein.

Instance (2) of associative funnel behavior—finding associations across situations—is more complex. It exploits the imprecision of 'analogical' matches with a unique feature: the match can spill between situations in a distributed manner. For example, when the text "Red Riding Hood" 2801 in FIG. 28 and "as a Dictator" 2802 in FIG. 28 is followed by the phrase "Would Tell It" 2803, the existing structure in the Red Riding Hood 2804 and Dictator 2805 situations cannot account for all the inferences required for interpretation—that the story might be narrated by a character in the story. A match is therefore found across multiple situations, including one that has not yet been extracted.

FIG. 28 shows a part of the changing user interface, in which several operations can be seen simultaneously. In the figure, the end of the title "would tell it," is being interpreted. To support it, a new reference situation: 'Meta Story' 2806 is pushed out, and a node is deposited within it. The rest of the interpretation of the text chunk could already be accounted for by existing clusters of concepts (in the Red Riding Hood 2804 and Dictator 2805 bands, at the top-left). The new Meta Story situation band 2806 was needed to capture the inference that the story could be narrated by a character in the story. A node 2807 representing that concept is therefore placed in that extracted band.

Instance (3) of an associative funnel behavior is an extreme version of this cross-situational matching activity. It also contains an element not covered by the other two instances: matching across the entire story field.

The instance (3) associative funnel behaves as a seeker of analogy across all existing structures, comparing them as they change, to discover whether any have evolved to a point where equivalences can be found. In creative writing terms, this is similar to the way a reader uses initial inferences to figure out additional, non-explicit connections, so that everything makes more sense. Because it is a meta-operation, instance (3) waits until other funnels (1) and (2) have completed their activities before commencing.

Figure 29:
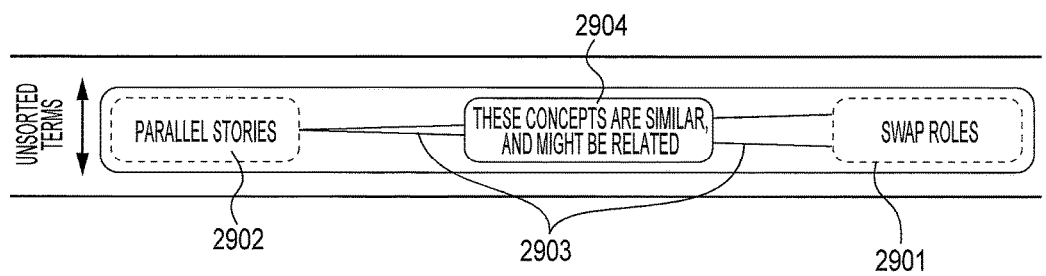
FIG. 29 shows portions of a graphical user interface according to embodiments described herein.

FIG. 29 illustrates an example of an instance (3) associative funnel 2903 match when the words "poor, weak Wolf" 2402 of FIG. 24 alert the reader that the terms of the story might be more influenced by the dictator's perspective than by the traditional "Red Riding Hood" fairytale. By means of devices that will soon be introduced (transformative funnels and boxes), the incompatibility between the notion of a 'kind, sensitive' wolf and the animal's traditionally malicious role are resolved, with the tentative suggestion that the characters might have swapped their usual roles. This produces the new node 'swap roles' 2901. The idea of 'swap roles' bears some similarity with another node established at the beginning of the story, 'parallel stories' 2902, in terms of the sense of doubleness, as well as the notion of a relationship between two sides. An instance (3) associative funnel 2903 is able to detect this similarity and connect the two nodes.

Notice that an additional 'system rather than story' node 2904 flashes to explain the rationale for the connection: 'These concepts are similar and might be related.' This 'system rather than story' state node simply alerts the viewer to the reason for the leap of association performed by this funnel. By assessing all participating situations, the instance (3) associative funnel 2903 acts to cohere situations that are emerging across the entire, distributed field.

In this way, it has 'emergent structure,' in which new networks are generated through the creation of analogy. This operation specifically ranges over the entire field, which can consist of many different conceptual frameworks, rather than what the current art can support. Instance (3) associative funnels 2903 are also charged with the task of discovering new possible connections between situations, rather than simply allowing a non-explicit similarity between already connected situations to emerge.

Figure 30:
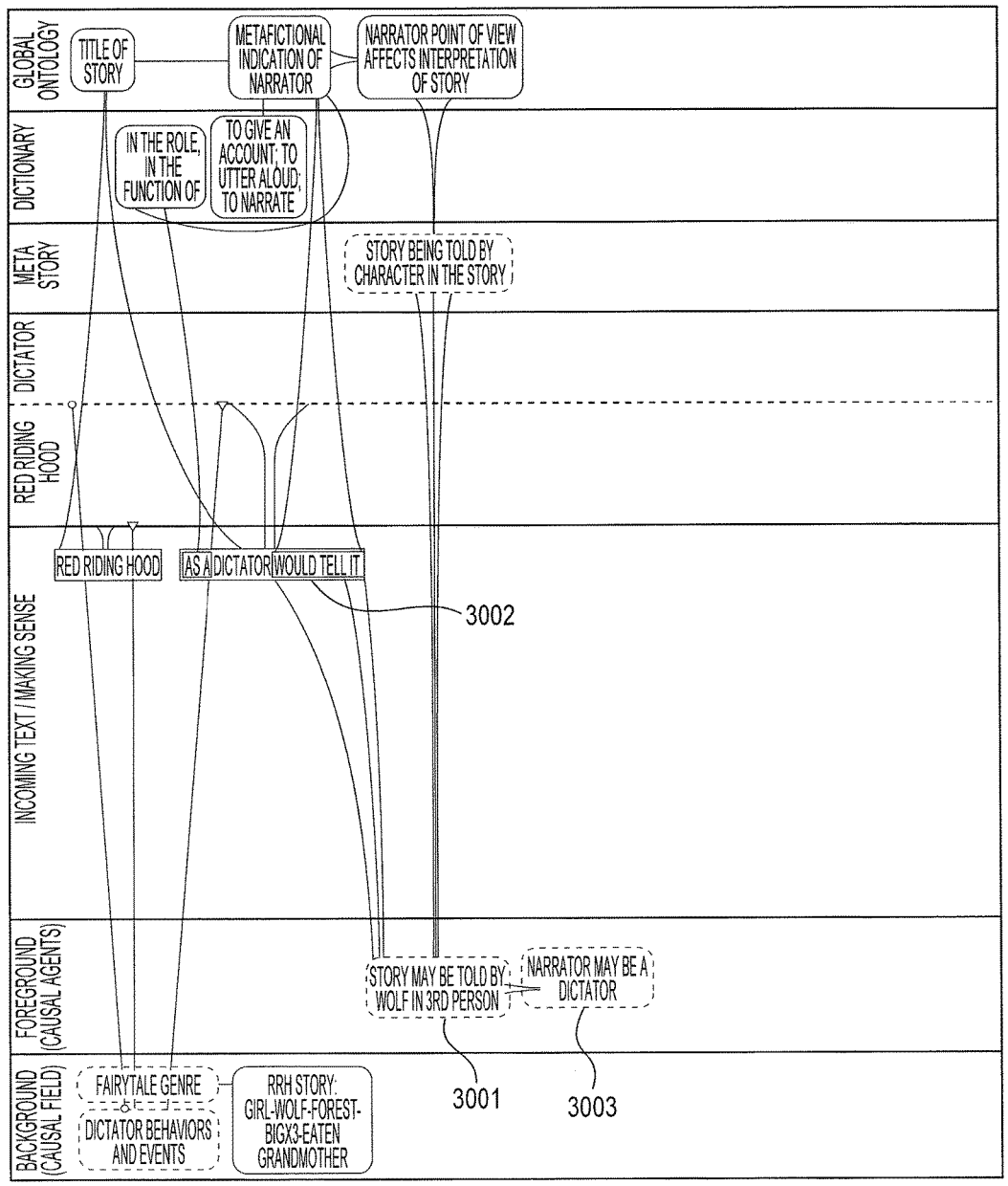
FIG. 30 shows portions of a graphical user interface according to embodiments described herein.

Funnels can therefore also discover potential causal agents in the story, because their matches bring in concepts that bridge dissimilar situations. The instance (3) funnel proactively seeks these higher-level structures, by sweeping new nodes and emerging situations to see if they can be grouped via additional abstractions. For example: when the node "Story being told by a character is the story" 2403 of FIG. 23 also shown in FIG. 30 3001 is added to the otherwise unrelated cluster of concepts associated with "as a Dictator Would Tell It" 3002, the two are combined, to make a new node that accounts for both. This new node is 'Narrator may be a dictator' 3003

This node 'Narrator may be a dictator' is a sort of abstracted summary. This ability to generate a higher 'bridging' conceptual situation has the characteristic of joining previously unconnected structures. Unlike the situations that pre-exist in the general ontology, this emerging situation does not appear as a black band, but is instead being built via relations across the entire field. If it participates in a possible outcome state, such as the possibility that "the narrator is a dictator and will distort the traditional tale of Red Riding Hood so that the Wolf seems favorable," it will be connected to that ambassador when it appears in the band for 'Possible Outcome States.'

Situations are therefore established in a number of ways. Black situation bands indicate large networks of concepts drawn from general ontologies, known as local reference situations, while the persistent structure is a dynamically emerging story ontology. In between these representations are boxes, which bind clusters of related terms. In this ecosystem, the boxed form of situation plays an important role in multi-situational interpretation.

A box is a graphical representation that encircles concepts or structures, to indicate their identity as an autonomous unit. It is also a means of building higher-level conceptual structure. A box indicates that new organized structure has formed during the progression of the story, and defines it so it can be further manipulated. In this way, boxes can be nested or linked, or even generated, in order to serve as building blocks or bridges between other structures.

Such conceptual behavior may relate to other conceptualizations by nesting or other specified relationships, so it is possible for a sentence to simultaneously be the realization of many conceptualizations. In this system and method, this is conceived of as a discrete situation that can be manipulated and nested. In the graphical model, it is represented as a box. A box enables each of these simultaneous conceptualizations to be graphically represented as a unit, so they can be graphically shifted, manipulated or linked. Functionally, boxes can be considered the equivalent of the parentheses surrounding algebraic operations. In the user interface, the box device is represented by a square with rounded edges.

Like other objects, boxes are subject to states. When concepts are grouped associatively, the box reflects that state, the most common because like associative funnels a box indicates association. More complex forms of association are indicated by transformative and conflict boxes, disclosed below.

Figure 31:
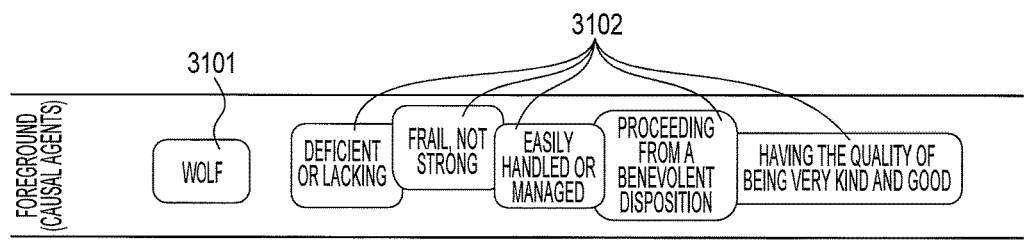
FIG. 31 shows portions of a graphical user interface according to embodiments described herein.
Figure 32:
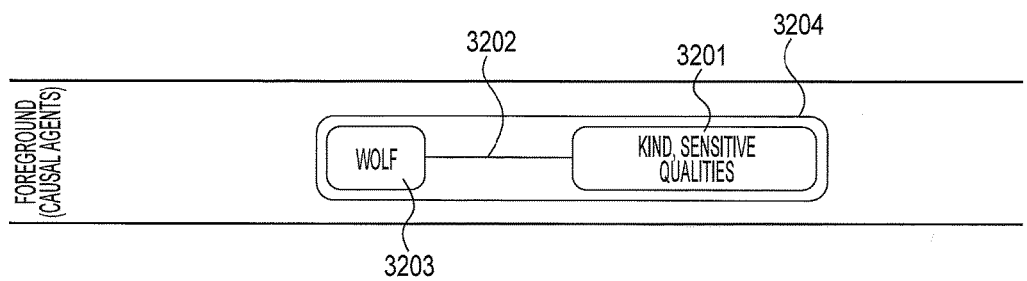
FIG. 32 shows portions of a graphical user interface according to embodiments described herein.

One way boxes are formed is when conceptual structures are grouped into boxes and when the text explicitly connects them. For instance, the example text attributes particular qualities to the wolf's personality, such as "poor," "weak," "gentle," "kindly," and "heart of gold." Graphically, the relationship between these qualities is represented with the concept 'wolf,' along with boxes containing the definitions for each term. These definitions are sourced in the global ontology by association-forming funnels. After finding an interpretive match for each text chunk, the funnels deposit them in the Interpretation bands:

In FIG. 31, 'wolf' 3101 sits at the beginning of the band, indicating its dominance. It is the term to which the others will be linked. At this point, higher-level structure is created. An associative-forming funnel operation from global ontology recognizes that these terms describing the wolf 3102 can all be considered to be 'kind, sensitive qualities.' 3201 of FIG. 32. That inference therefore groups and abstracts the descriptors, collecting them under that one general node. Graphically, this grouping is indicated when an instance (3) associative funnel changes the five boxes into one, higher-level abstraction ('kind, sensitive qualities'). That funnel, not shown in this figure, then also links 3202 the new box to the node 'wolf.' 3203.

When the new node 'kind, sensitive qualities' 3201 is joined to its dominating term 'wolf' 3203, a box 3204 groups them, so they can be referred to as a united situation. This creates a new conceptual network, whose local reach is indicated by the limits of the box. This new conceptual network is a conceptual unit. Graphically, the box also allows for easier manipulation and visual nesting.

By itself, the affordances of association-forming boxes and funnels and the underpinning principles they represent is not enough to create coherence in a textual system with diverse contextual inferences. Equivalence-finding is a way to unite rogue structures into a single network, but it can only occur if the relevant situations are already relatively similar. It will often be the case that a connection between situations cannot be found without some conceptual rearrangement. Indeed, if the story contains unexpected elements or tension, this will be a common occurrence.

The presence of multiple reference situations means there will probably be a low level of discord in most story systems. (A means of measuring discord as tension is disclosed in FIGS. 38 through 40.) That system would need to be tolerant of that minor degree of conflict, in order to progress through the story without becoming confounded. However, when the threshold of conflict has been exceeded (a measure based on the habits of the story so far), a device would be needed to resolve this incompatibility. The model does this by isolating the area that is experiencing direct conflict.

Conflict and transformative operators manage this local resolution. It is not possible to resolve all tensions and conceptual conflicts, in the entire story, before the story is finished. This is because the purpose of the entire text to establish a unifying story ontology that enables such resolution. However, sometimes an incompatibility between conceptual structures will be great enough that the conflict must be resolved in order for the story to progress.

This is an important feature of the model: to delineate a boundary between locally conflicting elements (thus isolating them from the rest of the field). The boundary creates a local area of resolution, and this acts as a bridge so the story can continue. When conflict between conceptual structures arises, it is represented by a conflict box, which surrounds the problematic area in order to indicate conflict.

Figure 33:
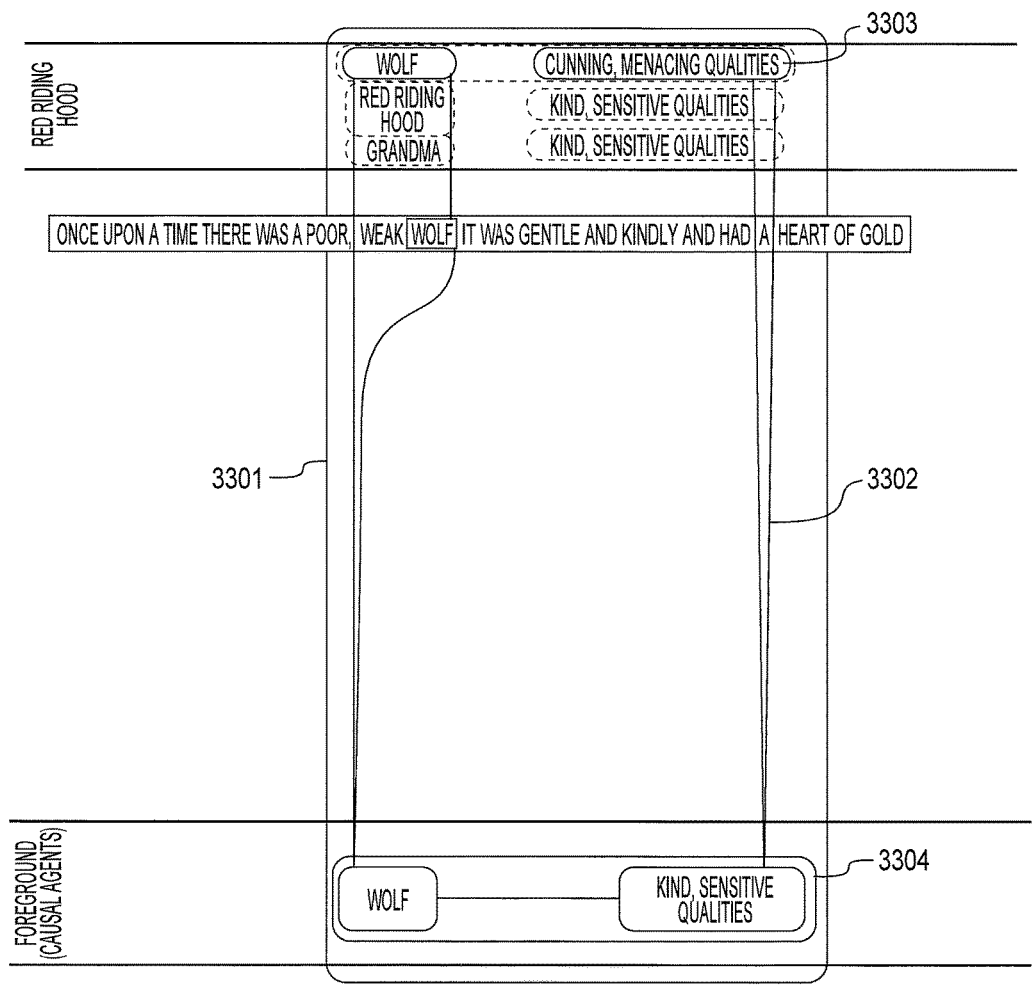
FIG. 33 shows portions of a graphical user interface according to embodiments described herein.
Figure 34:
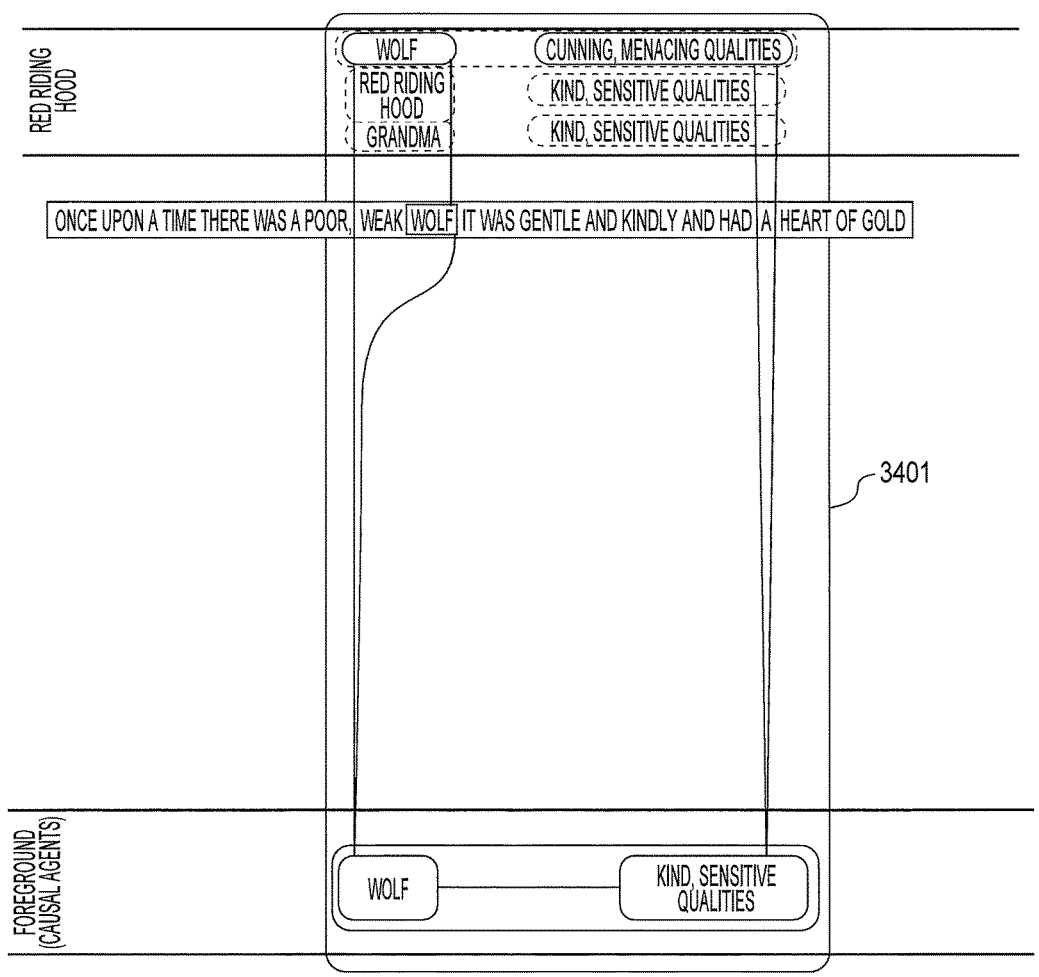
FIG. 34 shows portions of a graphical user interface according to embodiments described herein.

In FIG. 33, a conflict box 3301 surrounds the area of conflict, indicating that a problematic discrepancy between conceptual structures has been identified. A conflict funnel 3302 then identifies the loci of this conflict, and encircles the key areas with conflict boxes. In the above example, two boxed groups of concepts have been drawn into a direct relationship with each other. In one 3303, the wolf is attributed with cunning, menacing qualities, and in the other 3304, his qualities are kind and sensitive. After these incompatible relations have been identified, transformative objects 3401 of FIG. 34 appear.

Transformative operators represent the principles in this system and method that enable the search for new relations that can resolve local conflict. Graphically, this can be seen in the way a transformative box 3401 surrounds the region of the elements in question.

The transformative box indicates that an area is being prepared for conflict resolution. It appears after the conflict box 3301 of FIG. 33 has identified an area of conflict. Transformative funnels then draw from any available structure to seek situations, re-arrangements equivalent structures that can serve as a bridging concept for the conflicting elements.

Transformative funnels (not shown in the figure) are empowered to reach into any ontological space in their search for candidate topologies, and therefore can potentially invoke situations not explicitly indicated by the story text. A transformative funnel is therefore similar to the instance (3) associative funnel, but with the extra directive to use the retrieved information to resolve conceptual conflict.

Figure 35:
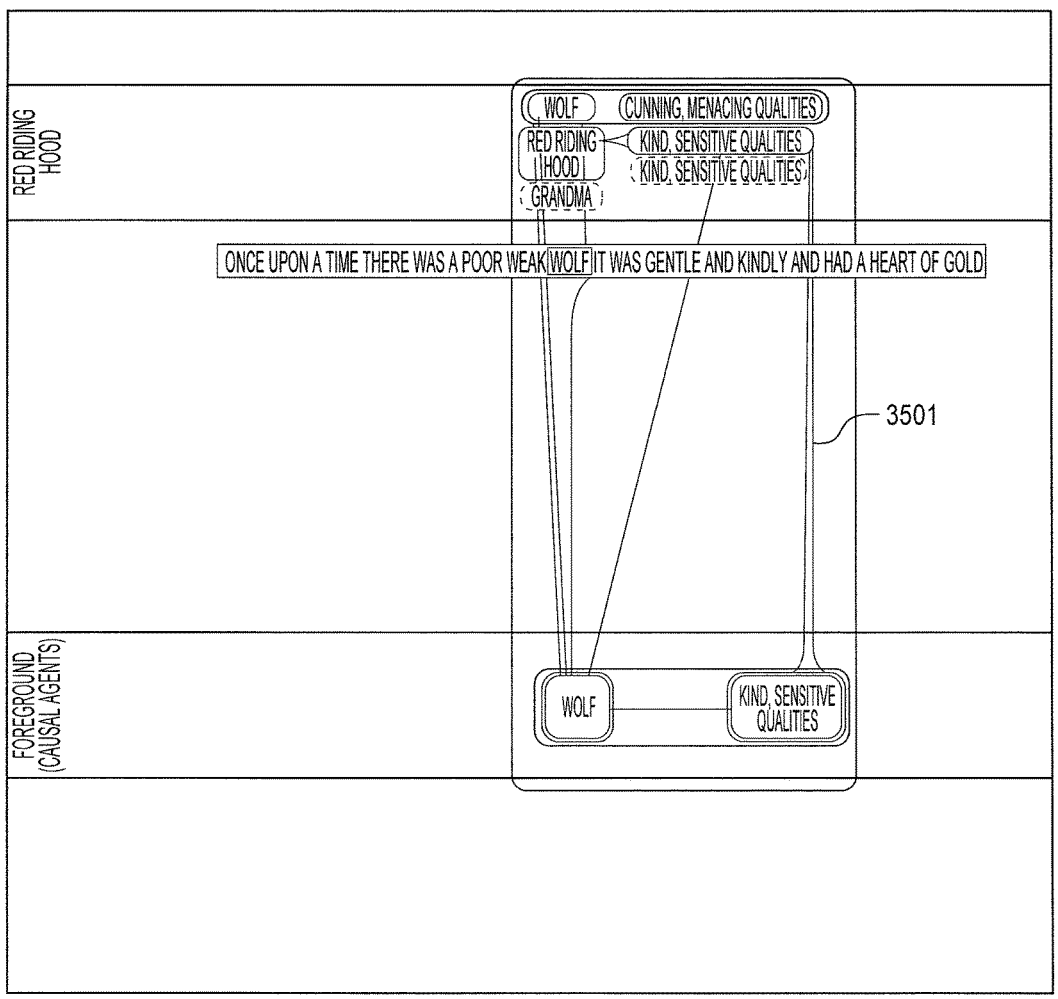
FIG. 35 shows portions of a graphical user interface according to embodiments described herein.
Figure 36:
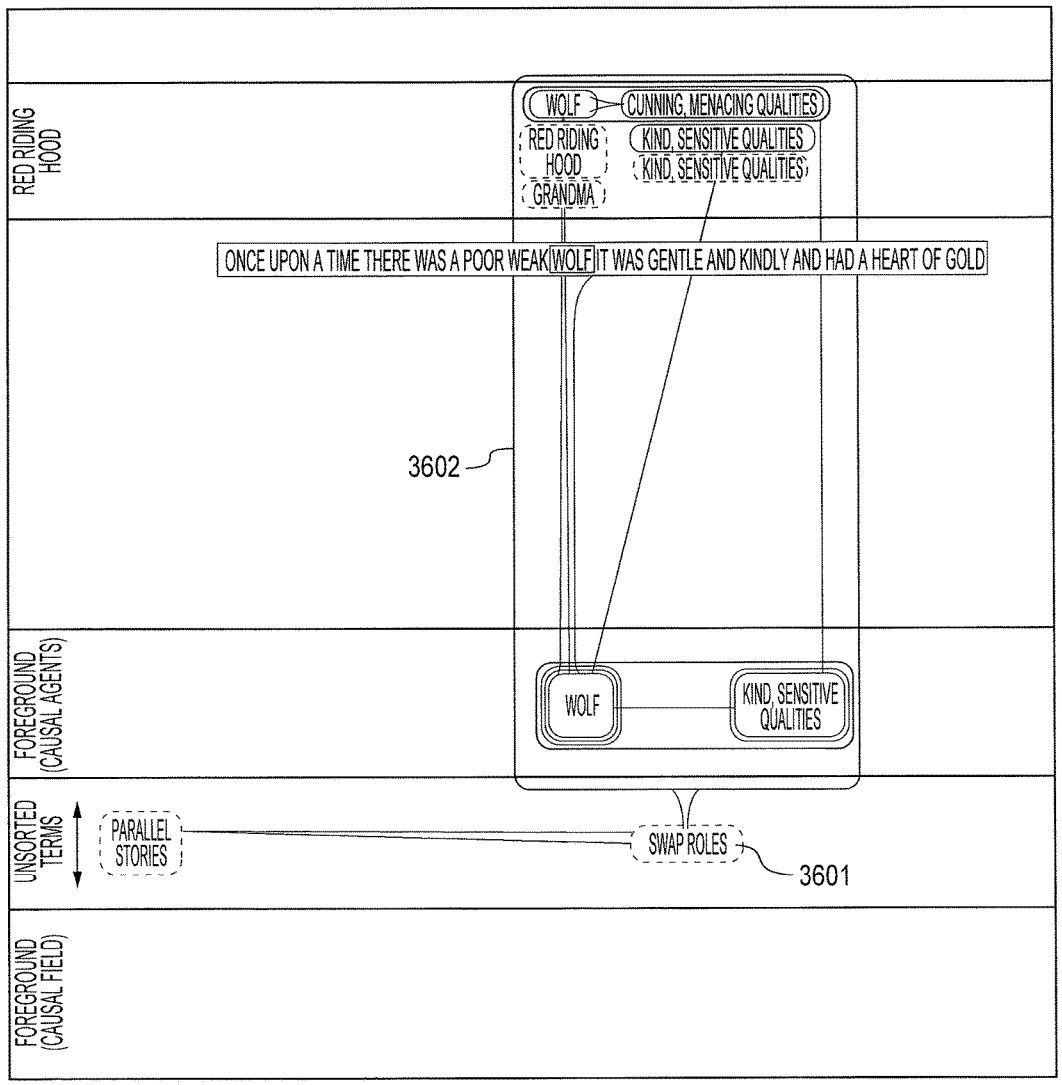
FIG. 36 shows portions of a graphical user interface according to embodiments described herein.

In FIG. 35, this radical transformative funnel operation 3501 can be seen in a sedate graphical representation. Here, the transformative operators have identified a conflict between the qualities of the "Wolf" in the given story, and the traits of the wolf in the fairytale reference:

After the transformative funnel locates a conceptual structure that can house the conflicting elements from the new and traditional versions of the story, the emerging story structure is modified to accommodate it. In this example, a resolution occurs when a new node is added: a node that suggests the wolf in the emerging story might have swapped roles with other characters from the traditional fairytale. That new node can be seen in FIG. 36. The node 'swapped roles' 3601 is attached to the troublesome cluster of terms 3602. This bridging idea preserves the structures from the two incompatible references, whilst at the same time stabilizing their relationship. Once a resolution is found, the conflict and transformative operators disappear, leaving behind persistent boxes and lines.

Even though transformative operators are empowered to establish new, stabilizing situations, they still operate within constraints. Their range of permitted modifications is limited by the emerging story network. Another rule is: any resolving conceptual structures retrieved should be as close as possible to those already established. For instance, a precedent for the notion of 'role swap' already existed, in the node 'parallel stories,' which was established earlier. This initial structure informed the scope of the search, so the transformative funnel returned a related idea, 'swap roles' 3601. These resolving structures are sought from any general ontology available in the global ontology.

Conceptual structures can be built in some key ways using the devices of the dynamic story model. The most central is the funnel, which creates new structure by finding equivalences between diverse situations, thus bridging them. Due to the way this equivalence-finding is not precise (because the conceptual structures involved are different), indicators of suspended states are utilized to record the unconfirmed information that results from partial matches.

When a new conceptual structure is created that will operate as a persistent conceptual unit, it is encircled by a box. Boxes establish a new, local situation of conceptual structures, that act as a combined entity. Boxes can operate as building blocks and bridges, but they can also fence off areas of conflict between conceptual structures.

Such conflicts are indicated by conflict operators. This means that when a local area of conflict is detected, it is fenced off so it can be dealt with. Graphically, that activity is represented by a box. Other operators besides boxes that deal with conflict are conflict funnels (to pinpoint which relations are incompatible), nodes and lines (to persistently record this incompatibility).

Once conflicting elements have been identified, a series of operations seeks a resolution. Graphically, this embodiment indicates these activities using transformative operators. Transformative funnels demonstrate how this system searches outside existing reference situations to locate the bridging concepts that can resolve such conflicts. As mentioned above, these operators can search in any general ontology, whether already referenced or not, as they seek these resolving concepts. They are guided by the conceptual structure of the conflicting objects and the situations that support them, as well as the structure of the overall story ontology so far. The aim is to find resolving conceptual structures that represent a best fit of all these participating networks.

During all these processes, additional structure is built, an emerging story ontology that acts as an interpretive framework for the story. The key terms of this emerging interpretive structure appear in the interpretation space, at the bottom of the field, in the form of an agent network. That bottom zone is the final target, the place in which the interpretive key for the text is constructed.

The interpretation space is designed in such a way that causal agents can emerge within it, through its 'agent' and 'context' bands. These agents have properties that are the result of the operators already described, but in this space, there are additional factors that enable them to perform novel functions. In the interpretation space, they assemble conceptual structures in such a way that causal unfolding can be imitated, and aspects of impetus can emerge.

Turning now to the connection between categories as created in the model and ontology graphs of the modeling system 214. Many models of the world can be supported by current reasoning systems 103 of FIG. 1; the current art is mature and useful. Adding in the situation theoretic categoric logic by the innovations of the system of FIG. 2a gives the ability to represent the open set of knowledge about behaviors that humans commonly reason over and that are managed by the system.

The open set implies that there are behaviors and structures that are not expressible in the logic necessarily used in reasoning systems. This is a well-known problem.

When such situations are encountered in reasoning systems (so-called 'soft objects'), they appear as an aggregate of facts that cannot be fully expressed or logically explored. For example, many biomolecular systems simply cannot be modeled in the current art. This fact is explored in some detail in "A Two-Sorted logic for structurally Modeling Systems," by HT Goranson and Beth Cardier, in Progress in Biophysics and Molecular Biology 113. 2013. A prepublication copy of this is included in U.S. provisional patent application 61/732,326, filed on Dec. 1, 2012.

The system of FIG. 2a as embodied in the FIGS. 3-46 addresses this directly and provides a fundamental advantage to having a second sorted logic driven by the model, the ability to reason differently, more broadly and more powerfully by including other systematic structures drawn from narrative mechanisms.

The categoric dynamics 413 on the left side of the turnstile 412 of the equations 411 of FIG. 4 satisfy several criteria. Different domains will generally require different types. The current art has an application where linear logics of reasoning systems that deal with quantum physics use monoidal categories. Embodiments described herein can use these or topos categories.

Figure 37:
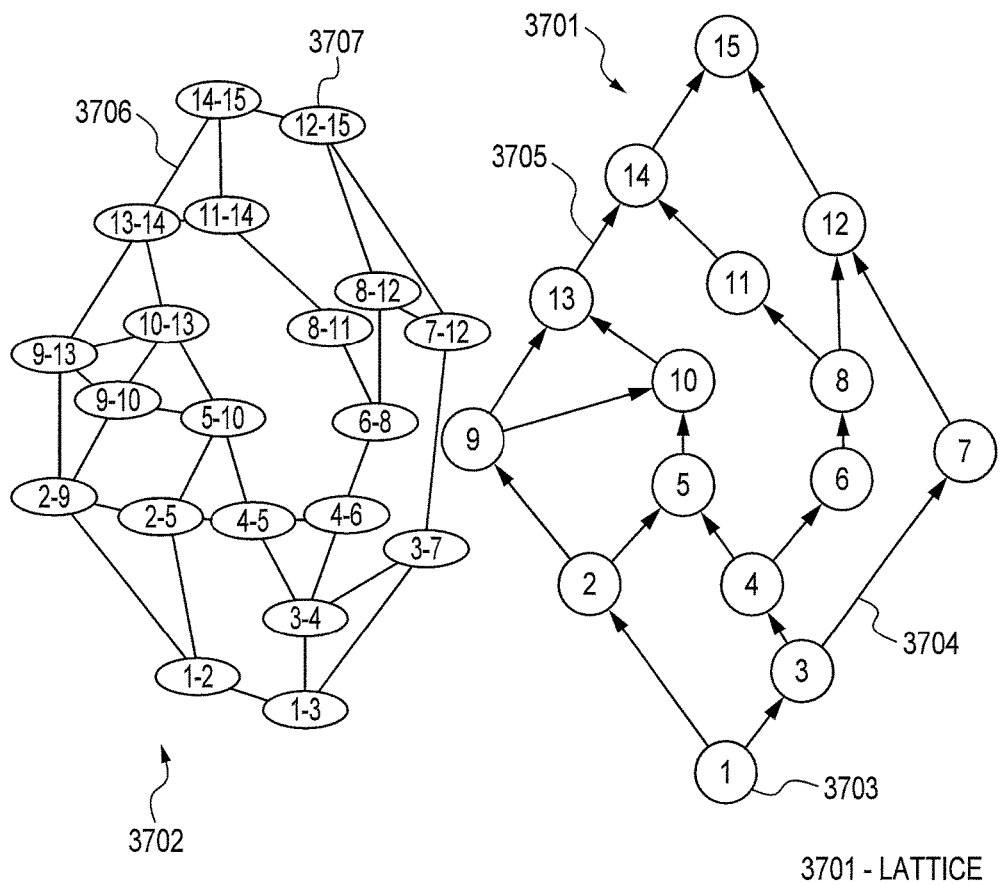
FIG. 37 shows a structure used by the systems and methods described herein.

Monoids and topos are well known mathematical objects in category theory and the practice of them is well known in the art. However, an embodiment can employ the far simpler and more intuitive 'skeletal' categories as illustrated in FIG. 37.

The infon expressions as captured in the system result in concepts that deal with conditional knowledge—conditional because they capture situations through a representation of the multiple perspectives that bear on it, and for a limited duration. The restrictions entailed in this conditional perspective are further limited by the way they are in transition, and will change their relationships when the next piece of information appears as shown in the examples disclosed in the previous figures.

These transitions of overlapping, limited inferences are a form of narrative reasoning as handled by the system of FIG. 2a as a whole, regardless of the domains addressed by the reasoning system 202. The dynamics of the modeling system 214 as illustrated above will remain much the same regardless of domain, or whether the information arrives as text, video footage, or some other data format, and the invention can be applied generally. An embodiment that addresses the biomedical domain is described in the previously mentioned journal article, included in the provisional filing.

In any domain, infon expressions 410 on the right side of the turnstile 412 of 411 statements of FIG. 4 is both linear and intuitionistic. 410 statements are linear in that the sequential position of the facts is significant. It is non-commutative, because the framework for interpretation can change as each new fragment of information emerges. An event that precedes another is thus considered to be a potential cause. If the reasoning system used a Bayesian-structured logic, the connectives would be probabilities ('this x has a y probability of being in the exclusive set of causes') that are dynamically adjusted. Embodiments described herein can subsume the Bayesian connectives with a more semantically formal notion.

Regardless of the logic employed by the reasoning system, this linear quality allows the embodiments described herein to construct causal lattices of the infons, and by extension, all their explosions to primitives, all their infon elements and all the ontology graphs each has.

A representative of such a lattice 3701 (being a skeletal lattice) is on the right hand of FIG. 37. A user of the modeling system 214 would have this displayed on a screen and read it starting from the bottom 3703 and temporally moving to the top. Nodes 3703 are infons of type 402 and lines 3704 are Ku-mediated connectives.

The 410 statements are intuitionistic as well. This means the semantic interpretation of any infon is subject to change, based on context, as the Ku function is applied, for example in operation 603 of FIG. 6. These two qualities allow the system to abstract structure from the 410 statements to any number of categoric spaces. Basically, this structure represents the effects of overlapping ontology graphs for each node, paths 3704 indicating cause and dark paths 3705 indicating dominant cause.

FIG. 37 also shows the half-dual 3702 of the causal lattice. For illustrative consistency with 411 of FIG. 4, the figure is on the left. Half-duals display the mathematical structure of 413 operators (on the left of 411 expressions), where skeletal lattices display the mathematical structure of 410 statements on the right side of 411 statements.

A convenient way to think about this categoric structure is to think of 410 statements as describing causal relationships in logical (read: Newtonian physics-like) terms. Each link 3706 in the derived lattice is a (potentially) causal link.

(The relationship between a lattice 3701 and its half-dual is graphically apparent but well known in the art: links in the lattice 3704 become nodes 3707 in the half-dual 3702.)

Figure 38:
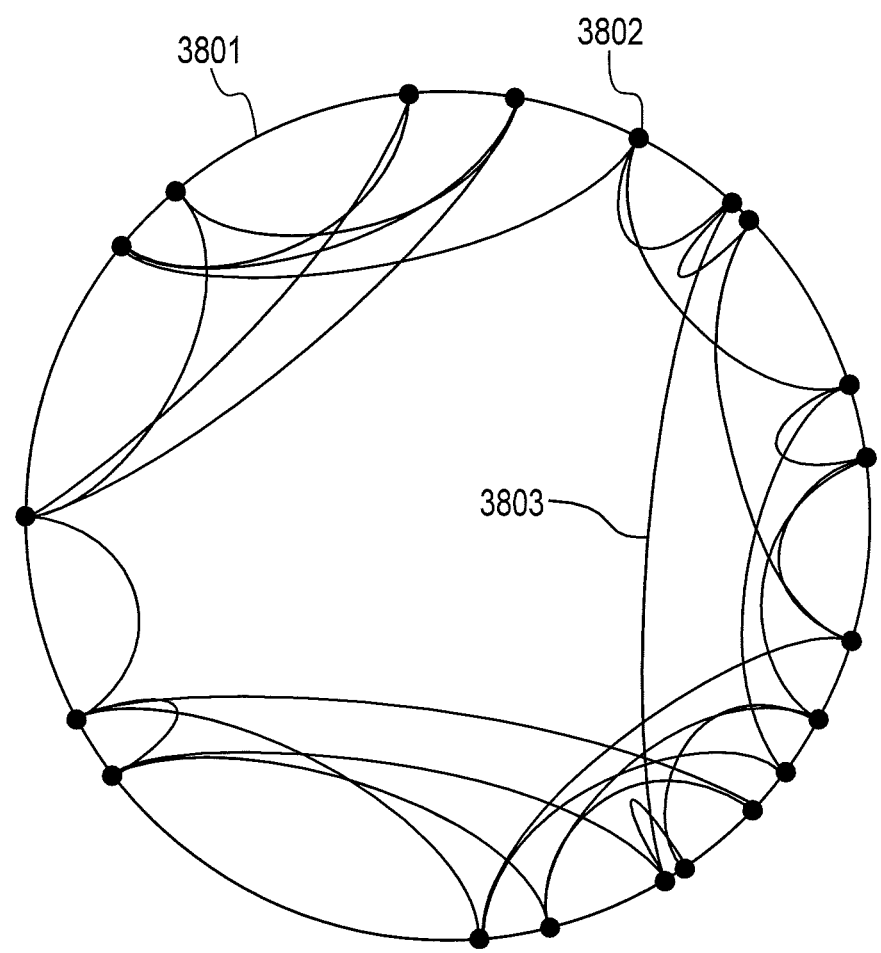
FIG. 38 shows a structure used by the systems and methods described herein.
Figure 39:
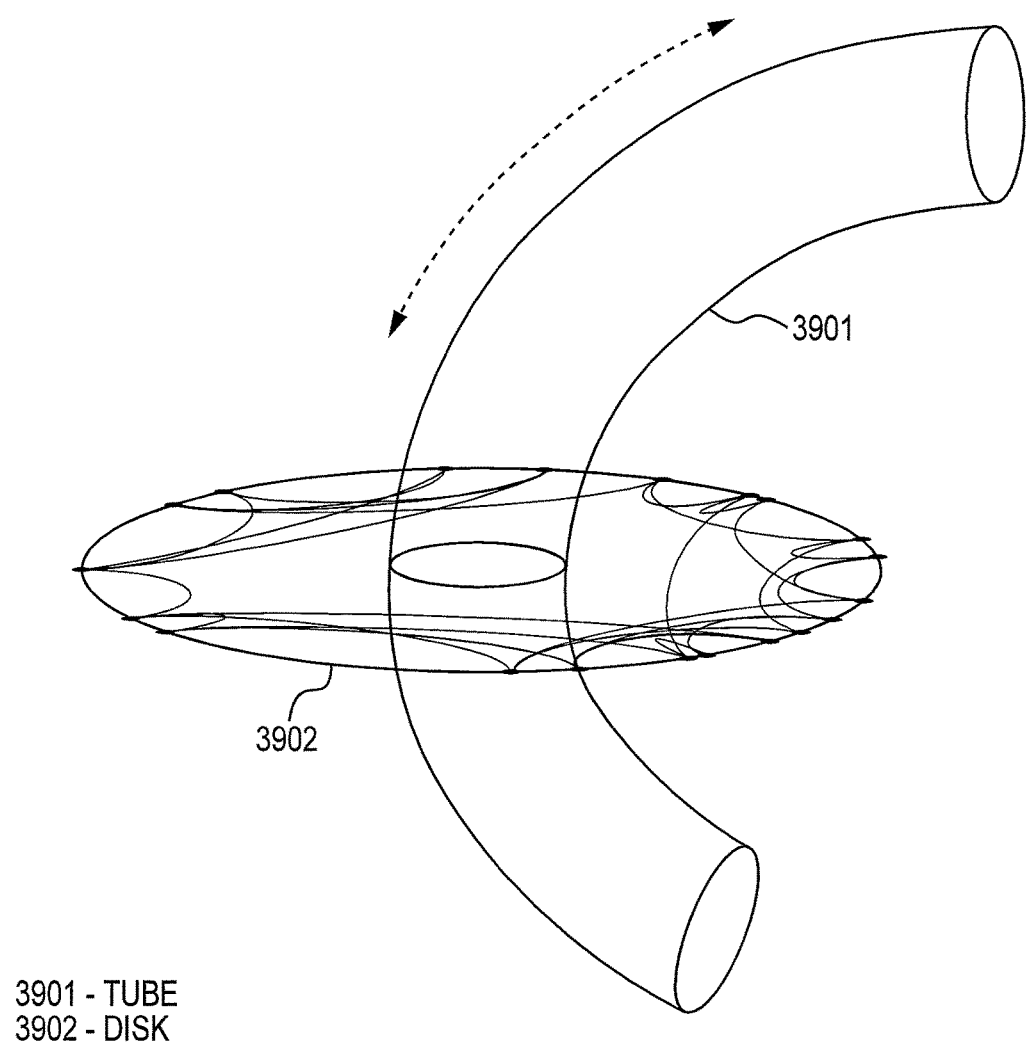
FIG. 39 shows a structure used by the systems and methods described herein.
Figure 40:
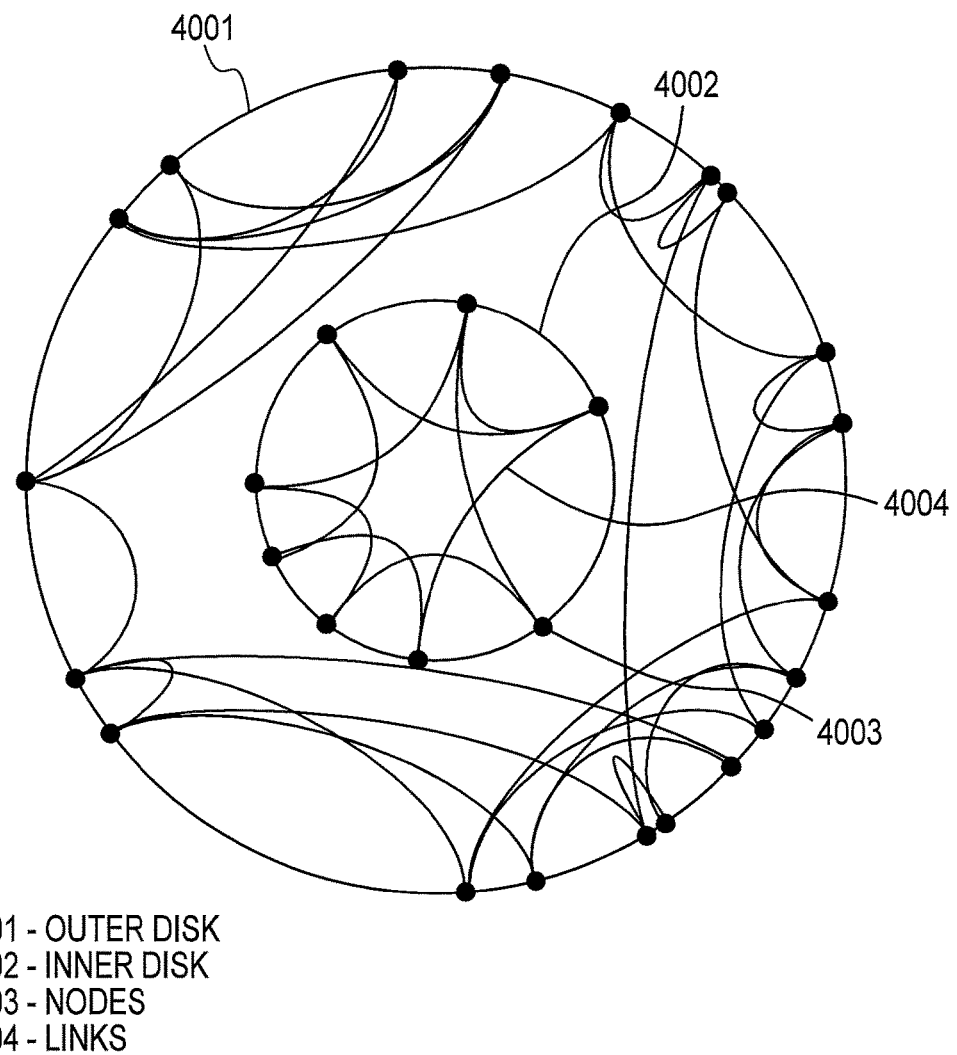
FIG. 40 shows a structure used by the systems and methods described herein.

A user of the modeling system 214 will be able to toggle among the display of the dynamic model of FIGS. 7-36, the skeletal causal lattice 3701 at that stage, the half-dual 3702, and the half-dual as illustrated in FIGS. 38-40.

Taking the half-dual essentially turns each of the causal links 3704 into an element in a contextual structure. Together, these 'skeletal categories' 3702 graphically and mathematically capture the structure of causality, without any of the semantics of the original elements. Such categories collectively comprise a universe of causal agent structure. Because they are scrubbed of the semantics 601 of the reasoning system, the overall system of FIG. 2a takes advantage of the fact that these objects are categories and that a formal vocabulary of operations exists among them.

Categories are objects that capture structure. Operations between categories are transformations of those structures and (in the case of the described embodiment) are morphisms. A great many types of morphisms exist. Strictly speaking, relations within a category are morphisms and relations between categories are functors. But the categories of the embodiment themselves exist as elements of categories so for convenience the term 'morphism' is used for all operations, and composed together.

Mapping from the right 410 to the left 413 of the turnstile 412 is also a category theoretic morphism. Comparing any two 413 objects is a morphism as well. So for example, one can have a situation of a person's emotions, with some 410 descriptions but the situation is presumed to be mostly soft. This is because 410 expressions know some things about that person's emotional state, but not all. A system of FIG. 2a can impute more of the structure as an emotional 'story' of 413 expressions by comparing them to a great many known dynamics as characterized in the model. Rather than try to handle this emotional state as a list of facts as would be the case of systems of FIG. 1, it is instead characterized as a situation and characterized in terms of other, possibly similar situations.

FIG. 38 illustrates an example, simplified half-dual 3801 with points 3802 distributed on a circle. Points 3802 are similar to 3707 and lines 3803 are similar to 3708. Any shape can be used; the circle is chosen here for clarity. A user interface for the modeling system 214 based on this distribution of points can be used as a complement to the dynamics model described above.

With suitable attraction-repulsion assignments, the distribution of points and the connecting lines 3803, can indicate by their arrangement in the user interface, patterns and symmetries key dynamics of the kind addressed by the model. These can be used to characterize situations in the manner mentioned above. In this form of expression, the semantics of the dynamic model are stripped away and only the re-usable dynamics remain. In other words, disks of the type of FIG. 38 can be used to evaluate principles of the morphisms of the system, regardless of their persistent connection to specific instances as described in the disclosure of the model, and specific facts that drive them.

However, by inspecting a node, link or collection of same, a user will be able to audit the specific dynamics and facts involved.

The disk is interactive. A user of the modeling system 214 can examine the dynamics by browsing in a manner described. Or she can modify the dynamics based on outside expertise, as indicated by the input 210 of FIG. 2.

Assuming the disk (or other shape) is two dimensional, some useful dynamics can be displayed by the modeling system 214 in the form of expression shown in FIG. 39. A 'tube' 3901 is threaded through the center of the disk 3902. This tube presents itself as a cylinder but it could be any prism or distended column.

This 'tube' is a local topological distortion of a more complex form used as a representation skeleton. The form is generated from the global definitions of the category and morphism types employed in the implementation. In the system of FIG. 2, using skeletal categories and the dynamics-as-morphisms described above, the system can use a periodic minimal surface for representation in 208a, 208b, 208c.

On that surface are nodes and links representing the entire universe of dynamics of the type illustrated in the example model. FIG. 40 shows how the original disk 4001 with the relationships of a special situation can be displayed on the outside of the disk, and some pertinent relationships inherited from the inner tube are displayed on an inner disk 4002.

These inner disk relationships are nodes 4003 and links 4004 that happen to be within some critical (system or user defined) distance along the tube. Their position on the inner disk is a simple projection. The disk 4001 may be displayed as a torus to enhance the intuitive nature of this projection.

As with the nodes on the outer disk, there is a set of repulsion-attraction rules that govern how these nodes 4003 are distributed on the disk. These rules are a result of the universe of categories used and can be readily specified by a mathematician skilled in the art.

In both inner 4002 and outer 4001 disks, many nodes exist in a stable state but can be moved by a user into another stable state. All other nodes will adjust accordingly. A haptic interface of the modeling system 214 (physically or through visual feedback) can indicate the force required to accomplish such an operation. Some such state changes will increase or decrease the tension in the system and this will be indicated by the curvature of the links: closer to the disks is more tension.

The inner and outer nodes interact with each other in a manner similar to the way the nodes of each one interacts with its own nodes.

The user cannot by input devices rearrange the nodes on the inner disk 4002 individually. Instead, she can move the 'tube' up and down to select a subset of the larger governing dynamics of the system. She will have no direct control over how the arrangement of the nodes on the inner disk 4002 appear, though they will move when nodes on the outer disk do.

The user of the modeling system 214 will be able to manipulate nodes on the outer disk 4001, including eliminating, adding, splitting and combining them. Example operations can be similar to those disclosed in U.S. application Ser. No. 13/919,751 filed on Jun. 17, 2013, and used there to control a functional reactive array. That functional reactive array is identical in type to the dynamics of the outer disk in FIG. 40.

Nodes 4002 and 4003 can be usefully colored to designate key qualities, for example whether the node represents part of a dominant causal path 3705.

A typical use is to create highly tensioned, symmetric arrangements of nodes on the outer disk, including symmetries of colored subgroups. The manipulations are to rearrange the nodes on the outer disk and to move the inner 'tube,' changing the nodes and their arrangement on the inner disk by moving that 'tube.'

Using these conventions, a skilled user can edit and create dynamics such as are disclosed in the embodiment of a narrative dynamics model. To support the system of FIG. 2.

Such a system can support quantum logics and behavior throughout, in all areas. Concerning the infons and ontology infons, their compounds and statements are readily supported by 'and-then' quantum connectives known in the art. More powerful is the ability to capture quantum possibilities in the narrative model. Though previously mentioned in passing, we now turn to explicit support for multiple simultaneous states in the model.

Multiple simultaneous users using multiple instances of the modeling system 214 can view and record simultaneous instances of numerous situations, and the connections and dependences between all of these as they change and influence each other. As more possible states appear together, the more need there is for a representation in the graphical syntax of the dynamic model user interface which is able to capture their relationships at a higher level so that multiple dimensions can be viewed simultaneously. This multi-dimensionality can take the form of a novel modeling method, using a 'molecular' netaphor. It can be appended to any complete view previously described in FIGS. 7-36 because there are two ways to represent the complex situations found at the bottom of the model's frame.

One—the 'simple style'—is apparent in FIGS. 15, 16, 17, 18, 19*c*, 23, 24, and 36, which are closer in style to the standard nodes and links of knowledge representation in the current art. The simple style is useful whenever it is important that individual nodes be visible, as in the case of annotation-drawing or close logical analysis. It can be considered to be more of a classical representation.

The other form has already been referred to in relation to 'possible outcome states.' This form is referred to as 'molecular,' both because of the visual presentation in the user interface and the reference to quantum states of molecules. The name refers partly to its multiple dimensions, and also to its compound form. This second form is useful for an overview of multiple situations and their relationship to each other. It can be considered to be more of a 'soft' representation.

Figure 43A:
FIG. 43a shows portions of a graphical user interface according to embodiments described herein.
Figure 43B:
FIG. 43b shows portions of a graphical user interface according to embodiments described herein.
Figure 44A:
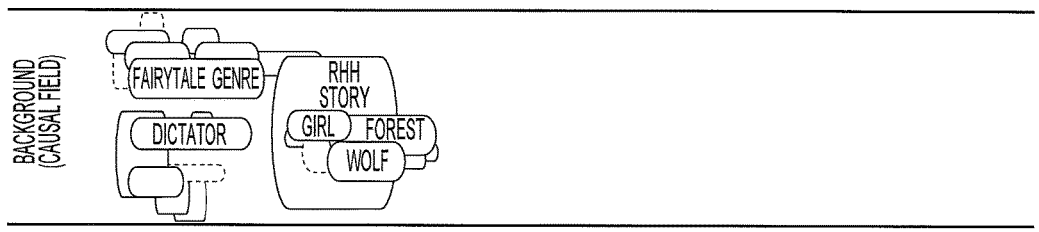
FIG. 44a shows portions of a graphical user interface according to embodiments described herein.
Figure 44B:
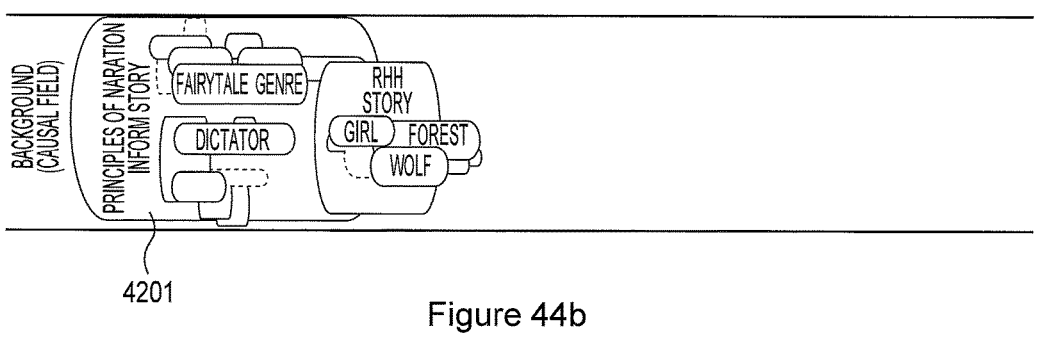
FIG. 44b shows portions of a graphical user interface according to embodiments described herein.

For a close-up of the bands of the interpretation space in each of these two forms compare FIGS. 43*a* and 43*b*, the simple form, with FIGS. 44*a* and 44*b*, the molecular form.

Figure 41:
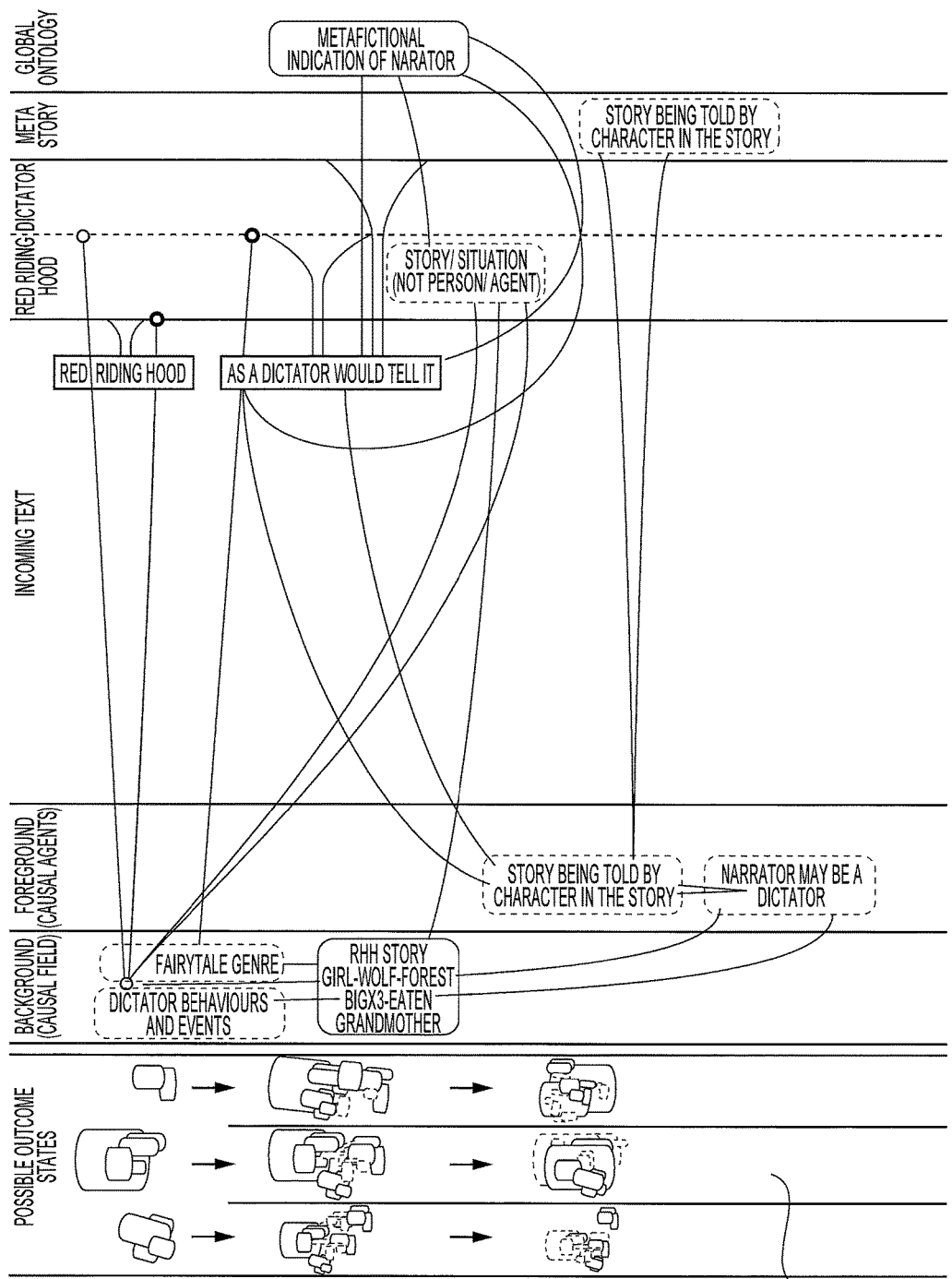
FIG. 41 shows portions of a graphical user interface according to embodiments described herein.
Figure 42:
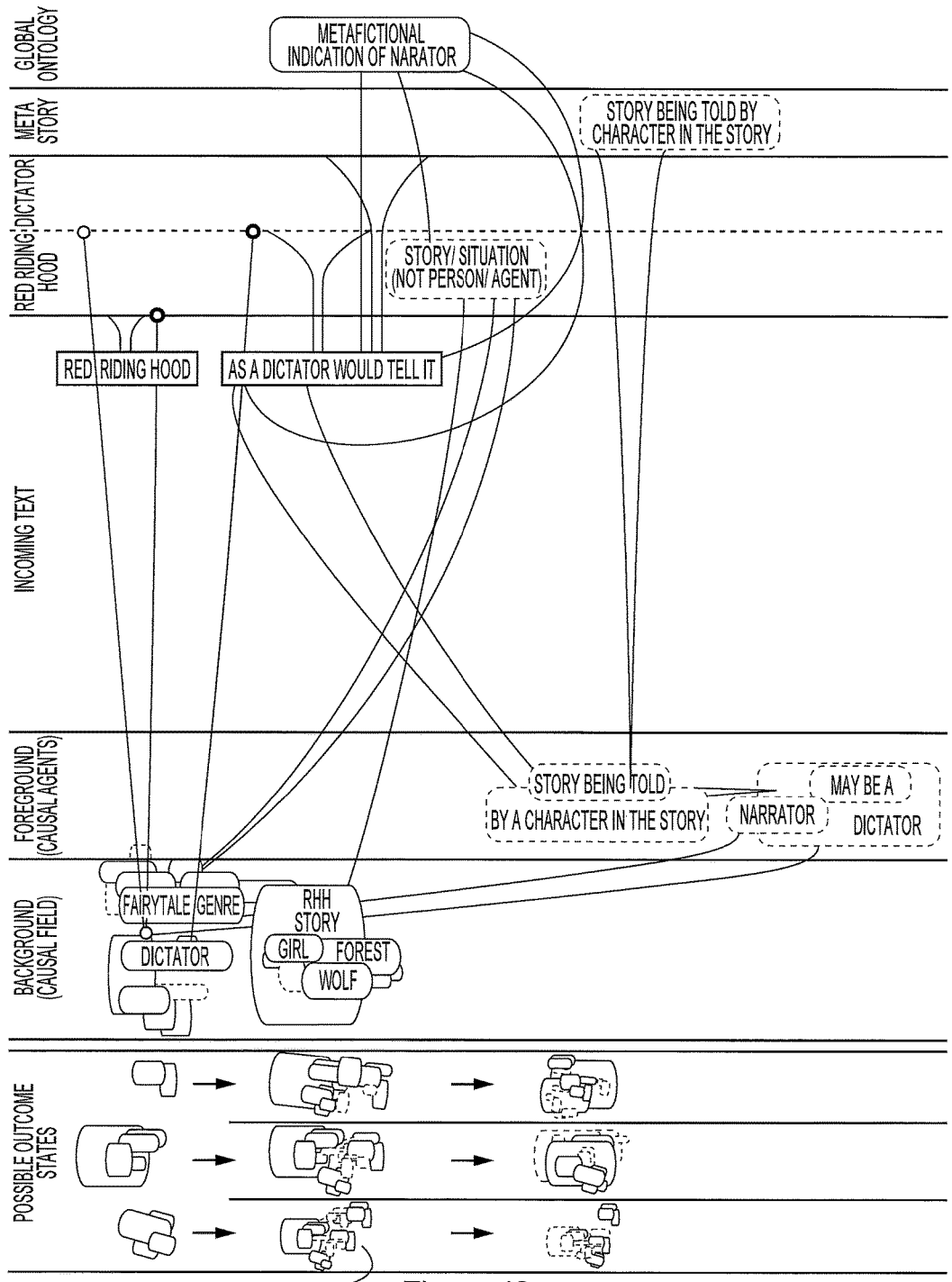
FIG. 42 shows portions of a graphical user interface according to embodiments described herein.

For a comparison of these same simple and molecular representations, but including the rest of the layout, compare FIGS. 41 and 42, both of which employ the simple format in the upper bands. Only the lower bands in the molecular form have the more complex representational forms. It is possible to include the molecular style across the entire layout as in FIGS. 15, 16, 17, 18, 19*c*, 23, 24, 30 and 36 but in the described user interface, the increasing levels of informational complexity and density are represented by the way the upper levels are simple and the lower bands accrue more dimensionality in the molecular form.

The 'possible outcome states' band itself and basic elements are represented in the same way in both forms because the objects in this band are too complex for simple representation. In FIGS. 41 and 42, the 'possible outcome states' band 4101 and 4201 contains shrunken and likely illegible objects. This compression is necessary so that the complex objects can appear on the same screen as the other areas of the model.

In the model's graphical user interface, it is possible to expand the 'possible outcome states' band to a size in which the objects and their titles are visible. This view also enables objects to be scrolled vertically, to see the many simultaneous possible states, or horizontally, to see their progression.

Figure 45A:
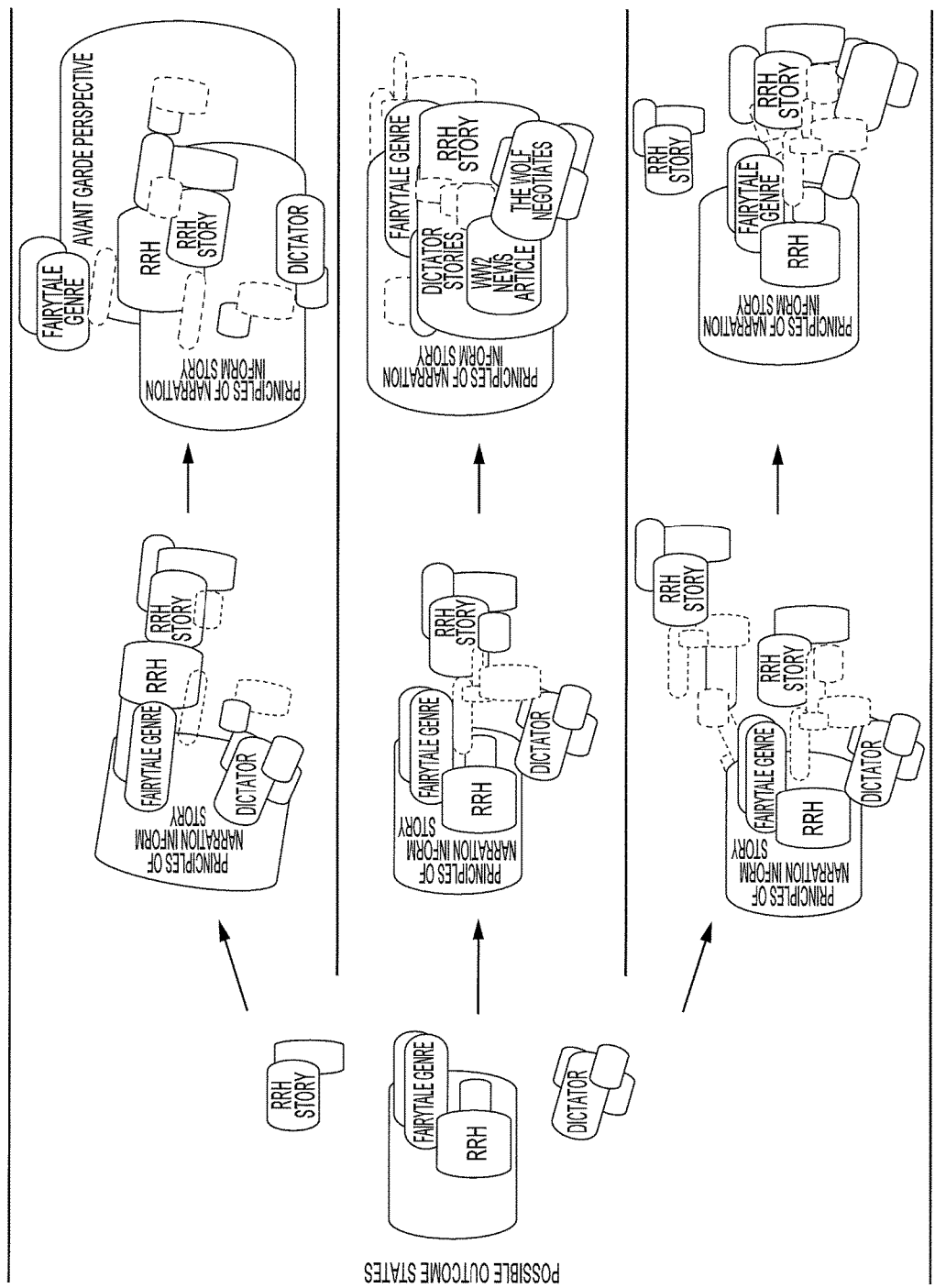
FIG. 45a shows portions of a graphical user interface according to embodiments described herein.
Figure 45B:
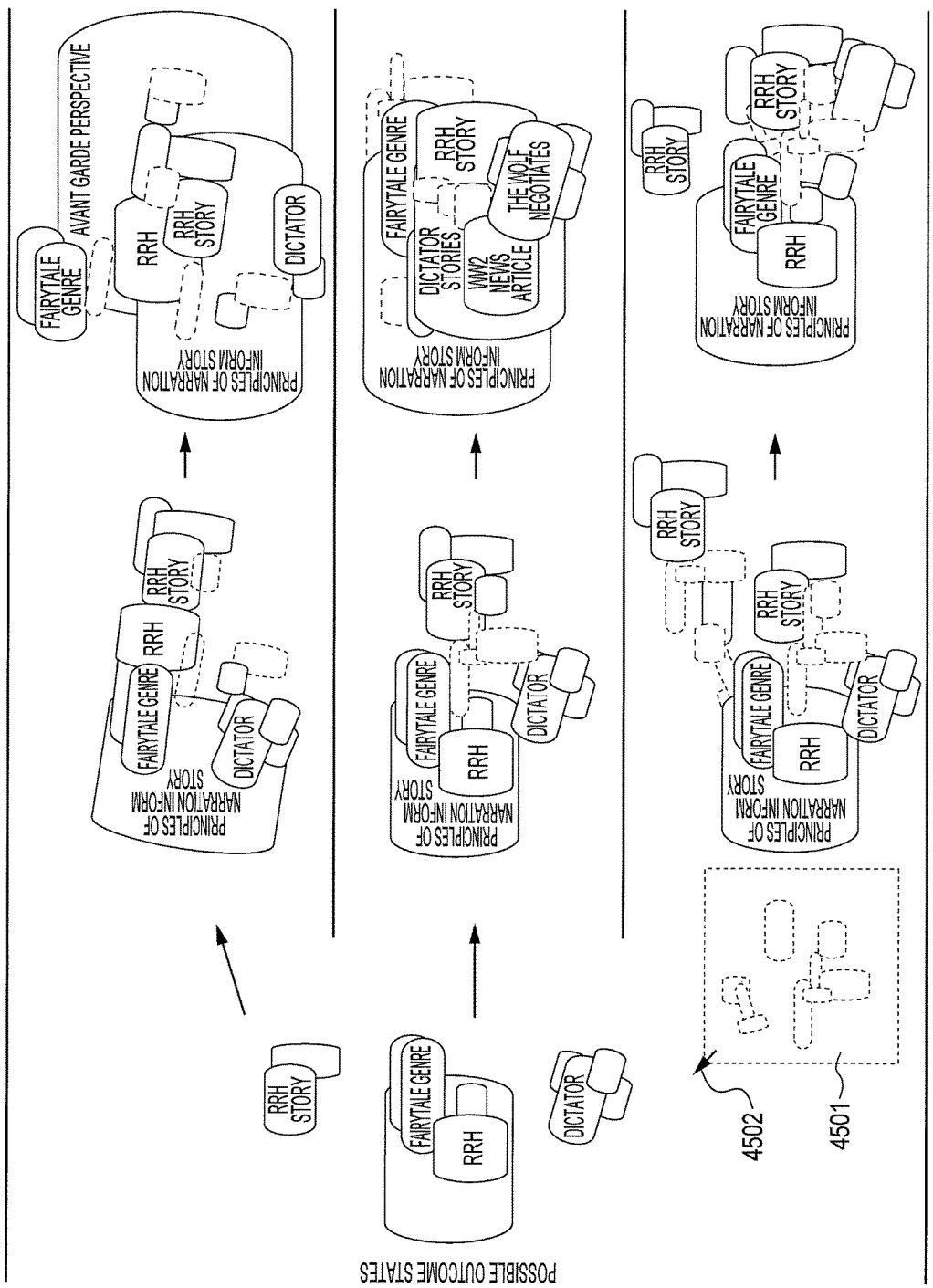
FIG. 45b shows portions of a graphical user interface according to embodiments described herein.
Figure 46:
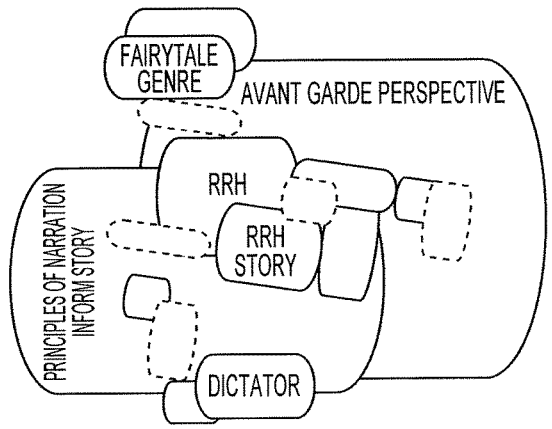
FIG. 46 shows portions of a graphical user interface according to embodiments described herein.
Figure 46:
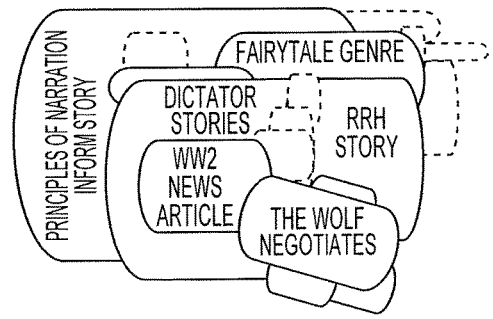
Figure 46:
Figure 46:
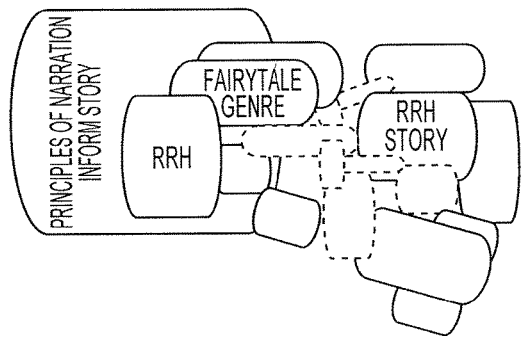

FIGS. 45*a* and 45*b*. illustrate the possible outcome states band, which is usually larger than the others due to the phenomena displayed: this is where the multiple possible outcomes of the story can be seen. These multiple outcomes can also take two forms: progressive and total. In the 'progressive' form, each stage of the progression towards a possible outcome is depicted in sequence. It allows the user to see all possible outcome sequences in relation to each other, and also in relation to their own progressive states.

A user can click on the screen to expand detail on these objects. 4501 of FIG. 45*b* is such an expansion based on a click of the cursor 4502 on the screen.

In the 'total' form, only a single instance of each outcome is depicted. It allows the user to examine the final outcome and its relationship with other final outcomes exclusively. See FIG. 46.

This 'total' outcome can also be viewed in two ways: 'final' or 'the story so far.' The 'final' outcome is the designated end of the story. This is referred to as 'final.' It is useful if it is important to the interpreter at that moment to know the ultimate outcome.

It is also possible to see the total outcome for any other stage of the story, so that all states leading to it are compressed into a single instance. This is known as 'story so far.' The 'story so far' representation is useful in cases where the final outcome would be sparse due to lack of information or some other reason, and where viewing an earlier state is preferred. It has the same appearance in the user interface as the 'total' implementation, but is selected differently. One way to select a 'story so far' is by clicking on a different part of the timeline indicated in figure for detailed inspection (not shown).

These molecular representations are derived from computations associated with immediate interpretation. If the story is "the baby cried and the mommy picked it up," the interpretation until that point assumes a future in which the baby is calmed. These assumptions are explicit in the ontology graphs and therefore the category theoretic structure and the narrative operators, such as governance, funnels and boxes. The ontology graph and category theoretic structure provide the positions of nodes and links in relation to each other. The operators of governance, funnels and boxes further refine these structures so they include principles such as dominance, nesting and transfer between situations or ontologies. These principles also provide the means of relating all situations or ontologies to each other.

Within the structure of molecular forms, dominance is graphically indicated by positioning from left to right. See FIG. 44*b* for an example. The more left an object is in the band, the more dominant. In FIG. 44*b*, the ambassador 'Principles of narration inform the story' 4401 can be seen to have the left-most edge. This indicates that it governs all objects to the direction of the right of that edge. The degree of dominant influence is reflected in the distance between the left edge of the dominant object and the nextmost edge of other entities: the more space appears, the more dominant the leftmost object. All objects are scaled to fit the space on the display, so if one object is very dominant, all other objects will be small by comparison. This reflects the principle that a narrative has a threshold for the amount of information it can contain: after a certain amount of information or events, it usually seems as though it should end.

Nesting is indicated by one object being graphically placed inside or overlapping with another. In this sense, the degree of embeddedness reflects an intuitive degree of nesting: the more an object appears within another, the more nested it is. For example, in FIG. 44*b*, the ambassador 'Principles of narration inform the story' 4401 can be seen to have most other objects nested within it. This signifies that all objects that fall within its perimeter zone (even if obscured) are nested within that larger situation. Molecular objects are thus organized according to higher level principles, such as dominance, embeddedness and degree of connection between structures.

The band 'possible outcome states' is used by all levels of the system: as part of the graphical user interface, and also as part of the system and method.

In terms of the graphical user interface, the band 'possible outcome states' allows the user of the modeling system 214 to visualize the complex relationship between multiple states, including those that are speculative, tentative and/or simultaneous. A unique feature of this representation is that these multiple states are also organized in relation to each other, just as multiple situations are drawn into a network in the interpretation space. This allows governance relations to exist between multiple possible future states of the story. The governance relations between possible outcomes states can be seen in FIG. 47. It is known as the 'futures ontology'.

Figure 47:
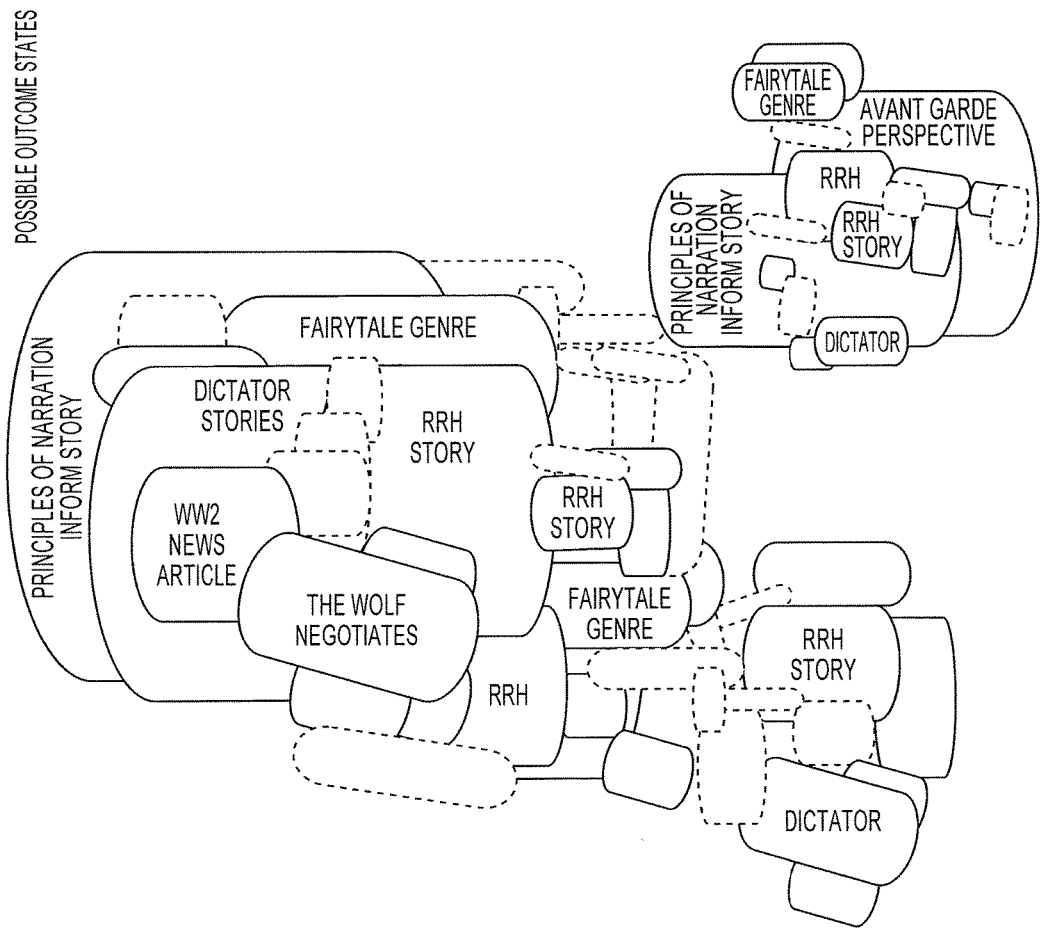
FIG. 47 shows portions of a graphical user interface according to embodiments described herein.

The futures ontology in FIG. 47 is an even higher-level view than those also mentioned. In FIG. 47 it is expressed as an extension of the 'total' form. Here, the possible outcome states are seen in their 'total' form, which are arranged in relation to each other. They are arranged according to their governance relations, which follow the same organizational and representational conventions as other areas of the model. In FIG. 47, it can be seen that governing objects occupy the most left positions, and have influence over those on their right. As with other areas of the model, instance (3) associative funnels and resolution funnels have suggested additional structures that allow these states to relate, as shown in item 3302 in FIG. 33. Supporting states are also smaller than governing states, depending on their own degree of influence. Due to the way these states are related, they can appear as one compound form, which itself is another kind of derived ontology.

Governance between possible outcome states is useful to gain overall characterizations of the story's direction, causal consequences and impetus. For example, if one possible outcome of a story outcome is more well known or more common than others, it will govern the other possible outcomes. Its associative priorities will have more influence over the structures sought and selected when funnels are seeking new structures to bridge or resolve conflicts, as described in the section on funnels.

The degree of governance of possible outcome states over each other is attributed according to a range of criteria. These follow principles of dominance already explained in relation to other parts of the system: governing entities are either more well-known, or more common, or in some way allow the existing conceptual fragments to fit together more easily or more coherently. In the same manner as other areas of the model, it is also possible for some or all structures in the 'possible outcome states' band to be ungoverned. These relationships can be seen and depicted in the 'possible outcome states band,' in the view shown in FIG. 47.

In terms of the system and method of FIG. 2, the modeling of possible outcome states supports other important features. First, it provides a target for the latest version of the derived ontology. One benefit of this is that the derived ontology can then be measured against a scope of possible future states. This gives funnel operations further guiding structure, because when they are seeking bridging or resolving conceptual structures, they can also be guided by what kind of stories the text could be becoming. This scope also feeds the characterization of the derived ontology, contributing structure to it based on what sort of story is might turn out to be.

Second, this scope of possible outcome states provides a sense of which outcomes are more likely, due to what has happened so far. This could be used to consider why a change in an expected course was a surprise. In the context of story analysis, this would allow for the factoring in of higher-level structural effects such as surprise or anticipation. It could also be used to track how an abrupt change creates tensions that might need to be resolved in unexpected areas of the system. For example, in another domain, such as the cultural impact of an event on a country, it could be used to determine how its ramifications might ripple through a social system in the form of riots, or the spawning of counter-culture, or perhaps the emergence of new forms of humor (or all three). This feature could also be utilized in its unadorned form: as a way to measure the discrepancy between existing trends in a system and the outcome. The ability to track discrepancies between expected and actual outcomes would also make it possible to identify the possible presence of a new, unknown antagonist.

Finally, the possible outcome states band contributes an important aspect to the operational mechanisms of the system. This system and method drives incompatible elements or concepts towards coherence. One of the ways this driving imperative is instituted is by identifying what kinds of situations the system is driving towards, and determining what structural steps might be needed to get there. It is a feature of this system that this is possible even if all the elements needed to calculate its final outcome are not yet present, because it can drive towards the resolution of tension using possible states as a guide. If there seems to be no straightforward way towards these cohering forms, there will be more tension in the system.

In the current art, blocks to coherence and compatibility such as this do not strengthen the system—they are seen as problems to be corrected and can halt operations. In this system and method, such tension drives and strengthens the system, as increasingly more structure is drawn in from other sources, including the story text. This allows operators such as funnels to seek resolving solutions, and construct more radical possible outcome states in order to satisfy them.

Embodiments of the invention can be used in enhanced natural language comprehension systems that encounter complex text, perhaps fiction. Possibly the text involves untruths, delusions or evasions. These can be handled as situations in the combined system 232 of FIG. 2*a*. A related application is in intelligence analysis where the goal is to understand not only the true facts of a situation, but how they are seen in the mind of a religious extremist. The mind of the extremist in this case would be handled as a situation. A complicating example is analysis of documents written by such extremists to sort out what their motives are and how they are likely to act.

Embodiments of the invention can also be used in the interpretation of video surveillance footage where the situation of the collection of the material differs in fundamental ways from the situations trying to be understood. In this manner, complex cultural interactions and conventions can be extracted from direct observation.

Embodiments of the invention has application in the financial arena, because the science of economics has a mix of rational and irrational behaviors. The rational behaviors can be accommodated by the existing art in reasoning systems, but the irrational and often governing behaviors are not modelable using logic. In this case, the current art allows characterizing of correspondence by statistical tracking, for example by bayesian methods. Embodiments of the invention allow for a more formal and scientific causal modeling framework to be built that captures these soft dynamics.

Yet another example where embodiments of the invention are applicable is in the engineering of stories e.g., for expensive films. The current art allows very limited capabilities in this regard: winning formulas are discovered by expensive trial and error and then simply copied with a minimum of change. Embodiments of the invention allow for the creation of new narratives with winning features.

Embodiments of the invention may also be used in the design of products and the concurrent design of the manufacturing processes involved. Many products today are designed to not only perform a task well, but to deliver lifestyle affirmations as well. For example, it is well known that cars are bought based on a variety of soft criteria like styling, class affiliation and personality enhancement. Clothing has many of the same qualities. Working from the current art is a matter of trial and error, but the market also demands novelty. Embodiments of the invention is particularly well suited for understanding these kinds of dynamics to design a product and find production partners capable of the these soft qualities.

Embodiments of the invention can also be used to enhance web search. The current art indexes pages based on the appearance, frequency and position of words and phrases without actually understanding any of those words. This is a well known deficiency and the World Wide Web Consortium has developed an ontological and marking infrastructure using OWL and RDF.

In this method, a website that is suitably marked with RDF tags and appropriate ontologies can be understood in a deeper fashion. However, tagging such a site is currently not feasible. Embodiments of the invention allow for a site to be read automatically and then based on stored dynamics embodiments of the invention can automatically understand the content in sufficient depth to assign the RDF tags. This in turn will enable true semantic search over the entire internet.

Another example of an application of embodiments of the invention is for swarm control of autonomous aircraft flying together. Each aircraft must be aware of its location relative to the other aircraft to avoid collision. Each aircraft may also need to be aware of threats and destroy those threats, and additionally be aware of the mission each must accomplish.

What is claimed as new and desired to be protected by Letters Patent of the United States is:

1. A method of operating a computer system to dynamically derive an ontology, the method comprising:
    operating a graphical modeling user interface to create a model comprising ontologies and inferences having inference states, the graphical modeling user interface comprising an ontology space for displaying nodes associated with at least one ontology, an incoming text space for displaying incoming information and an interpretation space for displaying the governance of situations based on the incoming information and at least one ontology, and displaying inference state visual elements representing the inference states in one or more of the ontology space, incoming text space and interpretation space;
    providing initial information to the computer system and displaying the initial information in the graphical modeling user interface;
    using the inferences to generate a first ontology based upon the initial information and displaying the first ontology in the graphical modeling user interface;
    displaying links between the situations in the interpretation space and the at least one ontology in the ontology space;
    providing additional information to the computer system and displaying the additional information in the incoming text space of the graphical modeling user interface;
    adjusting the inference states of the inferences based upon the first ontology;
    adjusting the displayed links based upon the first ontology;
    updating the inference state visual elements in the graphical modeling user interface to reflect the adjusted inference states of the inferences; and
    using the adjusted inference states and adjusted links to generate a second ontology based upon the first ontology and the additional information and displaying the second ontology in the graphical modeling user interface.

2. The method of claim 1, further comprising:
    adjusting the first ontology based upon the additional information.

3. The method of claim 1, wherein the additional information is provided from outside the computer system.

4. The method of claim 1, wherein the additional information is provided from a reasoning system within the computer system.

5. The method of claim 4, wherein the additional information is provided to an ontological system.

6. The method of claim 1, wherein the first ontology is an ontology graph.

7. The method of claim 1, wherein the adjusting the inference state comprises changing the inference state from one of neutral, suspended, persistent, activation, generative by activation, association-forming, conflict, transformative, governing, operation anchored in system rather than story to a different one of neutral, suspended, persistent, activation, generative by activation, association-forming, conflict, transformative, governing, operation anchored in system rather than story.

8. A computer system for dynamically deriving an ontology in a current state, the computer system comprising:
    a storage for storing ontologies;
    a modeling system having a graphical user interface comprising an ontology space for displaying nodes associated with at least one ontology, an incoming text space for displaying incoming information and an interpretation space for displaying the governance of situations based on the incoming information and at least one ontology, and, the modeling system for creating and displaying a model comprising ontologies and inferences having inference states in one or more of the ontology space, incoming text space and interpretation space and links between the situations in the interpretation space and the at least one ontology in the ontology space;
    an ontology derivation component for receiving ontologies and inferences from the modeling system and generating an ontology based upon initial information, the inferences received from the modeling system and at least one ontology from at least one previous state; and
    at least one reasoning component for modifying inference states based upon initial information and previous inferences from at least one previous state, and for providing the modified inferences to the ontology derivation component and to the modeling system for display,
    wherein the graphical user interface of the modeling system is updated to reflect changes in the links and inference states of the inferences.

9. The computer system of claim 8, wherein the modeling component and the ontology derivation component reside on separate computers.

10. The computer system of claim 8, wherein the modeling component and the ontology derivation component reside on the same computer.

11. The computer system of claim 8, wherein the inferences comprise at least one of categoric dynamics and morphisms.

12. The computer system of claim 8, wherein the modeling component models infon expressions.

13. The computer system of claim 12, wherein the infon expressions are represented as Resource Description Framework triples.

14. The computer system of claim 8, wherein the modeling component has a graphical syntax that uses time as a horizontal axis and significant zones as the vertical axis.

15. The computer system of claim 14, wherein the modeling component employs governance to group divergent ontologies.

16. The computer system of claim 8, wherein the ontology component and reasoning component reside on separate computers.

17. The computer system of claim 8, wherein the ontology is an ontology graph.

18. The computer system of claim 17, wherein at least one of categoric dynamics and morphisms is used to generate the ontology graph.

19. The computer system of claim 8, wherein the inferences are situationally interpreted knowledge.

20. The computer system of claim 8, wherein ontologies from previous states are retroactively modified based upon the current state.

21. The computer system of claim 8, wherein the at least one reasoning component is configured to modify the inference states by changing the inference state from one of neutral, suspended, persistent, activation, generative by activation, association-forming, conflict, transformative, governing, operation anchored in system rather than story to a different one of neutral, suspended, persistent, activation, generative by activation, association-forming, conflict, transformative, governing, operation anchored in system rather than story.

22. A method of operating a computer system to dynamically derive an ontology, the method comprising:
operating a graphical modeling user interface to create a model comprising ontologies and inferences having inference states, the graphical modeling user interface comprising an ontology space for displaying nodes associated with at least one ontology, an incoming text space for displaying incoming information and an interpretation space for displaying the governance of situations based on the incoming information and at least one ontology, and displaying inference state visual elements representing the inference states in one or more of the ontology space, incoming text space and interpretation space;
providing initial ontologies, inferences and facts from the graphical modeling user interface to an ontology derivation computer system and displaying the initial ontologies, inferences and fact in the graphical modeling user interface;
displaying links between the situations in the interpretation space and the at least one ontology in the ontology space;
operating the ontology derivation computer system to derive the ontology and display the derived ontology using the graphical modeling user interface;
operating a reasoning computer system to adjust the inference states of the inferences based upon the ontology;
providing the adjusted inferences to the ontology derivation computer system to adjust the ontology; and
providing rules to the ontology derivation computer system, the rules being followed by the ontology derivation computer system when generating ontologies;
updating the inference state visual elements in the graphical modeling user interface to reflect the adjusted inference states of the inferences
updating the displayed links to reflect the adjusted inference states of the inferences,
wherein the rules for adjusting the ontologies are based upon initial ontologies.

23. The method of claim 22, further comprising operating a modeling computer system to develop models that are used by the ontology derivation computer system to adjust the ontology.

24. The method of claim 22, wherein each step of the method is repeated at least one time and each previous adjusted ontology is provided as input to the providing step which defines a new state.

25. The method of claim 24, wherein information is conveyed between states by an inheritance path.

26. The method of claim 22, wherein the facts are represented as infons.

27. The method of claim 22, wherein the operating a reasoning computer system to adjust the inference state comprises changing the inference state from one of neutral, suspended, persistent, activation, generative by activation, association-forming, conflict, transformative, governing, operation anchored in system rather than story to a different one of neutral, suspended, persistent, activation, generative by activation, association-forming, conflict, transformative, governing, operation anchored in system rather than story.

28. A computer system for dynamically deriving an ontology, the computer system comprising:
a graphical modeling means for creating and providing to the computer system a model comprising ontologies and inferences having inference states, the graphical modeling means comprising an ontology space for displaying nodes associated with at least one ontology, an incoming text space for displaying incoming information and an interpretation space for displaying the governance of situations based on the incoming information and at least one ontology, and for graphically displaying inference state visual elements representing the inference states in one or more of the ontology space, incoming text space and interpretation space, and displaying links between the situations in the interpretation space and the at least one ontology in the ontology space;
means for providing initial information to the computer system and displaying the initial information in the graphical modeling user means;
means for generating a first ontology based upon the initial information and the model received from the graphical modeling means and displaying the first ontology in the graphical modeling user means;
means for providing additional information to the computer system and displaying the additional information in the incoming text space of the graphical modeling user means;
means for generating a second ontology and modifying the links and the inference states based upon the first ontology, the modified inferences and the additional information, and for displaying the second ontology in the graphical modeling user means; and
wherein the modified inferences for generating the second ontology are based upon the first ontology, and wherein the links and inference state visual elements in the graphical modeling means are updated to reflect the modified inference states.

29. The computer system of claim 28, wherein the means for generating a second ontology and modifying the inference state based upon the first ontology changes the inference state from one of neutral, suspended, persistent, activation, generative by activation, association-forming, conflict, transformative, governing, operation anchored in system rather than story to a different one of neutral, suspended, persistent, activation, generative by activation, association-forming, conflict, transformative, governing, operation anchored in system rather than story.

30. A computer system for dynamically deriving an ontology in a current state, the computer system comprising:
- a modeling computer comprising a graphical user interface having an ontology space for displaying nodes associated with the ontologies, an incoming text space for displaying incoming information and an interpretation space for displaying the governance of situations based on the incoming information and the ontologies, the graphical user interface for designing and displaying a model comprising ontologies and inferences having inference states in one or more of the ontology space, incoming text space and interpretation space and links between the situations in the interpretation space and the at least one ontology in the ontology space;
- an ontology derivation computer for generating an ontology based upon at least one of initial information, the inferences from the modeling computer and at least one ontology from at least one previous state; and
- a reasoning computer for adjusting the inference states of the inferences based upon initial information and previous inferences from at least one previous state, and for providing the adjusted inferences to the ontology derivation computer,
- wherein the ontology derivation computer is configured to retroactively modify ontologies and inference states of inferences from previous states based upon the current state, and
- wherein the graphical user interface is updated to reflects the modifications to the inference states by modifying the links.

31. The computer system of claim 30, wherein the reasoning computer is configured to adjust the inference state by changing the inference state from one of neutral, suspended, persistent, activation, generative by activation, association-forming, conflict, transformative, governing, operation anchored in system rather than story to a different one of neutral, suspended, persistent, activation, generative by activation, association-forming, conflict, transformative, governing, operation anchored in system rather than story.

* * * * *